(12) United States Patent
Korekado et al.

(10) Patent No.: US 9,109,888 B2
(45) Date of Patent: Aug. 18, 2015

(54) DISTANCE MEASURING SYSTEM

(71) Applicant: HONDA MOTOR CO., LTD., Tokyo (JP)

(72) Inventors: Keisuke Korekado, Wako (JP); Tomoyuki Kamiyama, Wako (JP); Nobuyuki Ohashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 13/838,053

(22) Filed: Mar. 15, 2013

(65) Prior Publication Data

US 2013/0278917 A1     Oct. 24, 2013

(30) Foreign Application Priority Data

Mar. 21, 2012  (JP) ................................ 2012-064427
Mar. 21, 2012  (JP) ................................ 2012-064430
Mar. 23, 2012  (JP) ................................ 2012-068142

(51) Int. Cl.
| | |
|---|---|
| *G01C 3/08* | (2006.01) |
| *G01S 17/10* | (2006.01) |
| *G01S 7/484* | (2006.01) |
| *G01S 7/486* | (2006.01) |
| *G01S 7/497* | (2006.01) |

(52) U.S. Cl.
CPC . *G01C 3/08* (2013.01); *G01S 7/484* (2013.01); *G01S 7/4865* (2013.01); *G01S 7/497* (2013.01); *G01S 17/10* (2013.01)

(58) Field of Classification Search
None
See application file for complete search history.

(56) References Cited

U.S. PATENT DOCUMENTS

| | | | | |
|---|---|---|---|---|
| 5,304,940 | A * | 4/1994 | Harasawa et al. ............. | 327/552 |
| 5,361,277 | A * | 11/1994 | Grover ......................... | 375/356 |
| 5,373,255 | A * | 12/1994 | Bray et al. .................... | 331/1 A |
| 5,754,280 | A | 5/1998 | Kato et al. | |
| 6,675,306 | B1 * | 1/2004 | Baxter .......................... | 713/400 |
| 7,499,150 | B2 * | 3/2009 | Lewis et al. .................. | 356/5.01 |
| 2003/0214335 | A1 * | 11/2003 | Saeki ............................ | 327/165 |
| 2005/0259239 | A1 * | 11/2005 | Lin et al. ...................... | 356/5.01 |
| 2007/0217559 | A1 * | 9/2007 | Stott et al. .................... | 375/355 |
| 2008/0158555 | A1 * | 7/2008 | Mori ........................... | 356/239.2 |
| 2009/0045359 | A1 | 2/2009 | Kumahara et al. | |

(Continued)

FOREIGN PATENT DOCUMENTS

| | | |
|---|---|---|
| JP | 8-313215 A | 11/1996 |
| JP | 2001-281336 A | 10/2001 |

(Continued)

*Primary Examiner* — Isam Alsomiri
*Assistant Examiner* — Samantha K Abraham
(74) *Attorney, Agent, or Firm* — Squire Patton Boggs (US) LLP

(57) ABSTRACT

A light emission reference signal, the timing of which is adjusted by a first delay time control circuit, is input as a timing adjustment signal to a light emitter driver. The light emission reference signal, which is delayed by a second delay time control circuit, is output as an offset signal. The offset signal and a light emission timing signal from the light emitter driver are input to a timing correction phase comparator, and a phase comparison result is output from the timing correction phase comparator. The phase comparison result is input to a timing correction control logic circuit, and a delay adjusting signal based on the phase comparison result is output from the timing correction control logic circuit. The delay adjusting signal is input to the first delay time control circuit, whereby the timing of the light emission reference signal is adjusted.

31 Claims, 36 Drawing Sheets

(56) References Cited

U.S. PATENT DOCUMENTS

| | | |
|---|---|---|
| 2009/0274075 A1* | 11/2009 | Okawa et al. ................. 370/280 |
| 2010/0191418 A1* | 7/2010 | Mimeault et al. ............... 701/36 |
| 2012/0044003 A1* | 2/2012 | Itou et al. ..................... 327/160 |
| 2012/0200842 A1* | 8/2012 | Kamiyama et al. .......... 356/5.03 |
| 2013/0208257 A1* | 8/2013 | Dyer ............................ 356/4.01 |

FOREIGN PATENT DOCUMENTS

| | | |
|---|---|---|
| JP | 2009-236657 A | 10/2009 |
| WO | WO 2008/047640 | 4/2008 |

* cited by examiner

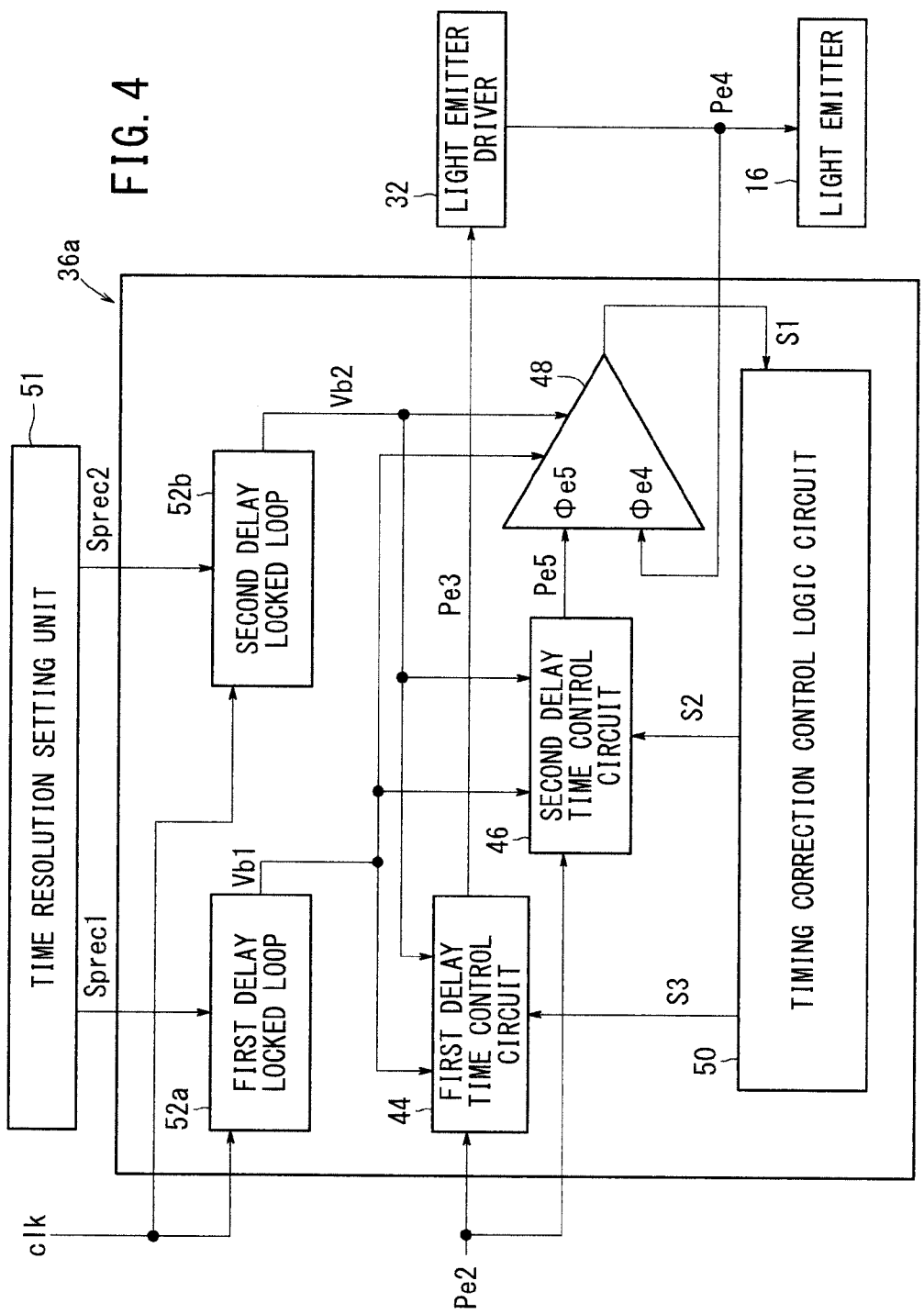

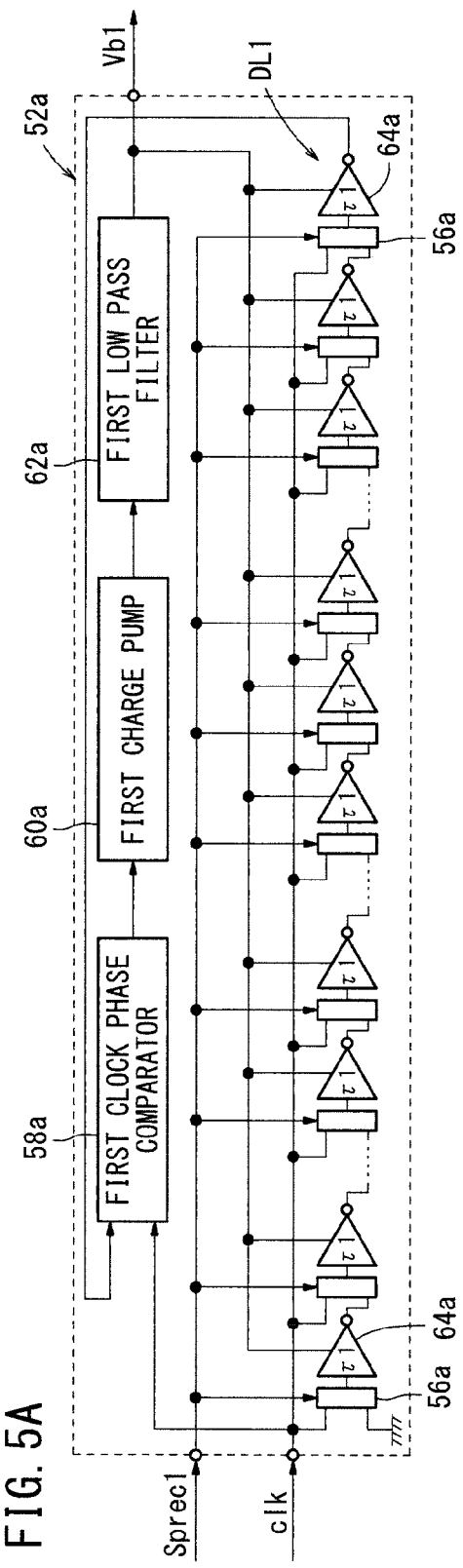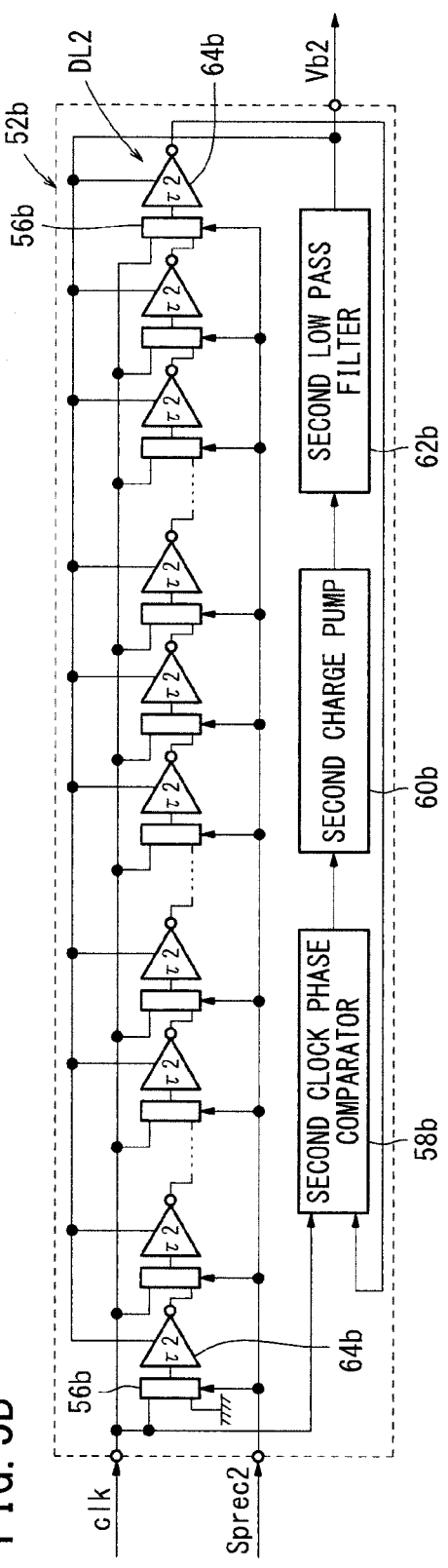
FIG. 5A
FIG. 5B

FIG. 35

DISTANCE MEASURING SYSTEM

CROSS-REFERENCE TO RELATED APPLICATIONS

This application is based upon and claims the benefit of priority from Japanese Patent Applications No. 2012-064427 filed on Mar. 21, 2012, No. 2012-064430 filed on Mar. 21, 2012 and No. 2012-068142 filed on Mar. 23, 2012, the contents all of which are incorporated herein by reference.

BACKGROUND OF THE INVENTION

1. Field of the Invention

The present invention relates to a distance measuring system for determining the distance to an object by means of a time-of-flight (TOF) method, in which light emitted from a light emitter is reflected by an object, reflected light that returns from the object is received, and an output corresponding to an amount of light received is used to measure the distance to the object.

2. Description of the Related Art

Heretofore, a distance measuring device that uses a time-of-flight (TOF) method is generally known as an ambient sensing method in which measurement of distances is realized in a contactless manner (see Japanese Laid-Open Patent Publication No. 2001-281336 and Japanese Laid-Open Patent Publication No. 08-313215). According to such a TOF method, light that is emitted toward an object from a light emitter, and a round trip time consumed after the light is emitted toward the object and until the light bounces off the object and returns, are sensed by a light receiver, whereby the distance to the object can be measured. For this reason, synchronization between a timing at which light is emitted from the light emitter and a timing at which light is received by the light receiver is regarded as a technical prerequisite.

However, the characteristics of the light emitting element per se that constitutes the light emitter, and the characteristics of the light receiving element per se that constitutes the light receiver, or in other words, the respective types of elements and wiring arrangements in relation to the light emitter and the light receiver, as well as circuit characteristics thereof, are influenced and changed by the surrounding environment including environmental conditions such as temperature and humidity. Thus, even if calibration is performed at the time of shipping, it is difficult to maintain measuring precision of the distance measuring system with respect to fluctuations in an ever-changing environment, leading to the risk that errors will increase. For this reason, there have already been proposed methods for carrying out synchronization between a light emitter and a light receiver using feedback controls (see International Publication No. WO 2008/047640 and Japanese Laid-Open Patent Publication No. 2009-236657).

According to the disclosures of International Publication No. WO 2008/047640 and Japanese Laid-Open Patent Publication No. 2009-236657, a difference (phase difference) in the phase of a light emission timing signal, which is output from a light emitting element drive circuit, and the phase of a light receiving timing signal, which is output from a light receiving element drive circuit, is detected in a phase comparison circuit, and by means of a delay time adjusting circuit disposed between the light emitting element drive circuit and a timing generating circuit for the light emitting element, the light emission timing, which is supplied to the light emitting element drive circuit, can be adjusted responsive to the aforementioned phase difference.

SUMMARY OF THE INVENTION

Incidentally, in the above disclosures, for synchronizing the timings of light emission and light reception, the important feature is to provide a phase detection method by way of the aforementioned phase comparison circuit. In International Publication No. WO 2008/047640 and Japanese Laid-Open Patent Publication No. 2009-236657, nothing is disclosed concerning countermeasures with respect to characteristic variations in the phase comparison circuit itself due to changes in the environment. Since characteristic changes in the phase comparison circuit per se cannot be corrected by feedback control from the actual light emission timing and the timing at which light is received, there still is a concern that measuring precision cannot be guaranteed. More specifically, when output characteristics of the phase comparison circuit (i.e., the observation device) depend on the surrounding environment, even though only the characteristic changes in the light emitting element drive circuit and the light receiving element drive circuit, which are the actual objects to be evaluated, should be corrected, such a correction would still be made while adding thereto changes in the output characteristics of the phase comparison circuit. Thus, adjustment of the phase, which actually is intended as the object to be evaluated, cannot be carried out.

Further, to perform measurements with high time resolution and to realize stability, it is necessary to consider the effect of comparatively short time fluctuations (i.e., jitter) included within the feedback signal, etc. The manifestation of jitter differs depending on the cause thereof. For example, jitter caused by thermal noise appears randomly with respect to time, whereas jitter that occurs due to the influence of electromagnetic disturbances or the like may be cyclical or may appear sporadically.

In a measuring system using a TOF method that deals with the speed of light, the influence of jitter must be taken into account, and it is necessary to correct the timing by means of highly accurate time resolution. In this case, when a feedback control is implemented at a small sampling frequency, contrarily, instability increases, which adversely affects synchronization. On the other hand, when a feedback control is implemented at a large sampling frequency, stability is improved, however, even if sampling is carried out with accuracy in excess of the minimum time resolution of the timing correction circuit, implementation thereof is uncontrollable and power is consumed needlessly.

For the foregoing reasons, there is a need in the art for a device that enables a feedback control to be implemented at an appropriate sampling frequency.

The present invention has been devised taking into consideration the aforementioned problems. An object of the present invention is to provide a stable and highly accurate distance measuring system, which can maintain synchronism between light emission timing and light reception timing in a stable manner without being affected by the surrounding environment.

Further, another object of the present invention is to provide a stable and highly accurate distance measuring system, in which, in relation to correcting a timing difference according to a feedback control, synchronism can be maintained between light emission timing and light reception timing in a stable manner without being affected by the surrounding environment, and a feedback control can be implemented at an appropriate sampling frequency.

[1] A distance measuring system according to a first aspect of the present invention includes a light emitter that emits light toward a target object, a light receiver that receives reflected light of the emitted light from the target object and produces an output corresponding to an amount of light received, a controller for controlling the timing of the light emitter and the light receiver, and a distance calculating unit that calculates a distance to the target object by means of a time-of-flight method using the output of the light receiver.

The controller further comprises a sequencer that regulates a light emission timing at which light is emitted from the light emitter and a light reception timing at which light is received by the light receiver, a reference clock signal generating unit that generates a reference clock signal and outputs the reference clock signal to the sequencer, a light emitter driver for driving the light emitter, a light receiver driver for driving the light receiver, and a timing correction unit interposed in a previous stage of the light emitter driver for correcting the light emission timing.

The timing correction unit includes a first delay time control circuit, a second delay time control circuit, a timing correction phase comparator, and a timing correction control logic circuit, the sequencer generates a reference signal synchronized with the reference clock signal, and inputs the reference signal to the first delay time control circuit and the second delay time control circuit, the second delay time control circuit receives the reference signal, which is input thereto, and outputs an offset signal in which the timing of the reference signal is delayed, the timing correction phase comparator receives the offset signal and an output signal from the light emitter driver, which are input thereto, and outputs a phase comparison result, the timing correction control logic circuit reads the phase comparison result, and outputs a delay adjusting signal based on the phase comparison result, and the first delay time control circuit reads the delay adjusting signal, adjusts the timing of the reference signal, and outputs the same as a light emission timing adjustment signal to the light emitter driver.

In accordance with the above features of the invention, the distance to an object can be measured stably and highly accurately, while maintaining synchronism between light emission timing and light reception timing in a stable manner without being affected by the surrounding environment.

[2] In the distance measuring system according to the first aspect of the present invention, the timing correction unit may further comprise a first delay locked loop and a second delay locked loop, the first delay time control circuit, the second delay time control circuit, and the timing correction phase comparator may each include, respectively, a first delay line and a second delay line, a first delay adjusting bias generated by the first delay locked loop may be applied to each of the first delay lines, and a second delay adjusting bias generated by the second delay locked loop may be applied to each of the second delay lines.

[3] In the distance measuring system according to the first aspect of the present invention, the timing correction unit may further comprise a first delay locked loop and a second delay locked loop, the first delay locked loop may include a first delay line, the second delay locked loop may include a second delay line, the timing correction phase comparator may share the first delay line and the second delay line.

[4] In the distance measuring system according to the first aspect of the present invention, the first delay time control circuit, the second delay time control circuit, and the timing correction phase comparator may each include, respectively, a first delay locked loop and a second delay locked loop, each of the first delay locked loops may include a first delay line, each of the second delay locked loops may include a second delay line, and the first delay time control circuit, the second delay time control circuit, and the timing correction phase comparator may each share the respective first delay lines and the respective second delay lines.

[5] In the distance measuring system according to the first aspect of the present invention, at least one of the first delay time control circuit and the second delay time control circuit may comprise a first delay adjusting circuit having a variable number of delay stages, a second delay adjusting circuit having a variable number of delay stages, and a third delay adjusting circuit equipped with a first delay line and a second delay line and having a variable path between the first delay line and the second delay line, wherein the timing correction control logic circuit generates a first delay adjusting signal for adjusting the number of the delay stages of the first delay adjusting circuit, a second delay adjusting signal for adjusting the number of the delay stages of the second delay adjusting circuit, and a third delay adjusting signal for setting the path of the third delay adjusting circuit. The first delay adjusting circuit may generate a first delay signal from the reference signal based on the reference clock signal and the first delay adjusting signal, the second delay adjusting circuit may generate a second delay signal from the first delay signal based on the second delay adjusting signal, and the third delay adjusting circuit may generate a third delay signal from the second delay signal based on the third delay adjusting signal.

[6] In the distance measuring system according to the first aspect of the present invention, the timing correction phase comparator may convert a phase difference between the offset signal and the output signal from the light emitter driver into a digital signal, and output the digital signal as the phase comparison result.

[7] In this case, the timing correction phase comparator may further comprise a first delay line constituted by connecting in series a plurality of first delay elements, and to which the output signal from the light emitter driver is input to a first stage of the first delay elements, a second delay line constituted by connecting in series a plurality of second delay elements such that the second delay elements correspond to the first delay elements one by one, and to which the offset signal is input to a first stage of the second delay elements, and a phase detector having at least a plurality of flip-flop circuits, wherein each of the flip-flop circuits generates a phase detecting signal responsive to outputs from a corresponding first delay element and a corresponding second delay element, and the phase detector outputs the phase detecting signals from the respective flip-flop circuits as a phase difference value.

[8] The phase detector may further include a decoder, and the decoder may generate the phase difference value based on the phase detecting signals from each of the flip-flop circuits.

[9] The phase detector may further include a decoder, and from among the phase detecting signals from the flip-flop circuits, the decoder may determine a number of bits having logical values of "1" or a number of bits having logical values of "0", and output the same as the phase difference value.

[10] A distance measuring system according to a second aspect of the present invention includes a light emitter that emits light toward a target object, a light receiver that receives reflected light of the emitted light from the target object and produces an output corresponding to an amount of light received, a controller for controlling the light emitter and the light receiver, and a distance calculating unit that calculates a distance to the target object by means of a time-of-flight (TOF) method using the output of the light receiver.

The controller further comprises a sequencer that regulates a light emission timing at which light is emitted from the light emitter and a light reception timing at which light is received by the light receiver, a reference clock signal generating unit that generates a reference clock signal and outputs the reference clock signal to the sequencer, a light emitter driver for driving the light emitter, a light receiver driver for driving the light receiver, and a timing correction unit interposed in a previous stage of the light emitter driver for correcting the light emission timing.

The timing correction unit includes a circuit startup sequence generator, a delay time control and timing correction phase comparator, and a timing correction control logic circuit.

In addition, the circuit startup sequence generator, at the time of system startup, outputs a startup trigger signal to the timing correction control logic circuit, to thereby start up driving of the timing correction control logic circuit. The timing correction control logic circuit sets an initial value in the delay time control and timing correction phase comparator based on the startup trigger signal.

Thereafter, the circuit startup sequence generator outputs a startup signal to the delay time control and timing correction phase comparator, to thereby start up driving of the delay time control and timing correction phase comparator.

[11] In the distance measuring system according to the second aspect of the present invention, the delay time control and timing correction phase comparator may include a first delay time control circuit, a second delay time control circuit, and a timing correction phase comparator, and the timing correction control logic circuit may set an initial value of the first delay time control circuit based on input thereto of the startup trigger signal, and then start up driving of the first delay time control circuit, the second delay time control circuit, and the timing correction phase comparator.

[12] In this case, the first delay time control circuit, the second delay time control circuit, and the timing correction phase comparator may each include, respectively, a first delay line and a second delay line. The timing correction unit may further comprise a first delay locked loop that generates a first delay adjusting bias for adjusting a delay time of each of the first delay lines, and a second delay locked loop that generates a second delay adjusting bias for adjusting a delay time of each of the second delay lines. Also, the timing correction control logic circuit may start up driving of the first delay locked loop and the second delay locked loop prior to starting up driving of the first delay time control circuit, the second delay time control circuit, and the timing correction phase comparator, and then start up driving of the first delay time control circuit, the second delay time control circuit, and the timing correction phase comparator after the first delay adjusting bias and the second delay adjusting bias have become stabilized.

[13] Further, the sequencer may generate a reference signal, which is synchronized with the reference clock signal, and input the reference signal to the first delay time control circuit and the second delay time control circuit. The first delay time control circuit may output a signal to the light emitter driver, in which the reference signal is delayed based on the initial value. The second delay time control circuit may output an offset signal, in which the delay time is offset from the reference signal. The timing correction phase comparator may carry out phase comparison between the offset signal and the output signal from the light emitter driver, and output a phase comparison result, and the timing correction control logic circuit may generate an offset adjusting signal based on the phase comparison result, and update an offset value in the second delay time control circuit.

[14] The timing correction control logic circuit may update the offset value and set the offset value as an updated offset value, when the phase comparison result has reached a median within a detection range of the timing correction phase comparator.

[15] In this case, the updated offset value may be held in memory in the second delay time control circuit.

[16] Additionally, the timing correction control logic circuit may generate a delay adjusting signal based on the phase comparison result, which is read after the offset value is updated and set, and may control the first delay time control circuit using the delay adjusting signal to thereby delay the reference signal, and may correctively control the first delay time control circuit so as to make the offset signal and the output signal from the light emitter driver have the same phase.

[17] The timing correction control logic circuit may measure a jitter value per each sampling period from the phase comparison result over an arbitrary number of sampling periods, and may adjust at least a sampling interval based on the jitter value.

[18] In this case, the sampling interval may be shortened in accordance with an increase in the jitter value, and the sampling interval may be lengthened in accordance with a decrease in the jitter value.

[19] In the event that the jitter value lies within an allowable range, the sampling interval may be regarded as appropriate, whereby adjustment of the sampling interval is not carried out.

[20] Further, the timing correction control logic circuit may adjust an update interval of an adjustment in timing performed by the first delay time control circuit, based on an amount of variation within a fixed time period of the phase comparison result.

[21] In this case, the update interval of the adjustment in timing is shortened in accordance with an increase in the amount of variation.

[22] In the event that the update interval lies within an allowable range, the update interval may be regarded as appropriate, whereby adjustment of the update interval is not carried out.

[23] A distance measuring system according to a third aspect of the present invention includes a light emitter that emits light toward a target object, a light receiver that receives reflected light of the emitted light from the target object and produces an output corresponding to an amount of light received, a controller for controlling the light emitter and the light receiver, and a distance calculating unit that calculates a distance to the target object by means of a time-of-flight method using the output of the light receiver.

The controller further comprises a sequencer that regulates a light emission timing at which light is emitted from the light emitter and a light reception timing at which light is received by the light receiver, a reference clock signal generating unit that generates a reference clock signal and outputs the reference clock signal to the sequencer, a light emitter driver for driving the light emitter, and a light receiver driver for driving the light receiver.

In addition, the sequencer outputs a control signal, by which the light emission timing and the light reception timing are regulated, to the light emitter driver and the light receiver driver, via a timing correction unit that carries out adjustment of a delay time based on a transition timing of the reference clock signal, and at a time resolution that is higher than the time resolution of the reference clock signal.

[24] According to the third aspect of the present invention, the timing correction unit may include a light emission side timing correction unit and a light reception side timing correction unit, and the sequencer may output a first control signal (light emission timing adjustment signal Pe3) to the light emitter driver via the light emission side timing correction unit, and output a second control signal (light reception timing adjustment signal Pr3) to the light receiver driver via the light reception side timing correction unit.

[25] In this case, the light emission side timing correction unit may generate the first control signal (light emission timing adjustment signal Pe3) based on a phase comparison result between a first offset signal Pe5, in which a light emission reference signal Pe2 from the sequencer is delayed, and an output signal (light emission timing signal Pe4) from the light emitter driver, and then may output the same to the light emitter driver. The light reception side timing correction unit may generate the second control signal (light reception timing adjustment signal Pr3) based on a phase comparison result between a second offset signal Pr5, in which a light reception reference signal Pr2 from the sequencer is delayed, and an output signal (light reception timing signal Pr4) from the light receiver driver, and then may output the same to the light receiver driver.

[26] Furthermore, the light emission side timing correction unit may include a first delay time control circuit, a second delay time control circuit, a first timing correction phase comparator, and a first timing correction control logic circuit. In this case, the light emission reference signal Pe2 may be input to the first delay time control circuit and the second delay time control circuit. The first delay time control circuit may output a signal, in which the light emission reference signal Pe2 is delayed, to the light emitter driver as the first control signal (light emission timing adjustment signal Pe3). The second delay time control circuit may output as a first offset signal Pe5 a signal in which the light emission reference signal Pe2 is delayed, so as to offset a delay time from generation of the light emission reference signal Pe2 until output of the light emitter driver. The first timing correction phase comparator may carry out phase comparison between the first offset signal Pe5 and the output signal (light emission timing signal Pe4) from the light emitter driver, and output the same as a first phase comparison result. The first timing correction control logic circuit may output a first delay adjusting signal S3 based on the first phase comparison result, and the first delay time control circuit may input the first delay adjusting signal S3 to adjust the timing of the light emission reference signal Pe2.

On the other hand, the light reception side timing correction unit may include a third delay time control circuit, a fourth delay time control circuit, a second timing correction phase comparator, and a second timing correction control logic circuit. In this case, the light reception reference signal Pr2 from the sequencer may be input to the third delay time control circuit and the fourth delay time control circuit. The third delay time control circuit may output a signal, in which the light reception reference signal Pr2 is delayed, to the light receiver driver as the second control signal (light reception timing adjustment signal Pr3). The fourth delay time control circuit may output as the second offset signal Pr5 a signal in which the light reception reference signal Pr2 is delayed, so as to offset a delay time from generation of the light reception reference signal Pr2 until output of the light receiver driver. The second timing correction phase comparator may carry out phase comparison between the second offset signal Pr5 and the output signal (light reception timing signal Pr4) from the light receiver driver, and output the same as a second phase comparison result. The second timing correction control logic circuit may output a second delay adjusting signal S6 based on the second phase comparison result, and the third delay time control circuit may input the second delay adjusting signal S6 to adjust the timing of the light reception reference signal Pr2.

[27] A distance measuring system according to a fourth aspect of the present invention includes a light emitter that emits light toward a target object, a light receiver that receives reflected light of the emitted light from the target object and produces an output corresponding to an amount of light received, a controller for controlling the light emitter and the light receiver, and a distance calculating unit that calculates a distance to the target object by means of a time-of-flight method using the output of the light receiver.

The controller further comprises a sequencer that regulates a light emission timing at which light is emitted from the light emitter and a light reception timing at which light is received by the light receiver, a reference clock signal generating unit that generates a reference clock signal and outputs the reference clock signal to the sequencer, a light emitter driver for driving the light emitter, and a light receiver driver for driving the light receiver.

In addition, the sequencer outputs a control signal, by which the light emission timing is regulated, to the light emitter driver, via a timing correction unit that carries out adjustment of a delay time based on a transition timing of the reference clock signal, and at a time resolution that is higher than the time resolution of the reference clock signal.

[28] According to the fourth aspect of the present invention, the timing correction unit may generate the control signal (light emission timing adjustment signal Pe3) based on a phase comparison result between an offset signal Pe5, in which the light emission reference signal Pe2 from the sequencer is delayed, and an output signal (light emission timing signal Pe4) from the light emitter driver, and then output the same to the light emitter driver.

[29] Alternatively, a light receiving element may be provided, which receives direct light from the light emitter and outputs a light emission timing observation signal Sk, wherein the timing correction unit generates the control signal (light emission timing adjustment signal Pe3) based on a phase comparison result between an offset signal Pe5, in which the light emission reference signal Pe2 from the sequencer is delayed, and the light emission timing observation signal Sk from the light receiving element, and then outputs the same to the light emitter driver.

[30] Further, the timing correction unit includes a first delay time control circuit, a second delay time control circuit, a timing correction phase comparator, and a timing correction control logic circuit. In this case, the timing correction unit may input the light emission reference signal Pe2 to the first delay time control circuit and the second delay time control circuit. The first delay time control circuit may output a signal, in which the light emission reference signal Pe2 is delayed, to the light emitter driver as a light emission timing adjustment signal Pe3. The second delay time control circuit may output as the offset signal Pe5 a signal in which the light emission reference signal Pe2 is delayed, so as to offset a delay time from generation of the light emission reference signal Pe2 until output of the light emitter driver. The timing correction phase comparator may carry out phase comparison between the offset signal Pe5 and the output signal (light emission timing signal Pe4) from the light emitter driver, and output the same as a phase comparison result. The timing correction control logic circuit may output a delay adjusting signal S3 based on the phase comparison result, and the first delay time control circuit may input the delay adjusting signal S3 to adjust the timing of the light emission reference signal Pe2.

[31] According to the fourth aspect of the present invention, the light receiver driver may be installed in a single device together with at least the sequencer.

The distance measuring system according to the present invention is capable of maintaining synchronism between light emission timing and light reception timing in a stable manner without being affected by the surrounding environment, thereby enabling the distance to an object to be measured stably and with high accuracy.

Further, with the distance measuring system according to the present invention, in relation to correcting a timing difference according to a feedback control, synchronism can be maintained between light emission timing and light reception timing in a stable manner without being affected by the surrounding environment, while in addition, feedback control can be implemented at an appropriate sampling frequency, thereby enabling the distance to a target object with high accuracy.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a block diagram showing the structural configuration of a first timing correction unit;

FIG. 5A is a block diagram showing the internal configuration of a first delay locked loop in the first timing correction unit;

FIG. 5B is a block diagram showing the internal configuration of a second delay locked loop;

FIG. 35 is a block diagram showing the structural configuration of a distance measuring system (third distance measuring system) according to a third embodiment.

DETAILED DESCRIPTION OF THE PREFERRED EMBODIMENTS

The present invention utilizes an inexpensive synchronization process for a distance measuring system, dealing with the speed of light, based on the principles of a TDC (Time to Digital Converter), in which times (timings) are detected and digitally converted stably and with high accuracy. Such a TDC circuit functions as a stable and highly accurate phase comparator. Utilizing the principles of a TDC circuit, and by combining separate circuits including a control circuit (control process) and a delay circuit (delay process), etc., synchronization of the distance measuring system having stable and highly accurate time resolution can be effected.

By internally implementing a self-feedback control (delay locked loop), since a self-correcting function is included, which is responsive to characteristic changes of the circuit per se, the phase comparator in which TDC circuit principles are utilized is capable of obtaining a stable phase comparison result with respect to changes in the environment.

Further, since the system is not affected by the influence of characteristic changes of the phase comparator per se, it is possible to measure characteristic changes only pertaining to timings of light emission and light reception that actually require correction, and thus, high time resolution synchronization between such timings can be implemented robustly with respect to changes in the environment.

Below an exemplary embodiment of a distance measuring system according to the present invention will be described with reference to FIGS. 1 through 36.

Figure 1:
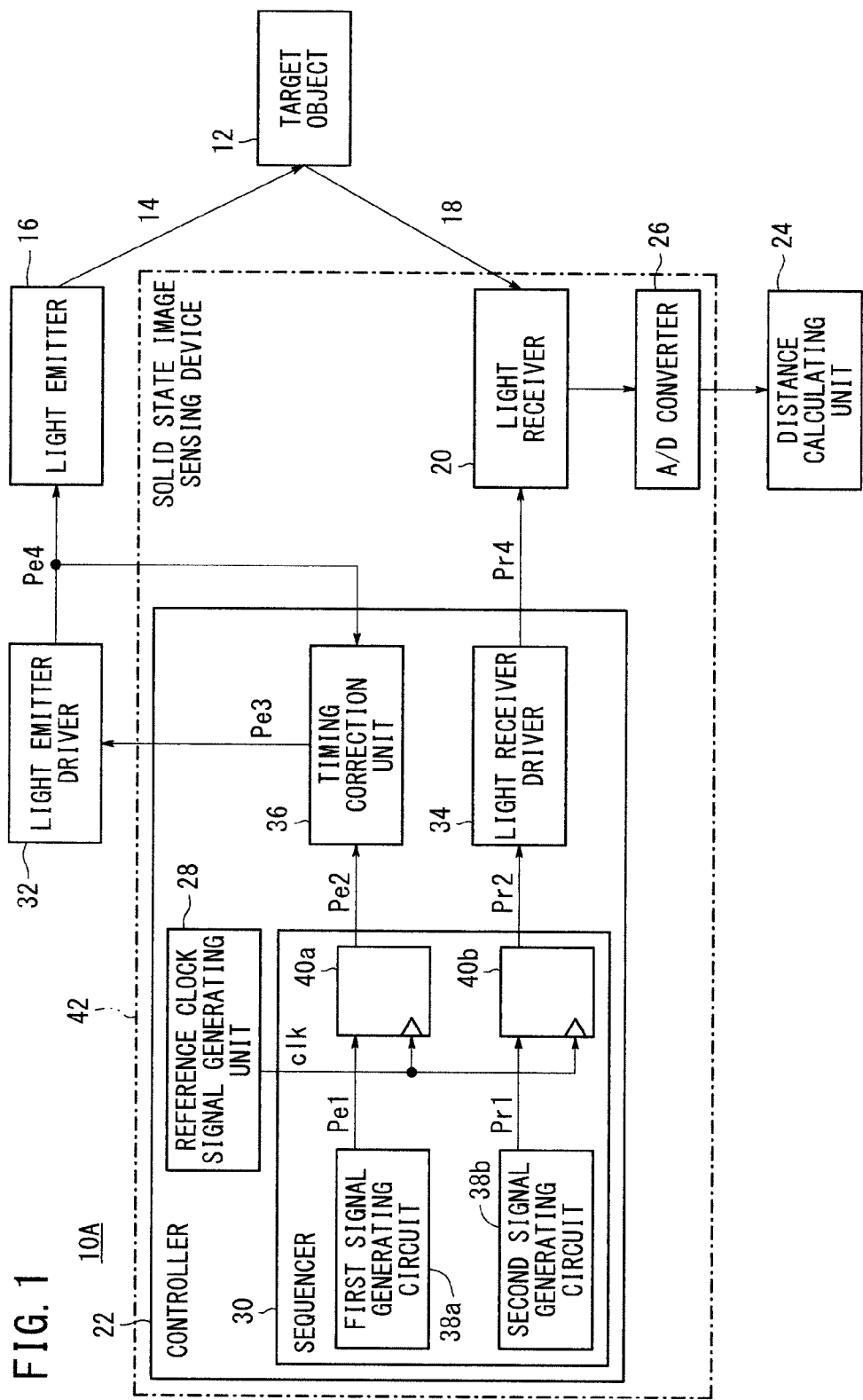
FIG. 1 is a block diagram illustrating the structural configuration of a distance measuring system (first distance measuring system) according to a first embodiment.

First, as shown in FIG. 1, a distance measuring system according to a first embodiment (hereinafter referred to as a first distance measuring system 10A) includes a light emitter 16 for emitting light 14 (emitted light 14) toward a target object 12, a light receiver 20 that receives reflected light 18 of the emitted light 14, which is reflected from the target object 12, and produces an output corresponding to an amount of light received, a controller 22 for controlling the light emitter 16 and the light receiver 20, and a distance calculating unit 24 that calculates a distance to the target object 12 by means of a time-of-flight (TOF) method using the output of the light receiver 20. The output from the light receiver 20 is output to the distance calculating unit 24 after being converted into a digital signal by an A/D converter 26.

The controller 22 includes a reference clock signal generating unit 28, a sequencer 30, a light emitter driver 32, a light receiver driver 34, and a timing correction unit 36.

The reference clock signal generating unit 28 is constituted, for example, from a PLL (Phase Locked Loop) or the like in which a quartz crystal oscillator, which is not significantly influenced by temperature, humidity, etc., in the surrounding environment, is utilized as a reference clock frequency signal, in order to generate a reference clock signal (pulses) clk, and output the reference clock signal clk at least to the sequencer 30.

The sequencer 30 regulates the light emission timing of the light emitter 16 and the light reception timing of the light receiver 20. More specifically, the sequencer 30 generates a light emission reference signal Pe2 that serves as a reference for the light emission timing of the light emitter 16, as well as a light reception reference signal Pr2 that serves as a reference for the light reception timing of the light receiver 20. For example, as shown in FIG. 1, the sequencer 30 includes a first signal generating circuit 38a, a second signal generating circuit 38b, a first clock synchronizing circuit 40a, and a second clock synchronizing circuit 40b. The first signal generating circuit 38a generates a signal Pe1 that serves as a basis for the light emission timing, and the second signal generating circuit 38b generates a signal Pr1 that serves as a basis for the light reception timing. The first clock synchronizing circuit 40a is constituted, for example, by a D-type flip-flop. The signal Pe1 is supplied to the D-terminal, and the reference clock signal clk is supplied to the CK terminal of the first clock synchronizing circuit 40a. At this time, a signal representative of synchronization of the signal Pe1 with the reference clock signal clk, i.e., the light emission reference signal Pe2, is output from the Q-terminal of the first clock synchronizing circuit 40a. Similarly, the signal Pr1 is supplied to the D-terminal, and the reference clock signal clk is supplied to the CK terminal of the second clock synchronizing circuit 40b. At this time, a signal representative of synchronization of the signal Pr1 with the reference clock signal clk, i.e., the light reception reference signal Pr2, is output from the Q-terminal of the second clock synchronizing circuit 40b.

The light emitter driver 32 controls driving of the light emitter 16 based on a light emission timing adjustment signal Pe3 from the later-described timing correction unit 36. For example, by means of the light emission timing adjustment signal Pe3, a light emission timing signal Pe4 is generated and output for causing the emitted light 14 to be emitted. The light emitter 16 emits the light 14, for example, pulsed light, in accordance with the light emission timing signal Pe4 output from the light emitter driver 32.

The light receiver driver 34 controls driving of the light receiver 20 based on the light reception reference signal Pr2 from the sequencer 30. For example, in accordance with the light reception reference signal Pr2, a light reception timing signal Pr4 (i.e., a digital shutter timing signal) is generated, which regulates the period during which the reflected light 18 is received and serves to control driving of the light receiver 20. The light receiver 20 receives an amount of reflected light 18 during a period (digital shutter period), which is regulated in accordance with the light reception timing signal Pr4, and is reflected in the output value of the light receiver 20.

As shown in FIG. 1, the light receiver driver 34 is incorporated in a single solid-state image sensing device 42 together with the light receiver 20, the A/D converter 26, the reference clock signal generating unit 28, the sequencer 30, and the timing correction unit 36. Owing thereto, the clock synchronizing circuit can be implemented in the light receiver driver 34, whereby a countermeasure is enabled therein for outputting the light reception timing signal Pr4 in synchronism with the clock signal. Accordingly, it is comparatively easy for the light reception timing signal Pr4, which is synchronized with the clock signal in the same manner as the light reception reference signal Pr2, to be supplied directly to the light receiver 20.

On the other hand, since it is problematic for the light emitter 16 to be implemented as part of the solid-state image sensing device 42, the aforementioned light emitter driver 32 and the light emitter 16 are arranged outside of the solid-state image sensing device 42. For this reason, the timing difference (phase difference) between the light emission reference signal Pe2 from the sequencer 30 and the light emission timing signal Pe4 from the light emitter driver 32 is influenced by the temperature and humidity of the surrounding environment, and it is difficult to maintain a stable timing difference.

Thus, the timing correction unit 36 is interposed between the sequencer 30 and the light emitter driver 32, and generates the light emission timing adjustment signal Pe3, which is delay-controlled with respect to the light emission reference signal Pe2 such that the delay difference between the light emission reference signal Pe2 from the sequencer 30 and the light emission timing signal Pe4 from the light emitter driver 32 is always kept constant, and by supplying the light emission timing adjustment signal Pe3 to the light emitter driver 32, synchronism between the light emission reference signal Pe2 and the light emission timing signal Pe4, as well as synchronism between the light emission timing signal Pe4 and the light reception timing signal Pr4 are realized.

An exemplary outline configuration of the timing correction unit 36 will be described with reference to FIG. 2.

Figure 2:
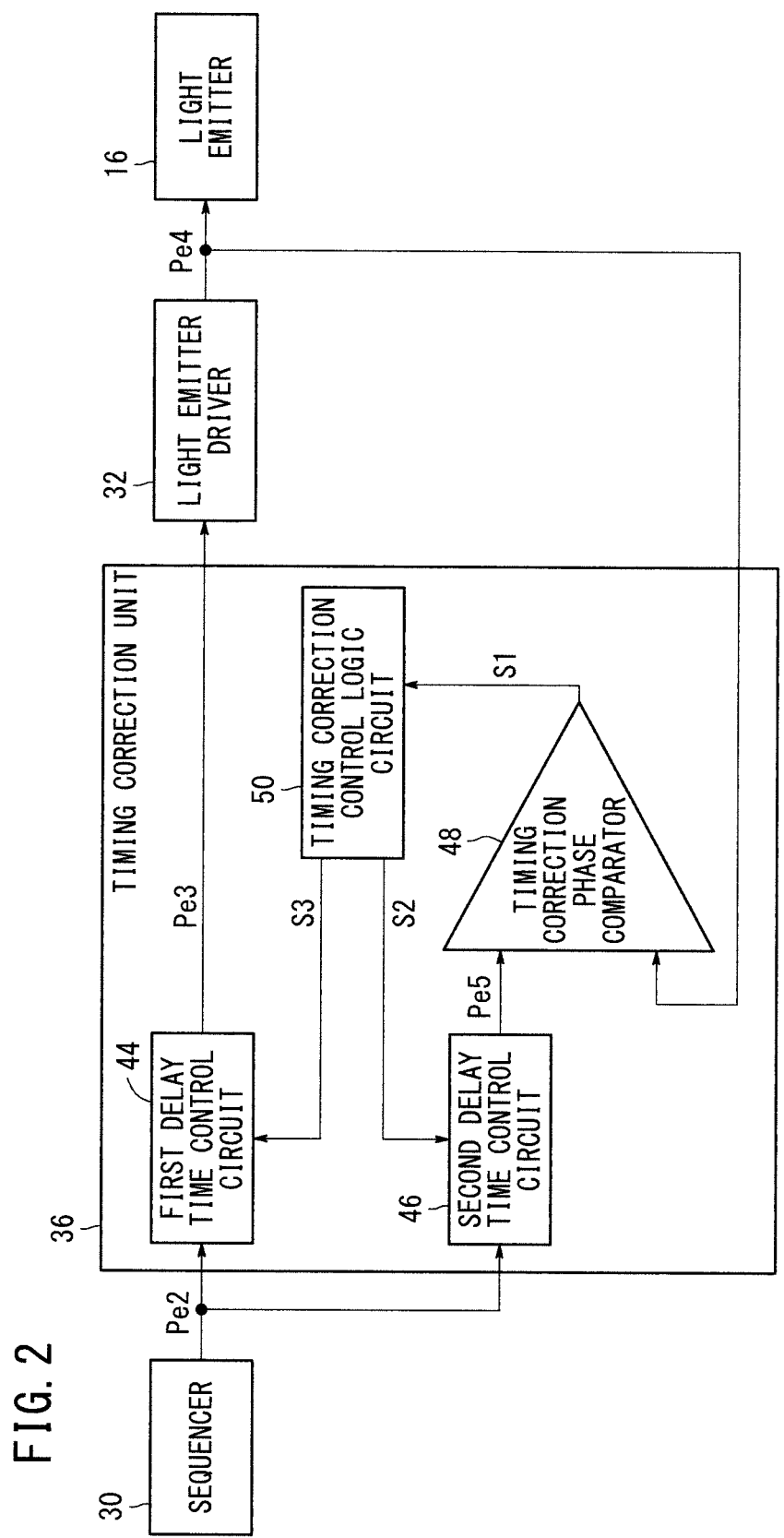
FIG. 2 is a block diagram illustrating in outline the structural configuration of a timing correction unit.

As shown in FIG. 2, the timing correction unit 36 includes a first delay time control circuit 44, a second delay time control circuit 46, a timing correction phase comparator 48, and a timing correction control logic circuit 50.

The light emission reference signal Pe2 from the sequencer 30 is input to the first delay time control circuit 44. The light emission reference signal Pe2, the timing of which is delay-controlled in the first delay time control circuit 44, is output to the light emitter driver 32 as the light emission timing adjustment signal Pe3.

Figure 3A:
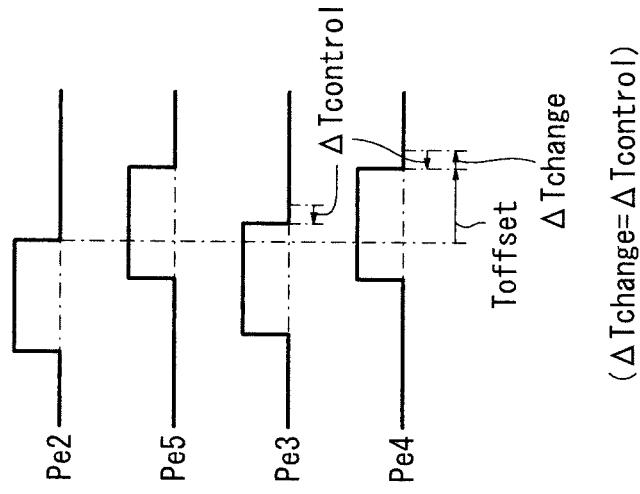
FIG. 3A is an explanatory drawing showing a condition in which a light emission timing signal and an offset signal are maintained in synchronism.

The light emission reference signal Pe2 from the sequencer 30 also is input to the second delay time control circuit 46. At a time that the first distance measuring system 10A is shipped or following calibration thereof, the second delay time control circuit 46 sets (or resets) a delay time (offset time) in accordance with an offset adjusting signal S2 from the timing correction control logic circuit 50. More specifically, as shown in FIG. 3A, a time shift, and more specifically an offset time Toffset, exists between a time at which the light emission reference signal Pe2, for example, falls (or rises) and a time at which the light emission timing signal Pe4, for example, falls (or rises). The offset time Toffset varies depending on an elapsed time change of the first distance measuring system 10A. Thus, at the time that the first distance measuring system 10A is shipped, and when periodic or non-periodic calibration is carried out thereafter, the offset time Toffset is read, and information of the read offset time Toffset is supplied to the timing correction control logic circuit 50. Then, the offset adjusting signal S2 is output corresponding to a new offset time Toffset from the timing correction control logic circuit 50, and by supplying the same to the second delay time control circuit 46, the offset time Toffset is set (or reset) in the second delay time control circuit 46. Consequently, the light emission reference signal Pe2, which is input to the second delay time control circuit 46, is delayed by the set offset time Toffset, and is output therefrom as an offset signal Pe5.

Figure 3B:
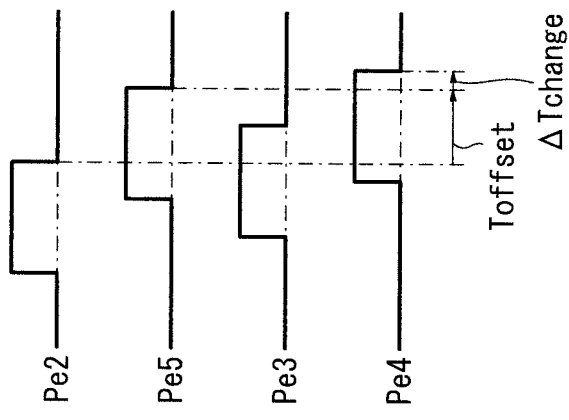
FIG. 3B is an explanatory drawing showing a condition in which a light emission timing signal is phase delayed with respect to an offset signal due to an influence of the surrounding environment.

The offset signal Pe5 from the second delay time control circuit 46 is input to a first input terminal, whereas the light emission timing signal Pe4 from the light emitter driver 32 is input to a second input terminal of the timing correction phase comparator 48. The timing correction phase comparator 48, for example as shown in FIG. 3B, detects a time difference (phase difference ΔTchange) between the time at which the offset signal Pe5 falls, for example, and the time at which the light emission timing signal Pe4 falls, for example, and outputs the same as a phase comparison result from an output terminal of the timing correction phase comparator 48. In particular, the timing correction phase comparator 48 produces by conversion a digital signal responsive to the time difference (phase difference ΔTchange) between the offset signal Pe5 and the light emission timing signal Pe4, outputs the digital signal as the phase comparison result S1, and inputs the phase comparison result S1 to the timing correction control logic circuit 50.

The timing correction control logic circuit 50 generates and outputs a delay adjusting signal S3 based on the phase comparison result S1 which is input thereto, and the delay adjusting signal S3 is input to the first delay time control circuit 44. Based on the input delay adjusting signal S3, the first delay time control circuit adjusts a delay time of the light emission reference signal Pe2, and outputs the same as the light emission timing adjustment signal Pe3. Assuming that the light emission timing adjustment signal Pe3 is an analog signal, the light emission timing adjustment signal Pe3 may be represented by a voltage value, a current value, or the like. The delay adjusting signal S3 may also be a digital signal. The functions of the timing correction control logic circuit 50 may also be replaced and realized by an embedded computer equipped with a CPU and a memory external to the solid-state image sensing device 42, or by dedicated hardware such as a field programmable gate array (FPGA) or the like.

Figure 3C:
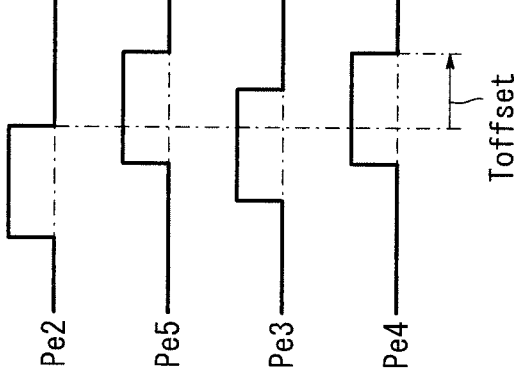
FIG. 3C is an explanatory drawing showing a condition in which a phase delay is absorbed by a feedback control of the timing correction unit.

For example, as shown in FIG. 3B, due to the influence of the surrounding environment, in the event that the light emission timing signal Pe4 is delayed by a time (hereinafter referred to as a time change) beyond the offset time Toffset, the timing correction phase comparator detects a phase difference ΔTchange (time change), outputs the phase comparison result S1, and the timing correction control logic circuit 50 outputs the delay adjusting signal S3 based on the phase comparison result S1. The first delay time control circuit 44 delays the light emission reference signal Pe2 by a time which is based on the delay adjusting signal S3, and outputs as the light emission timing adjustment signal Pe3. In other words, as shown in FIG. 3C, the first delay time control circuit 44 delays the light emission reference signal Pe2 by a time (ΔTcontrol), which is the same as the aforementioned phase difference ΔTchange (time change), adjusts the timing of the light emission reference signal Pe2, and outputs the same as the light emission timing adjustment signal Pe3 to the light emitter driver 32. As a result, the time at which the light emission timing signal Pe4 falls, for example, and the time at which the offset signal Pe5 falls, for example, become synchronized, and the time change due to the surrounding environment is absorbed in accordance with a feedback control, whereby a light emission timing signal Pe4, which is accurate in terms of timing, can be supplied to the light emitter 16. In accordance therewith, the distance to the target object 12 can be measured without being affected or influenced by the surrounding environment.

Incidentally, assuming that a clock signal having a clock frequency, for example, of 250 MHz is used as the reference clock signal clk, even if rising and falling of the clock pulse are utilized as trigger timings for the circuit, the time resolution thereof is on the order of 2 nsec. Although the emitted light 14 propagates, for example, at roughly 300 mm in 1 nsec, with the first distance measuring system 10A, for measuring the round trip optical path, the distance corresponds to 150 mm when the distance value is calculated. Owing thereto, when timing is adjusted at a time resolution of 2 nsec, the adjustment occurs in distance value units of 300 mm, and thus, timing adjustments at a lower measurement distance resolution cannot be performed. For example, for obtaining a distance measuring capability on the order of, for example, a few millimeters, a time resolution on the order of a few tens of psec is required.

Thus, with the present embodiment, the first delay time control circuit 44, the second delay time control circuit 46, and the timing correction phase comparator 48 are constituted in circuits having respective first delay lines and second delay lines. By applying to each of the first delay lines a first delay adjusting bias (voltage), which is generated by a first delay locked loop, and applying to each of the second delay lines a second delay adjusting bias (voltage), which is generated by a second delay locked loop, respective delay times $\tau 1$ at plural delay elements constituting the first delay line, and respective delay times $\tau 2$ at plural delay elements constituting the second delay line are made to differ from each other. Furthermore, with the first delay time control circuit 44 and the second delay time control circuit 46, the path from the first delay line to the second delay line is variable, thus enabling a time resolution of $|\tau 1 - \tau 2|$ to be obtained, and with the timing correction phase comparator 48, by using a caliper principle (Vernier principle) in a TDC circuit, phase comparison can be performed at a time resolution of $|\tau 1 - 2|$. As a result, a time resolution on the order of a few psec to a few tens of psec can be realized, thereby assuring distance measuring precision on the order of a few millimeters.

An exemplary detailed circuit configuration of the timing correction unit 36 will be described with reference to FIGS. 4 through 32.

Initially, as shown in FIG. 4, a timing correction unit (hereinafter referred to as a first timing correction unit 36*a*) according to a first detailed example includes a first delay locked loop 52*a*, a second delay locked loop 52*b*, the first delay time control circuit 44, the second delay time control circuit 46, the timing correction phase comparator 48, and the timing correction control logic circuit 50.

As shown in FIG. 5A, the first delay locked loop 52*a* includes a first delay line DL1 to which the reference clock signal clk is input, a plurality of first selectors 56*a* that set a number of delay stages of the first delay line DL1 based on a first delay stage number control signal Sprec1, a first clock phase comparator 58*a* that detects a phase difference between an output from the first delay line DL1 and the reference clock signal clk, a first charge pump 60*a* that generates addition or subtraction charges based on the output signal from the first clock phase comparator 58*a*, and a first low pass filter 62*a* that accumulates output charges from the first charge pump 60*a* and outputs the same as a first delay adjusting bias Vb1 (voltage). The first delay adjusting bias Vb1 is supplied to the first delay line DL1, thereby forming a feedback loop for the first delay locked loop 52*a*, and enabling the first delay adjusting bias Vb1 to be output to the exterior.

The first delay line DL1 is constituted by connecting in series a plurality of first delay elements 64*a*, and by providing respective first selectors 56*a*, which are connected in a previous stage of each of the first delay elements 64*a*. Each of the first delay elements 64*a* is constituted, for example, from an inverter delay element, the delay time of which is controlled by the first delay adjusting bias Vb1. Each of the first selectors 56*a* is formed so as to select a path responsive to a binary value ("1" or "0") corresponding respectively to the first delay stage number control signal Sprec1. For example, the first one of the first selectors 56*a* as viewed from the input side selects either one of a reference clock signal clk or a ground voltage Vss responsive to the binary value of, for example, the MSB (Most Significant Bit) of the first delay stage number control signal Sprec1. In this example, the reference clock signal clk is selected when the binary value is "1", whereas the ground voltage Vss is selected when the binary value is "0". The second one of the first selectors 56*a* and those thereafter as viewed from the input side select the reference clock signal clk when the binary value is "1", and selects the output from its immediately previous first delay element 64*a* when the binary value is "0". More specifically, the number of delay stages is controlled in accordance with the plurality of first selectors 56*a*. Accordingly, for example, assuming a case in which sixteen first delay elements 64*a* are connected in series with respective first selectors 56*a* being interposed therebetween, for a case in which fourteen individual first delay elements 64*a* are utilized as the first delay line DL1, the following bit train, as the first delay stage number control signal Sprec1,

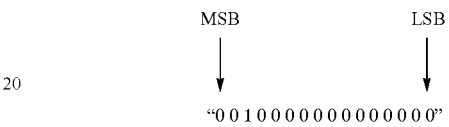

is supplied from a time resolution setting unit 51 (see FIG. 4). Consequently, a first delay line DL1 is formed, which is constituted from fourteen individual first delay elements 64*a*, in which the fourteenth first selector 56*a* as viewed from the output side selects the reference clock signal clk, and each of the first through thirteenth first selectors 56*a* as viewed from the output side selects the output from its immediately previous first delay element 64*a*. It should be noted that, in actual practice, the first delay line DL1 may utilize one hundred or more separate first delay elements 64*a*.

With the first delay locked loop 52*a*, the first delay line DL1 operates so as to delay the reference clock signal clk by one period, and the rise timings or fall timings of the output of the first delay line DL1 and the reference clock signal clk are compared by the first clock phase comparator 58*a*. Based on the comparison result, and through operation of the first charge pump 60*a* and the first low pass filter 62*a*, a feedback control is continuously performed so as to cancel out the phase difference between the output of the first delay line DL1 and the reference clock signal clk. Consequently, the first delay adjusting bias Vb1 is obtained in order to generate the delay value ($\tau 1$) of the first delay line DL1. When the circuit is powered up or at the time of startup of the circuit, there is a possibility for locking (pseudo-locking) of a two period delay, a three period delay, or the like to occur, as a result of the first delay adjusting bias Vb1 not being determined. In order to avoid pseudo-locking, immediately prior to powering up or startup of the circuit, a countermeasure may be implemented to apply a predetermined optional voltage, so as to always assure the one period delay operation. As the number of first delay elements 64*a* increases, the delay time ($\tau 1$) of each of the first delay elements 64*a* becomes shorter. Moreover, since the first delay locked loop 52*a* includes an autonomous self-feedback function on the basis of the reference clock signal clk, which remains stable with respect to variations in integrated circuit manufacturing or changes in the surrounding environment, the first delay adjusting bias Vb1 can be generated corresponding to such manufacturing variances or changes in the surrounding environment.

As shown in FIG. 5B, the second delay locked loop 52*b* is of the same structure as the above-described first delay locked loop 52*a*, and includes a second delay line DL2 to which the reference clock signal clk is input, a plurality of second selectors 56*b* that set a number of delay stages of the second delay line DL2 based on a second delay stage number control signal Sprec2, a second clock phase comparator 58b that detects a phase difference between an output from the second delay line DL2 and the reference clock signal clk, a second charge pump 60b that generates addition or subtraction charges based on the output signal from the second clock phase comparator 58b, and a second low pass filter 62b that accumulates output charges from the second charge pump 60b and outputs the same as a second delay adjusting bias Vb2 (voltage). The second delay adjusting bias Vb2 is supplied to the second delay line DL2, thereby forming a feedback loop for the second delay locked loop 52b, and enabling the second delay adjusting bias Vb2 to be output to the exterior.

The second delay line DL2 is constituted by connecting in series a plurality of second delay elements 64b, and providing respective second selectors 56b, which are connected in a previous stage of each of the second delay elements 64b. Each of the second delay elements 64b is constituted, for example, from an inverter delay element, the delay time of which is controlled by the second delay adjusting bias Vb2. Concerning the configurations of the second delay elements 64b, the second selectors 56b, and the second delay stage number control signal Sprec2, since they are the same as those of the first delay elements 64a, the first selectors 56a, and the first delay stage number control signal Sprec1, such features will not be described again.

In the second delay locked loop 52b as well, the second delay line DL2 operates so as to delay the reference clock signal clk by one period, and the rise timings or fall timings of the output of the second delay line DL2 and the reference clock signal clk are compared by the second clock phase comparator 58b. Based on the comparison result, and through operation of the second charge pump 60b and the second low pass filter 62b, a feedback control is continuously performed so as to cancel out the phase difference between the output of the second delay line DL2 and the reference clock signal clk. Consequently, the second delay adjusting bias Vb2 is obtained in order to generate the delay value (τ2) of the second delay line DL2. Further, in order to avoid pseudo-locking, immediately prior to powering up or startup of the circuit, a countermeasure may be implemented to apply a predetermined optional voltage, so as to always assure the one period delay operation. As the number of the second delay elements 64b increases, the delay time (τ2) of each of the second delay elements 64b becomes shorter.

Incidentally, the circuit configuration and transistor size or the like that make up the circuitry of the first delay elements 64a and the second delay elements 64b are mutually the same. Accordingly, assuming that the number of first delay elements 64a selected by the first delay line DL1 and the number of second delay elements 64b selected by the second delay line DL2 are the same, the delay time of each of the first delay elements 64a (i.e., the first delay time τ1) and the delay time of each of the second delay elements 64b (i.e., the second delay time τ2) are the same.

However, with the present embodiment, for the purpose of using the caliper principle, a difference is maintained between the first delay time τ1 and the second delay time τ2. For this reason, a difference is maintained between the number of first delay elements 64a selected by the first delay line DL1, and the number of second delay elements 64b selected by the second delay line DL2. For example, the number of first delay elements 64a is greater than the number of second delay elements 64b, the first delay time τ1 is a few hundred psec, and the second delay time τ2 is (a few hundred+a few tens) psec. At this time, the difference between the delay times |τ1−τ2| is on the order of a few tens of psec.

Figure 6:
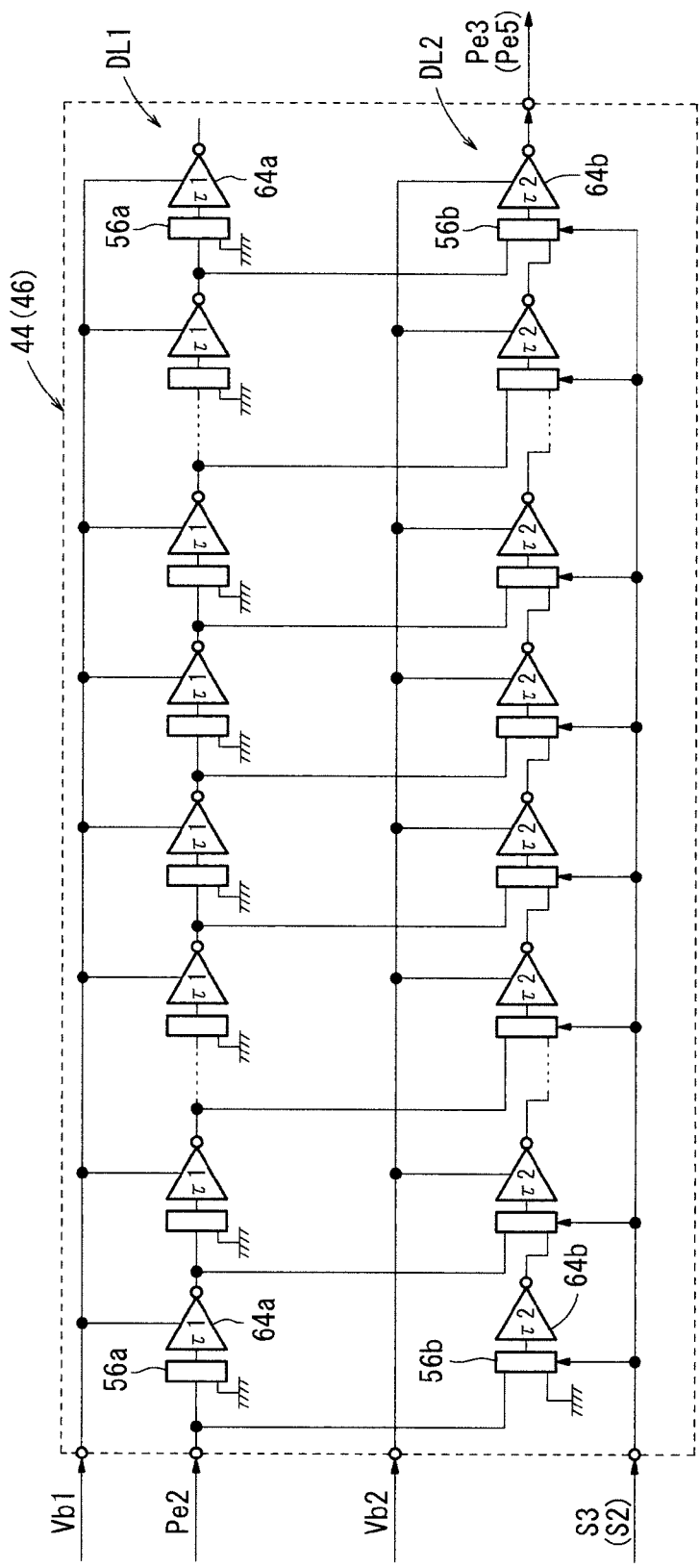
FIG. 6 is a block diagram showing the internal configuration of a first delay time control circuit and a second delay time control circuit in the first timing correction unit.

As shown in FIG. 6, the first delay time control circuit 44 includes a first delay line DL1 having a configuration similar to that of the first delay line DL1 of the first delay locked loop 52a and to which the light emission reference signal Pe2 is input, a second delay line DL2 having a configuration similar to that of the second delay line DL2 of the second delay locked loop 52b and to which the same light emission reference signal Pe2, or a signal from the light emission reference signal Pe2 by way of the first delay line DL1 is input, and a plurality of second selectors 56b that switch the path from the first delay line DL1 to the second delay line DL2 based on the delay adjusting signal S3.

The first delay line DL1 is constituted by connecting in series a plurality of first delay elements 64a, and by providing respective first selectors 56a, which are connected in a previous stage of each of the first delay elements 64a. Each of the first selectors 56a is a characteristic dummy, which is connected for the purpose of aligning with the load of the second delay line DL2. The first one of the first selectors 56a as viewed from the input side selects the light emission reference signal Pe2 in a fixed manner, whereas the second one of the first selectors 56a and those thereafter as viewed from the input side select in a fixed manner the output from the immediately previous first delay element 64a. The output side end (terminus) of the first delay line DL1 also is connected to a characteristic dummy inverter delay circuit, for the purpose of matching the load characteristics of the delay line final stage with the characteristics before the final stage.

The second delay line DL2 is constituted by connecting in series a plurality of second delay elements 64b, and by providing respective second selectors 56b, which are connected in a previous stage of each of the second delay elements 64b. Each of the second selectors 56b is formed so as to select a path responsive to a binary value ("1" or "0") corresponding respectively to the delay adjusting signal S3. For example, the first one of the second selectors 56b as viewed from the input side selects one of the light emission reference signal Pe2 and a ground voltage Vss responsive to the binary value of, for example, the MSB (Most Significant Bit) of the delay adjusting signal S3. In this example, the light emission reference signal Pe2 is selected when the binary value is "1" whereas the ground voltage Vss is selected when the binary value is "0". The second one of the second selectors 56b and those thereafter as viewed from the input side select the output from its immediately previous first delay element 64a when the binary value is "1", and select the output from its immediately previous second delay element 64b when the binary value is "0".

Accordingly, for example, assuming a case in which sixteen first delay elements 64a are connected in series with respective first selectors 56a being interposed therebetween, and sixteen second delay elements 64b are connected in series with respective second selectors 56b being interposed therebetween, for a case in which two individual first delay elements 64a are selected as the first delay line DL1, and fourteen individual second delay elements 64b are selected as the second delay line DL2, the following bit train,

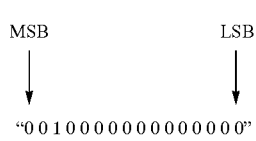

is supplied as the delay adjusting signal S3 from the timing correction control logic circuit 50. Consequently, a path is selected from the second one of the first delay elements 64a as viewed from the input side to the third one of the second delay elements 64b as viewed from the input side, and as a result, a light emission timing adjustment signal Pe3 is output in which the light emission reference signal Pe2 is delayed by a delay time of $\{(2 \times \tau 1)+(14 \times \tau 2)\}$. Similarly, in the case that three individual first delay elements 64a are selected as the first delay line DL1, and thirteen individual second delay elements 64b are selected as the second delay line DL2, a path is selected from the third one of the first delay elements 64a as viewed from the input side to the fourth one of the second delay elements 64b as viewed from the input side, and as a result, a light emission timing adjustment signal Pe3 is output in which the light emission reference signal Pe2 is delayed by a delay time of $\{(3 \times \tau 1)+(13 \times \tau 2)\}$. The difference between the former and the latter delay times is given by $|\{(2 \times \tau 1)+(14 \times \tau 2)\}-\{(3 \times \tau 1)+(13 \times \tau 2)\}|=|\tau 2-\tau 1|$, such that by switching the path by means of the second selectors 56b, a time resolution equivalent to $|\tau 2-\tau 1|$ can be obtained. In the foregoing example, a case has been shown in which sixteen first delay elements 64a and sixteen second delay elements 64b are used, however, in actual practice, one hundred or more first delay elements 64a and one hundred or more second delay elements 64b may be used.

The second delay time control circuit 46 has substantially the same configuration as the aforementioned first delay time control circuit 44, and such features will not be described again. However, the second selectors 56b thereof are formed so as to select a path responsive to a binary value ("1" or "0") corresponding respectively to the offset adjusting signal S2. In the second delay time control circuit 46 as well, by switching the path by means of the second selectors 56b, a time resolution equivalent to $|\tau 2-\tau 1|$ can be obtained.

Figure 7:
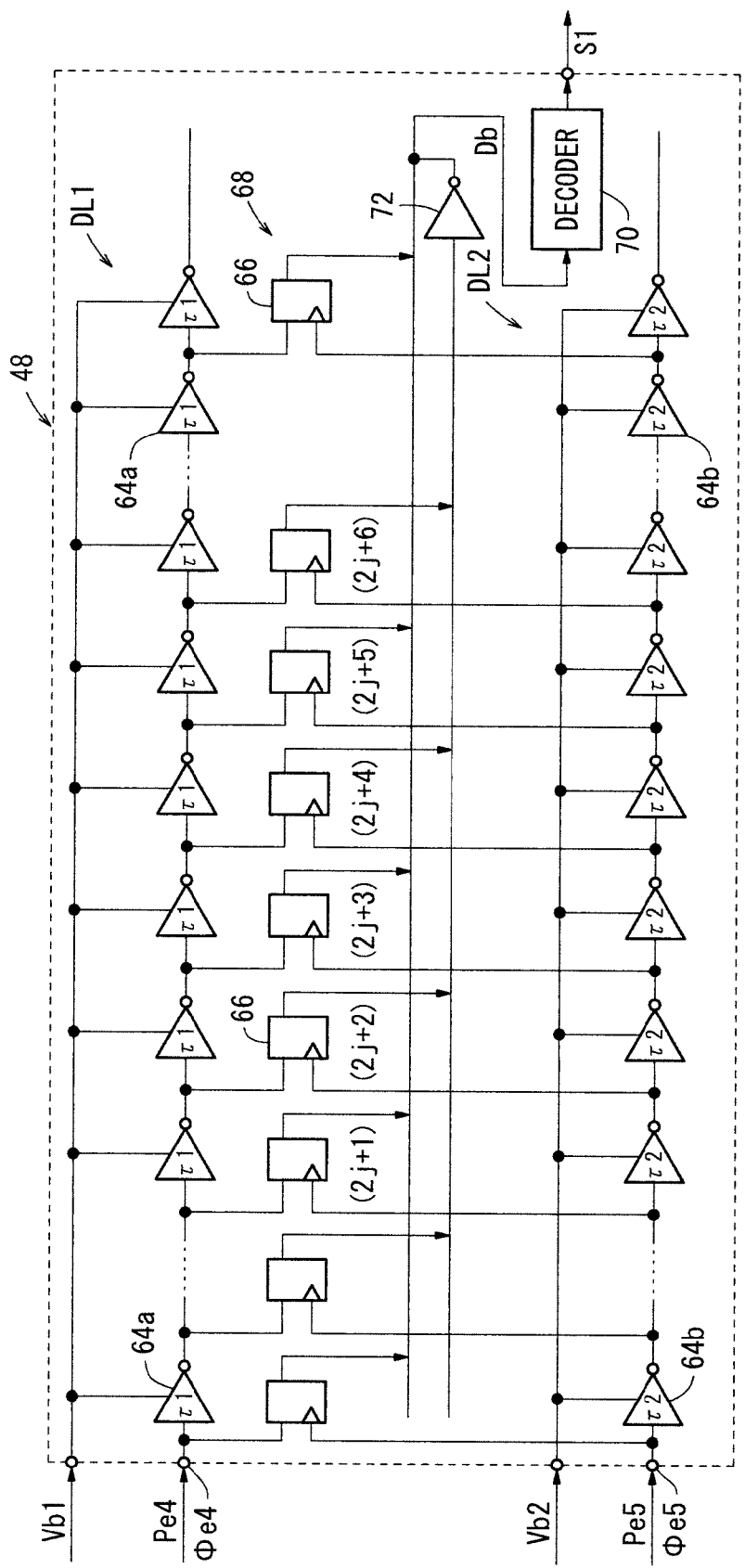
FIG. 7 is a block diagram showing the internal configuration of a timing correction phase comparator in the first timing correction unit.

As shown in FIG. 7, the timing correction phase comparator 48 includes a first delay line DL1 to which the light emission timing signal Pe4 is input, a second delay line DL2 to which the offset signal Pe5 is input, a phase detector 68 having a plurality of flip-flop circuits 66 (characterized herein by D-type flip-flops), which are disposed correspondingly to the delay elements, and a decoder 70.

The first delay line DL1 is constituted by connecting in series a plurality of first delay elements 64a, which are capable of controlling respective delay times by the first delay adjusting bias Vb1. The second delay line DL2 also is constituted by connecting in series a plurality of second delay elements 64b, which are capable of controlling respective delay times by the second delay adjusting bias Vb2. Characteristic dummy delay elements are connected to the final stages of the first delay line DL1 and the second delay line DL2, respectively, so that the load characteristics of the final stages do not differ from the characteristics of those before the final stages.

In accordance with the first delay adjusting bias Vb1 and the second delay adjusting bias Vb2, if the delay time τ2 of the second delay elements 64b is set to be longer than the delay time τ1 of the first delay elements 64a, in the event that the light emission timing signal Pe4 is delayed due to the influence of the surrounding environment, such that the light emission timing signal Pe4 becomes delayed in phase with respect to the offset signal Pe5, as a result of the difference in the aforementioned delay times, the phase delay of the light emission timing signal Pe4 with respect to the offset signal Pe5 gradually becomes smaller, and from an intermediate location of the first delay line DL1 and the second delay line DL2, at this time, the light emission timing signal Pe4 leads in phase with respect to the offset signal Pe5, and the phase lead gradually widens.

The phase detector 68 includes, for example, a number of flip-flop circuits 66 which is one more in number than the number of first delay elements 64a (or second delay elements 64b). Each of such flip-flop circuits 66 is constituted, for example, by a D-type flip-flop. Among the flip-flop circuits 66, the flip-flop circuits 66 that are the same in number as the first delay elements 64a (or the second delay elements 64b) are arranged corresponding to the first delay elements 64a (or the second delay elements 64b), such that the output of a corresponding first delay element 64a is input to the D terminal, and the output of a corresponding second delay element 64b is input to the CK terminal thereof. As for the first flip-flop circuit 66 as viewed from the input side, the light emission timing signal Pe4 is input to the D terminal, whereas the offset signal Pe5 is input to the CK terminal thereof. With the present embodiment, because inverter delay elements are utilized as the first delay elements 64a, the first delay elements 64a output signal waveforms in which the light emission timing signal Pe4 is inverted and delayed. For example, the output waveforms of the odd numbered first delay elements 64a as viewed from the input side represent signal waveforms in which the light emission timing signal Pe4 is inverted and delayed, whereas the output waveforms of the even numbered first delay elements 64a as viewed from the input side represent signal waveforms in which the light emission timing signal Pe4 is simply delayed as is (i.e., non-inverted). Such a feature also is similar for the second delay line DL2, such that the output waveforms of the odd numbered second delay elements 64b as viewed from the input side represent signal waveforms in which the offset signal Pe5 is inverted and delayed, whereas the output waveforms of the even numbered second delay elements 64b as viewed from the input side represent signal waveforms in which the offset signal Pe5 is simply delayed as is (i.e., non-inverted).

Figure 8:
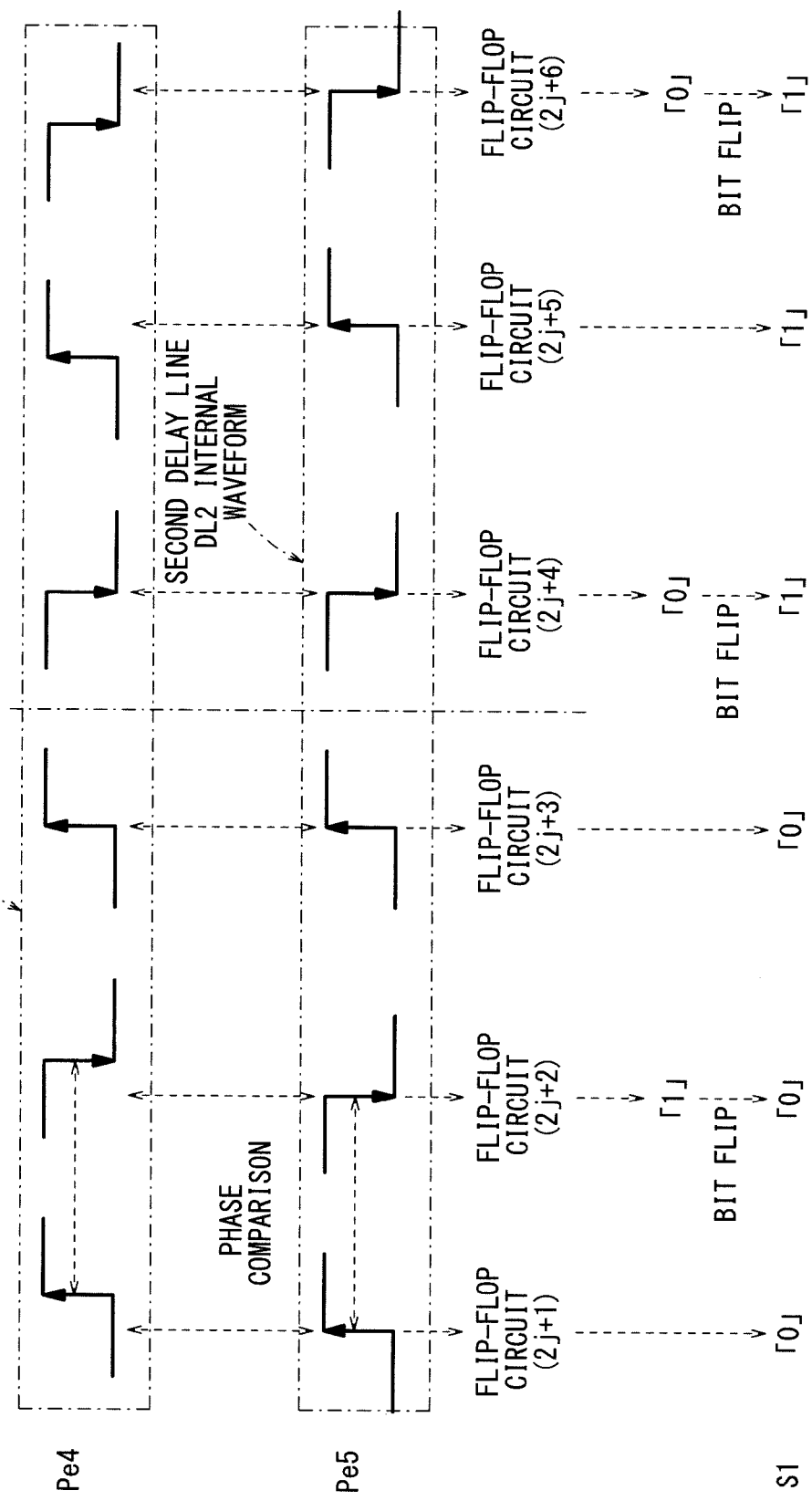
FIG. 8 is a timing chart showing signal processing operations of the timing correction phase comparator.

Accordingly, in the event that the light emission timing signal Pe4 becomes delayed due to the influence of the surrounding environment, as shown in FIG. 8, for example, in the (2j+1)th (odd numbered) flip-flop circuit 66 from the input side, in which the light emission timing signal Pe4 is phase delayed more than the offset signal Pe5, at a point in time when the input of the CK terminal goes High in binary logic, the input to the D terminal goes Low in binary logic, and therefore, a binary value of "0" is output from the Q terminal. Further, for example, in the (2j+2)th (even numbered) flip-flop circuit 66 from the input side, at a point in time when the input of the CK terminal goes Low in binary logic, the input to the D terminal goes High, and therefore, a binary value of "1" is output from the Q terminal. More specifically, the logical values indicative of the phase delay, which are produced by the odd numbered and even numbered flip-flop circuits 66, are mutually inverted logical values.

Similarly, for example, in the (2j+4)th (even numbered) flip-flop circuit 66 from the input side, in which the light emission timing signal Pe4 from an intermediate location of the first delay line DL1 and the second delay line DL2 is more advanced in phase than the offset signal Pe5, at a point in time when the input of the CK terminal goes Low, the input to the D terminal goes Low, and therefore, a binary value of "0" is output from the Q terminal. Further, for example, in the (2j+5)th (odd numbered) flip-flop circuit 66 from the input side, at a point in time when the input of the CK terminal goes High, the input to the D terminal goes High, and therefore, a binary value of "1" is output from the Q terminal. More specifically, the logical values indicative of the phase advance, which are produced by the odd numbered and even numbered flip-flop circuits 66, are mutually inverted logical values.

Thus, a NOT gate 72 (see FIG. 7) is connected, which inverts (bit inverts or flips), for example, outputs from the odd numbered flip-flop circuits 66, such that logical values, which are indicative of the light emission timing signal Pe4 being more delayed in phase than the offset signal Pe5, are made "0" for both the odd numbered and even numbered flip-flop circuits, and logical values, which are indicative of the light emission timing signal Pe4 being more advanced in phase than the offset signal Pe5, are made "1" for both the odd numbered and even numbered flip-flop circuits. As a result, a phase detecting signal Db is obtained having a form in which the logical value thereof is inverted (bit flipped) from "0" to "1" at a point in time that the light emission timing signal Pe4, which is input while being delayed in phase with respect to the offset signal Pe5, overtakes the offset signal at an intermediate location of the first delay line DL1. The decoder 70 decodes the phase detecting signal Db from the phase detector 68, and delivers the same to the timing correction control logic circuit 50.

The following two techniques are presented as examples of decoding techniques performed by the decoder 70.

As shown in the following Chart 1, a first decoding technique converts (by thermometer code conversion) the phase detecting signal Db from the phase detector 68 one-by-one by the arranged numbers of 1 from the least significant bit, and outputs the same as the phase difference value S1 (phase comparison result).

CHART 1

| Phase Detecting Signal (Db) | Phase Difference Value (S1) |
| --- | --- |
| "0000 ... 0000" | 0 |
| "0000 ... 0001" | 1 |
| "0000 ... 0011" | 2 |
| "0000 ... 0111" | 3 |
| ... | ... |
| "0001 ... 1111" | M-3 |
| "0011 ... 1111" | M-2 |
| "0111 ... 1111" | M-1 |
| "1111 ... 1111" | M |

As shown in the following Chart 2, a second decoding technique, from among the phase detecting signals Db from the phase detector 68, converts the number of bits for which the logical value thereof is "1" into a digital value, and outputs the same as the phase difference value S1. In this case, even in the event that the zeros and ones are not continuous due to fluctuations in noise or the like, since decoding can still be carried out, the second technique is considered more preferable than the aforementioned first decoding technique. However, in this case, a circuit is required in the decoder 70 for counting the number of 1s.

CHART 2

| Phase Detecting Signal (Db) | Phase Difference Value (S1) |
| --- | --- |
| Number of 1s is 0 | 0 |
| Number of 1s is 1 | 1 |
| Number of 1s is 2 | 2 |
| Number of 1s is 3 | 3 |
| ... | ... |
| Number of 1s is M-3 | M-3 |
| Number of 1s is M-2 | M-2 |

CHART 2-continued

| Phase Detecting Signal (Db) | Phase Difference Value (S1) |
| --- | --- |
| Number of 1s is M-1 | M-1 |
| Number of 1s is M | M |

With the first timing correction unit 36a, in the first delay time control circuit 44 and the second delay time control circuit 46, a path can be selected between the first delay line DL1, in which plural first delay elements 64a (delay time τ1) are arranged in series, and the second delay line DL2, in which plural second delay elements 64b (delay time τ2) are arranged in series corresponding to the first delay line DL1, thereby obtaining a time resolution of |τ1−2|. Further, with the timing correction phase comparator 48, a caliper principle (Vernier principle) is applied using the first delay line DL1, the second delay line DL2, the flip-flop circuits 66, and the phase detector 68, thereby performing a phase comparison at a time resolution of |τ1−τ2|. Consequently, a time resolution on the order of a few tens of psec can be realized, and distance measuring precision on the order of a few millimeters can be assured.

Next, a timing correction unit (hereinafter referred to as a second timing correction unit 36b) according to a second detailed example will be described with reference to FIGS. 9 and 10.

Figure 9:
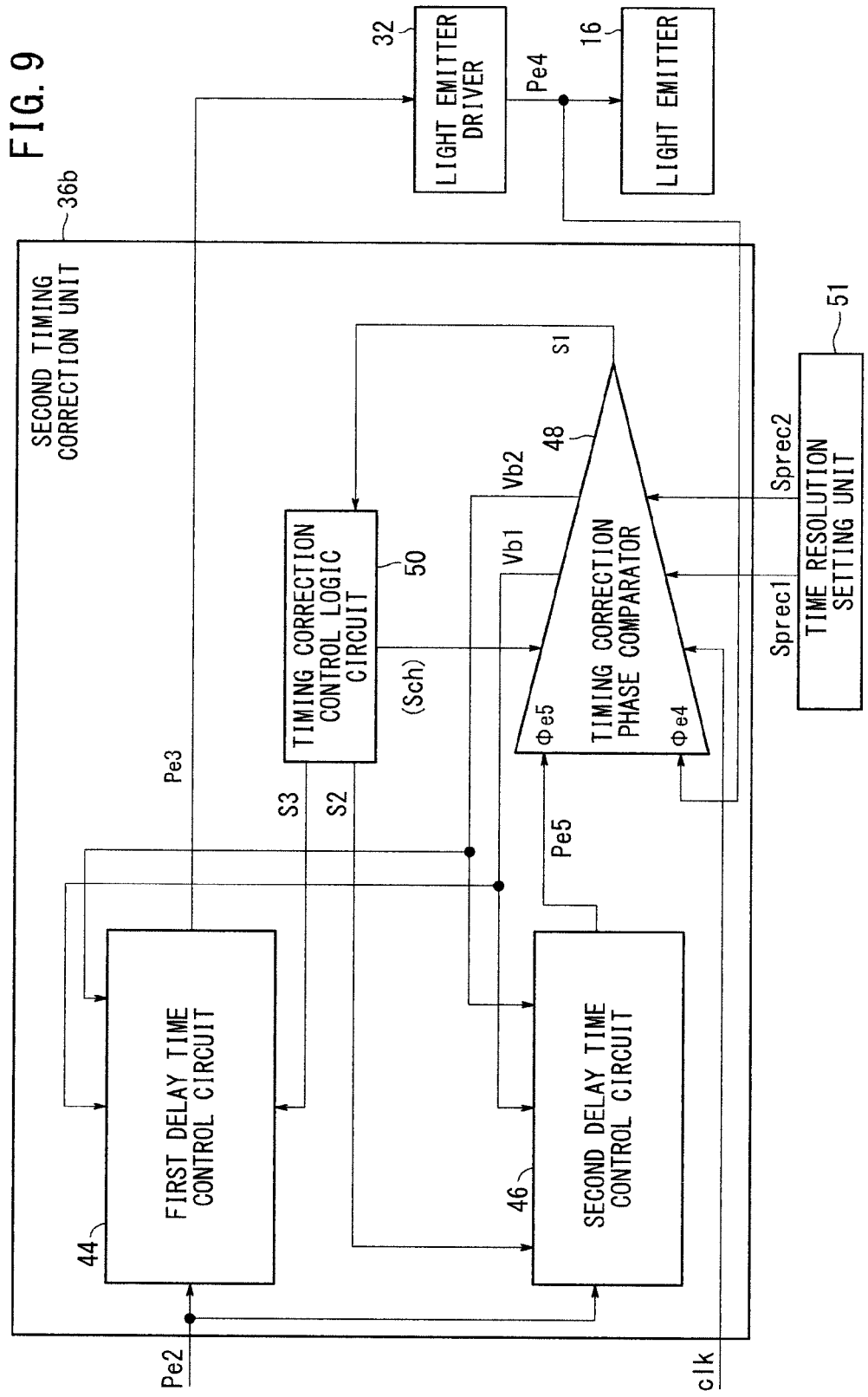
FIG. 9 is a block diagram showing the structural configuration of a second timing correction unit.
Figure 10:
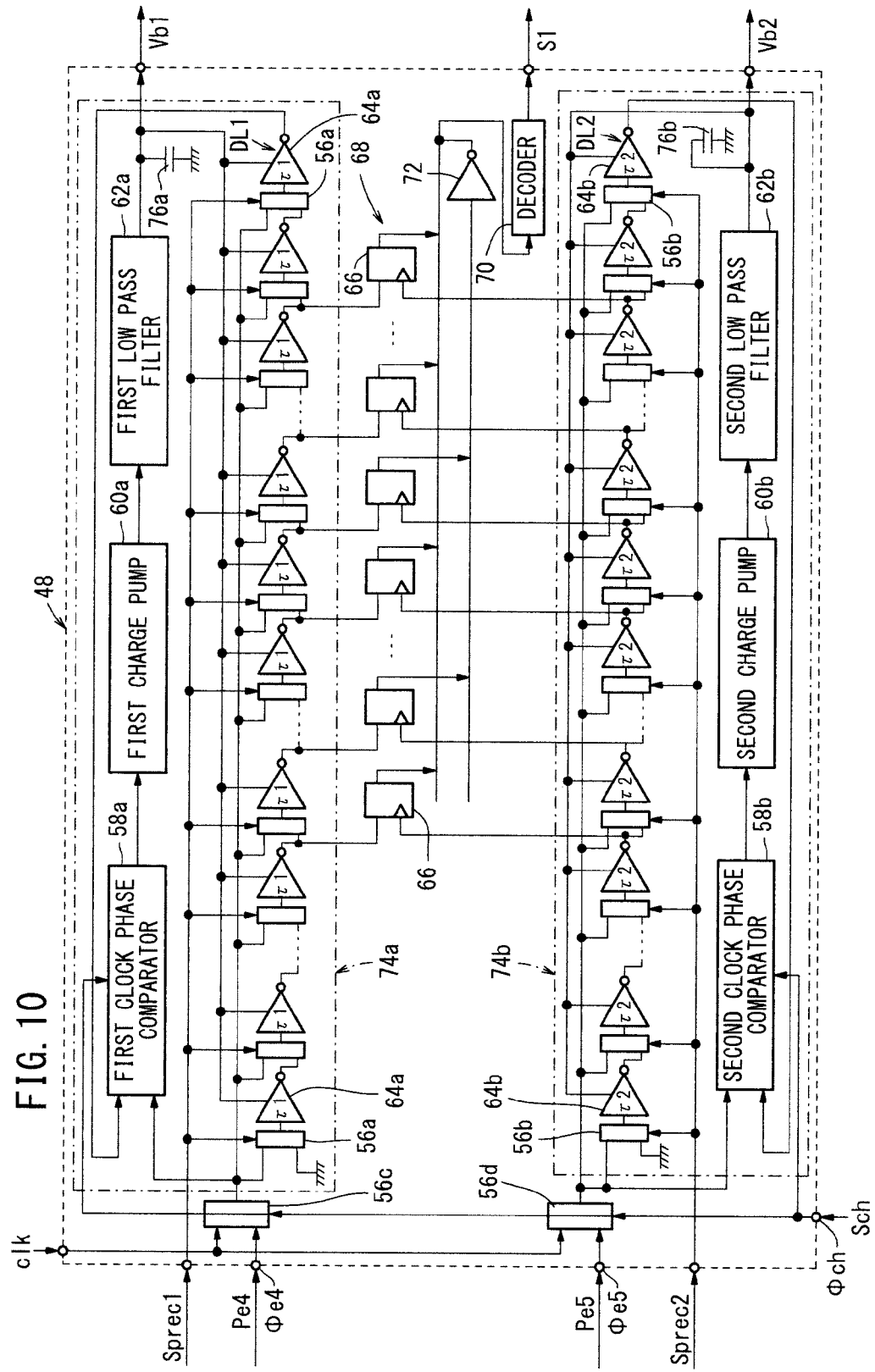
FIG. 10 is a block diagram showing the internal configuration of a timing correction phase comparator in the second timing correction unit.

The second timing correction unit 36b has substantially the same structure as that of the above-described first timing correction unit 36a, however, as shown in FIGS. 9 and 10, differs in that a first delay locked loop unit 74a, and a second delay locked loop unit 74b are incorporated in the timing correction phase comparator 48, so as to allow selective switching between phase comparison operations and delay adjusting bias generating operations, and in that the first delay line DL1 of the timing correction phase comparator 48 and the first delay line DL1 of the first delay locked loop unit 74a are shared in common, and the second delay line DL2 of the timing correction phase comparator 48 and the second delay line DL2 of the second delay locked loop unit 74b are shared in common.

As shown in FIG. 10, the timing correction phase comparator 48 includes a first delay line DL1, a second delay line DL2, a phase detector 68, and a decoder 70. The first delay line DL1 has a configuration similar to that of the first delay line DL1 of the first delay locked loop 52a in the first timing correction unit 36a (i.e., a configuration in which a multiple combination of first selectors 56a and first delay elements 64a are connected together in series), and is capable of being selectively supplied with the reference clock signal clk and the light emission timing signal Pe4. The second delay line DL2 has a configuration similar to that of the second delay line DL2 of the second delay locked loop 52b in the first timing correction unit 36a (i.e., a configuration in which a multiple combination of second selectors 56b and second delay elements 64b are connected together in series), and is capable of being selectively supplied with the reference clock signal clk and the offset signal Pe5.

The timing correction phase comparator 48 further includes a third selector 56c, a fourth selector 56d, the first delay locked loop unit 74a, and the second delay locked loop unit 74b.

The third selector 56c selects either one of the reference clock signal clk and the light emission timing signal Pe4 corresponding to a signal level of an operation switching signal Sch. For example, if the signal level is High in binary logic, the reference clock signal clk is selected, whereas if the signal level is Low in binary logic, the light emission timing signal Pe4 is selected.

The fourth selector 56d selects either one of the reference clock signal clk and the offset signal Pe5 corresponding to a signal level of the operation switching signal Sch. For example, if the signal level is High in binary logic, the reference clock signal clk is selected, whereas if the signal level is Low in binary logic, the offset signal Pe5 is selected.

The first delay locked loop unit 74a includes a plurality of first selectors 56a that set a number of delay stages of the first delay line DL1 based on a first delay stage number control signal Sprec1, a first clock phase comparator 58a that detects a phase difference between an output from the first delay line DL1 and the reference clock signal clk at a time that the delay adjusting bias generating operation is performed (i.e., when the signal level of the operation switching signal Sch is High), a first charge pump 60a that adds or subtracts charges based on a comparison result from the first clock phase comparator 58a, a first low pass filter 62a that accumulates output charges from the first charge pump 60a and outputs the same as a first delay adjusting bias Vb1 (voltage), and a first condenser 76a that retains the first delay adjusting bias Vb1. The first delay adjusting bias Vb1 is output to the exterior, and further, is supplied to the first delay line DL1.

The second delay locked loop unit 74b includes a plurality of second selectors 56b that set a number of delay stages of the second delay line DL2 based on a second delay stage number control signal Sprec2, a second clock phase comparator 58b that detects a phase difference between an output from the second delay line DL2 and the reference clock signal clk at a time that the delay adjusting bias generating operation is performed (i.e., when the signal level of the operation switching signal Sch is High), a second charge pump 60b that adds or subtracts charges based on a comparison result from the second clock phase comparator 58b, a second low pass filter 62b that accumulates output charges from the second charge pump 60b and outputs the same as a second delay adjusting bias Vb2 (voltage), and a second condenser 76b that retains the second delay adjusting bias Vb2. The second delay adjusting bias Vb2 is output to the exterior, and further, is supplied to the second delay line DL2.

Among the plural first delay elements 64a that constitute the first delay line DL1, a selected series of multiple first delay elements 64a is used as the delay line of the first delay locked loop unit 74a for the purpose of generating the first delay adjusting bias Vb1 that sets the delay time τ1 of the first delay elements 64a, and furthermore, a series of multiple first delay elements 64a, which is shared partially in common with the delay line of the first delay locked loop unit 74a, is used for the delay line of the phase comparator. For example, in the case that a series of n first delay elements 64a is used for the phase comparator, whereas a series of m first delay elements 64a is used as the delay line of the first delay locked loop unit 74a, by sharing all or a portion of the delay line, if the number of actual physical delay elements is taken to be k, the inequality k<m+n can be satisfied. In other words, a series of first delay elements 64a having a number of m+n−k can be used in common for both the timing correction phase comparator 48 and the first delay locked loop unit 74a.

Similarly, among the plural second delay elements 64b that constitute the second delay line DL2, a selected series of multiple second delay elements 64b is used as the delay line of the second delay locked loop unit 74b for the purpose of generating the second delay adjusting bias Vb2 that sets the delay time τ2 of the second delay elements 64b, and furthermore, a series of multiple second delay elements 64b, which is shared partially in common with the delay line of the second delay locked loop unit 74b, is used for the delay line of the phase comparator. For example, in the case that a series of n second delay elements 64b is used for the phase comparator, whereas a series of p second delay elements 64b is used as the delay line of the second delay locked loop unit 74b, by sharing all or a portion of the delay line, if the number of actual physical delay elements is taken to be k, the inequality k<p+n can be satisfied. In other words, a series of second delay elements 64b having a number of p+n−k can be used in common for both the timing correction phase comparator 48 and the second delay locked loop unit 74b.

In the second timing correction unit 36b, similar to the aforementioned first timing correction unit 36a, a time resolution on the order of a few tens of psec can be realized, and corrections can be made with a distance measuring precision on the order of a few millimeters. In particular, in the second timing correction unit 36b, since the wiring route to the timing correction phase comparator 48 for the first delay adjusting bias Vb1 and the second delay adjusting bias Vb2 is reduced, an advantage can be expected in that generation of noise is reduced. Further, the first delay locked loop unit 74a and the second delay locked loop unit 74b are incorporated in the timing correction phase comparator 48. The dedicated area occupied by the delay lines in a chip is large for a circuit scale. The delay lines, which occupy such a large dedicated area, can be shared in common, and therefore, the overall occupied area of the chip can be minimized.

Next, a timing correction unit (hereinafter referred to as a third timing correction unit 36c) according to a third detailed example will be described with reference to FIGS. 11 and 12.

Figure 11:
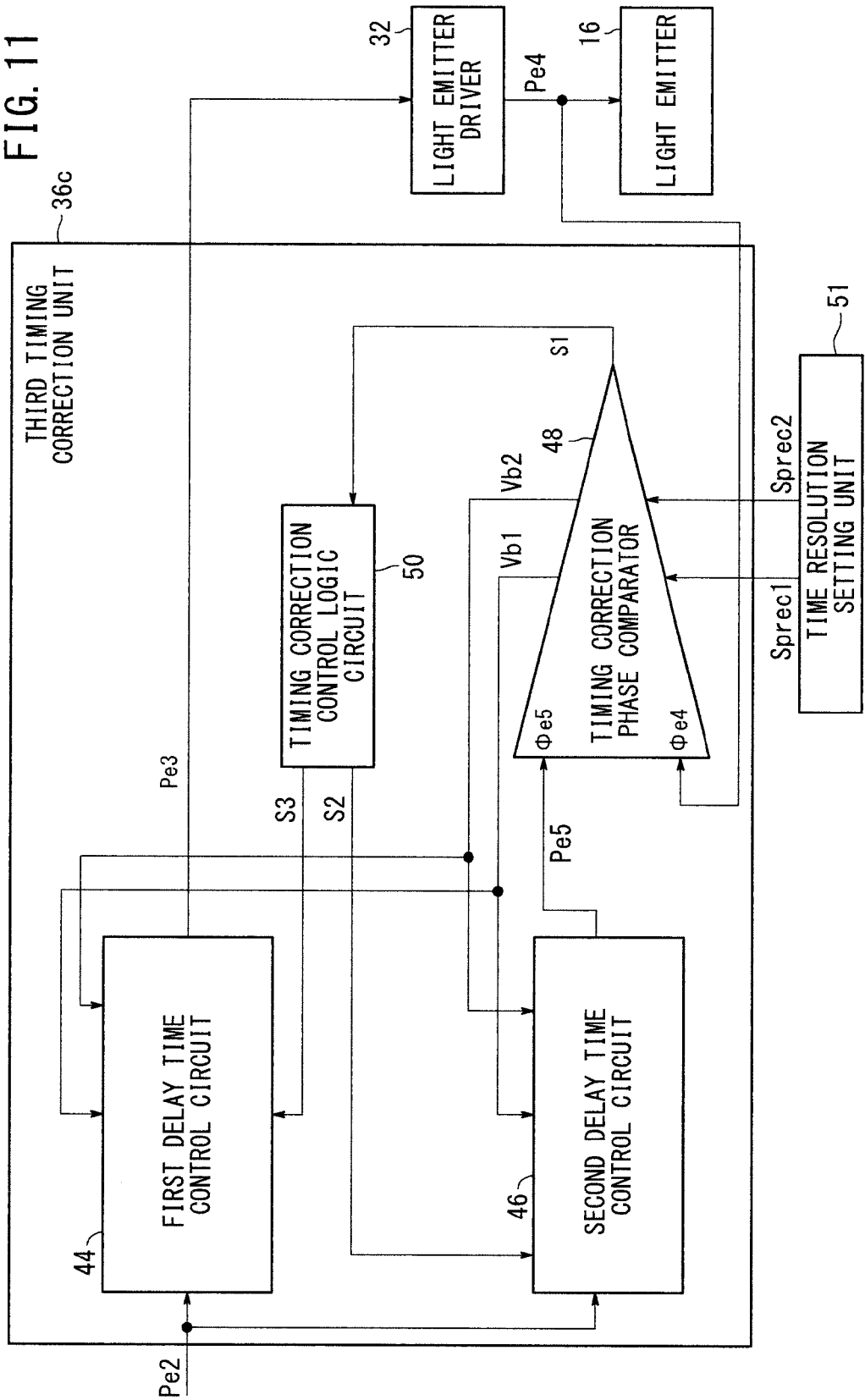
FIG. 11 is a block diagram showing the structural configuration of a third timing correction unit.
Figure 12:
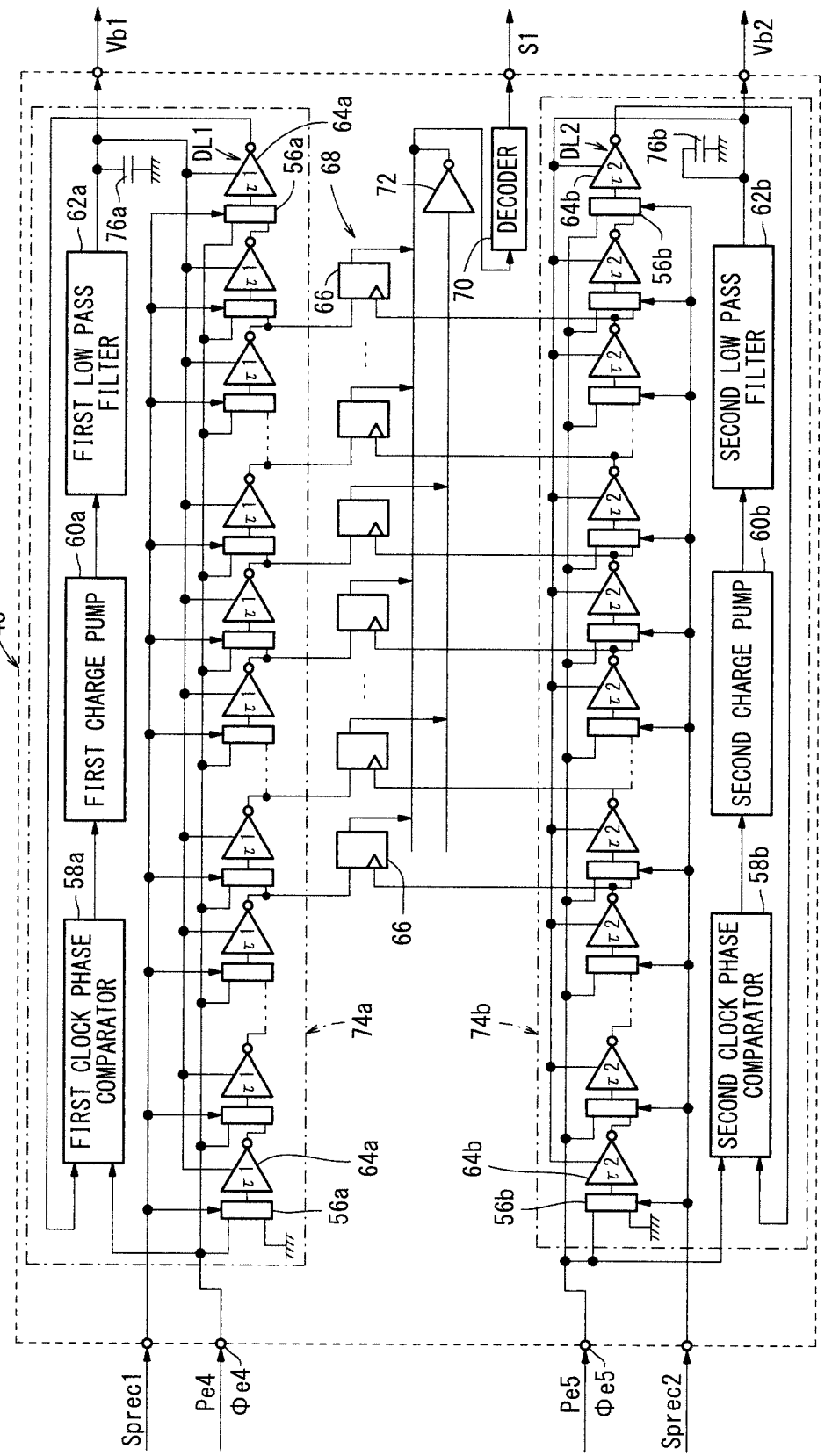
FIG. 12 is a block diagram showing the internal configuration of a timing correction phase comparator in the third timing correction unit.

As shown in FIG. 11, the third timing correction unit 36c is substantially the same as the aforementioned second timing correction unit 36b, but differs in that the reference clock signal clk is not input thereto, and as shown in FIG. 12, the third selector 56c and the fourth selector 56d are not provided.

More specifically, the first delay locked loop unit 74a generates the first delay adjusting bias Vb1 based on the light emission timing signal Pe4 and without using a reference clock signal clk. The second delay locked loop unit 74b generates the second delay adjusting bias Vb2 based on the offset signal Pe5 and without using a reference clock signal clk.

Both of the light emission timing signal Pe4 and the offset signal Pe5 have signal waveforms in which a plurality of pulses appear consecutively, which are the same as in the reference clock signal clk. Assuming that secular changes and environmental changes occur slowly over time, since the phase difference between such consecutive signal waveforms is small, in a similar manner to the reference clock signal clk, the light emission timing signal Pe4 and the offset signal Pe5 can be used as reference signals for generating the first delay adjusting bias Vb1 and the second delay adjusting bias Vb2. Accordingly, the first delay locked loop unit 74a and the second delay locked loop unit 74b are operated autonomously with the consecutively appearing multiple pulses thereof resembling clock pulses, so that even if the reference clock signal clk is not used, the first delay adjusting bias Vb1 and the second delay adjusting bias Vb2 can still be generated by the light emission timing signal Pe4 and the offset signal Pe5.

As a result, an input terminal for the operation switching signal Sch, an input terminal for the reference clock signal clk, the third selector 56c, and the fourth selector 56d (see FIG. 10) can be dispensed with, whereby the circuit configuration of the third timing correction unit 36c can be simplified. However, since a concern exists that the pulse period of the light emission timing signal Pe4 may be changed under the influence of the surrounding environment, there is a possibility that the intended delay time cannot be obtained. Thus, in the first delay locked loop unit 74a as well, the first delay adjusting bias Vb1 may be generated based on the offset signal Pe5 for which changes in the pulse period are comparatively small.

Further, although an example has been shown in which the first condenser 76a and the second condenser 76b are connected for retaining the first delay adjusting bias Vb1 and the second delay adjusting bias Vb2, the first condenser 76a and the second condenser 76b may also be omitted.

Next, a timing correction unit (hereinafter referred to as a fourth timing correction unit 36d) according to a fourth detailed example will be described with reference to FIGS. 13 and 14.

Figure 13:
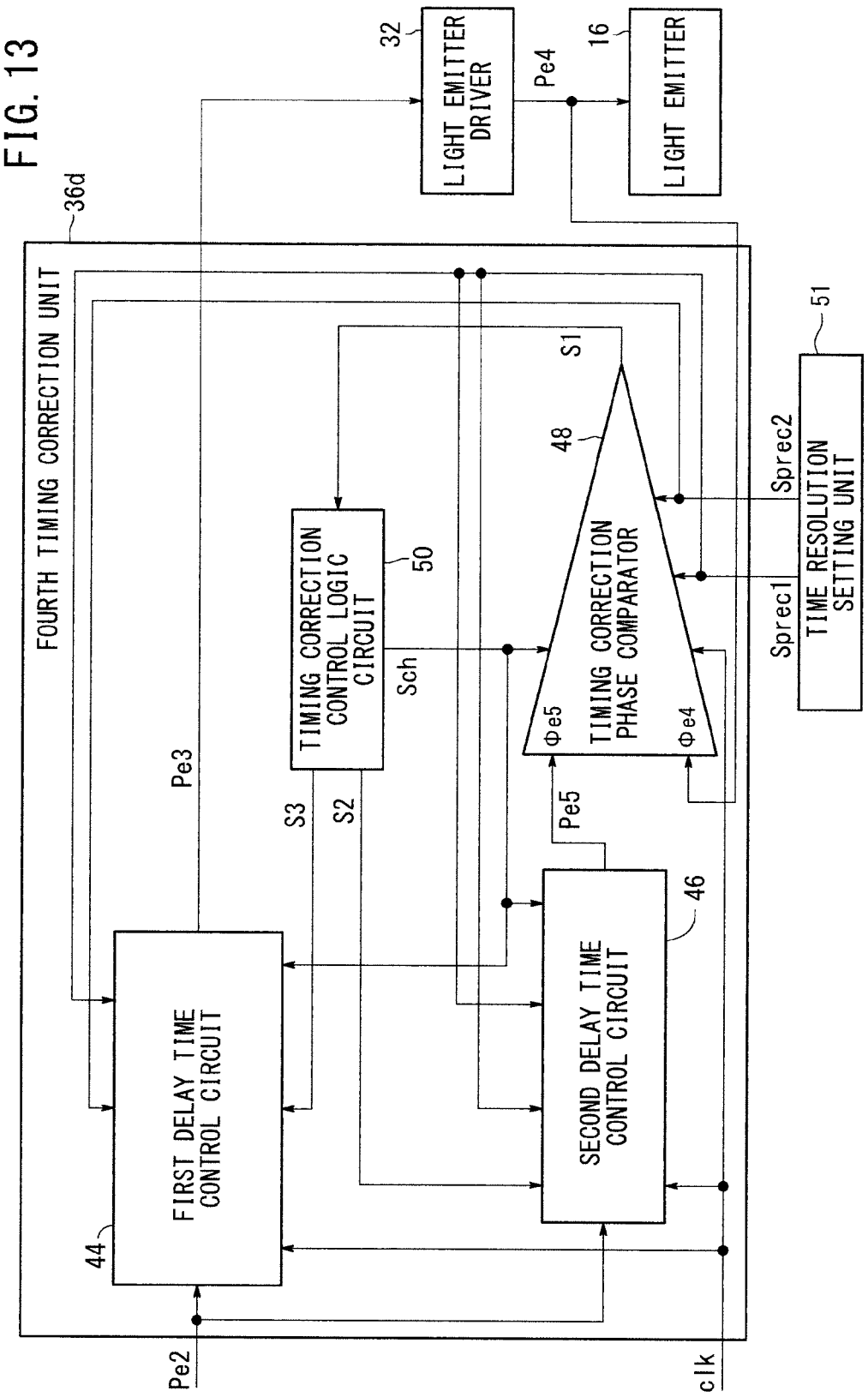
FIG. 13 is a block diagram showing the structural configuration of a fourth timing correction unit.
Figure 14:
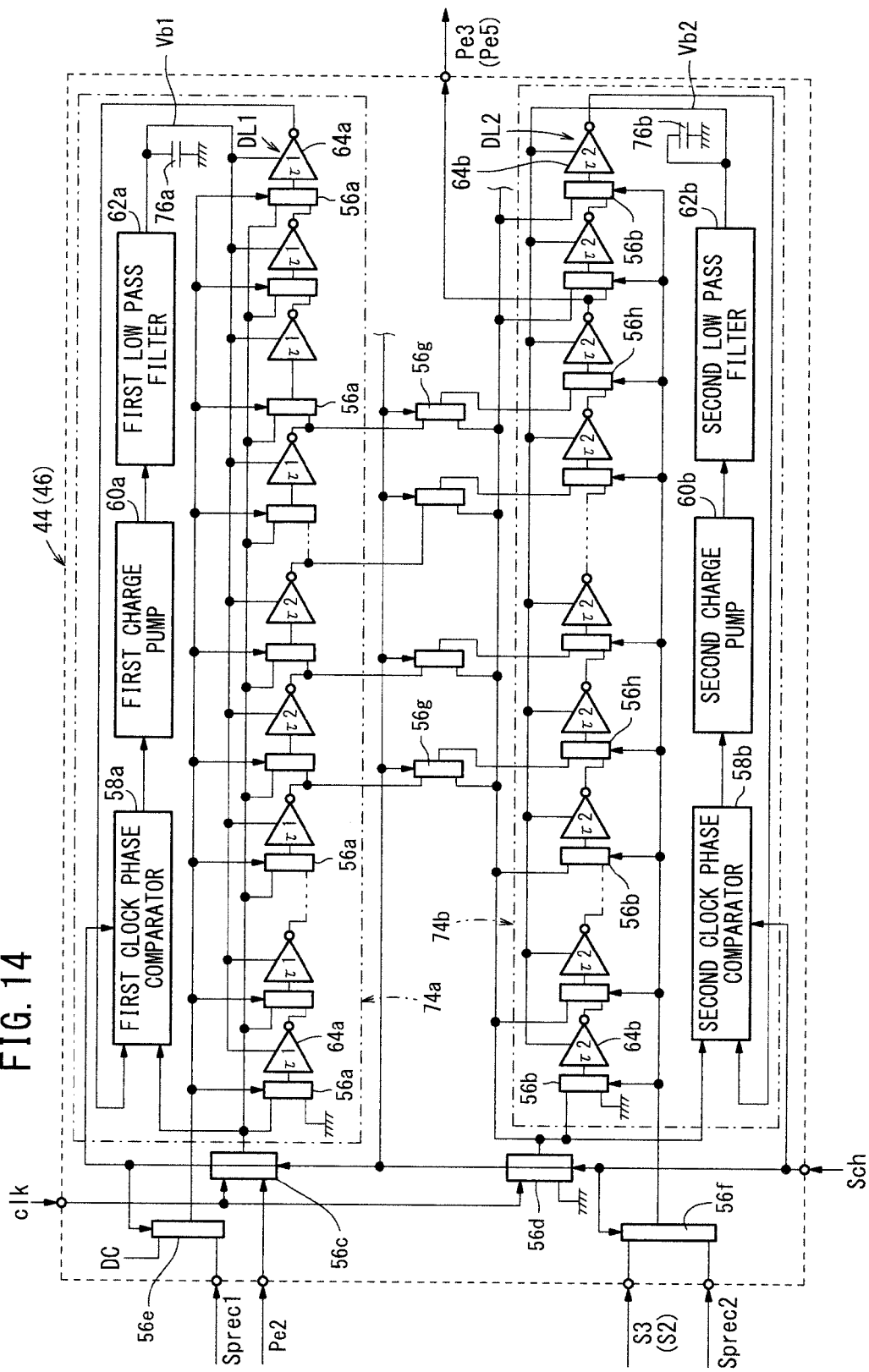
FIG. 14 is a block diagram showing the internal configuration of a first delay time control circuit and a second delay time control circuit in the fourth timing correction unit.

The fourth timing correction unit 36d has substantially the same configuration as that of the aforementioned second timing correction unit 36b, but as shown in FIGS. 13 and 14, differs in that a first delay locked loop unit 74a and a second delay locked loop unit 74b are incorporated respectively in the first delay time control circuit 44 and the second delay time control circuit 46.

The timing correction phase comparator 48 has substantially the same configuration as the timing correction phase comparator 48 of the second timing correction unit 36b, however, as shown in FIG. 13, differs in that a first delay adjusting bias Vb1 and a second delay adjusting bias Vb2 are not output. In other respects, since the internal configuration of the timing correction phase comparator 48 is substantially the same as that shown in FIG. 10, duplicate explanations of such features are omitted.

As shown in FIG. 14, the first delay time control circuit 44 includes a first delay line DL1, a second delay line DL2, a first delay locked loop unit 74a, a second delay locked loop unit 74b, a plurality of first selectors 56a, a plurality of second selectors 56b, a third selector 56c, and a fourth selector 56d, which have substantially the same configurations as those of the timing correction phase comparator 48 shown in FIG. 10, and in addition, includes a fifth selector 56e, a sixth selector 56f, a seventh selector 56g, and a plurality of eighth selectors 56h.

The fifth selector 56e, responsive to the signal level of the operation switching signal Sch, selects either one of a first delay stage number control signal Sprec1 and a fixed signal Dc. For example, if the signal level is High (during the delay adjusting bias generating period), the first delay stage number control signal Sprec1 is selected, whereas if the signal level is Low (when a delay adjustment operation is carried out), the fixed signal Dc is selected.

Each of the first selectors 56a connected to the first delay line DL1 select a path responsive to a binary value ("1" or "0") corresponding respectively to the signal (i.e., the first delay stage number control signal Sprec1 or the fixed signal Dc) selected by the fifth selector 56e. In the event that the fixed signal Dc is selected by the fifth selector 56e, among the series of plural first delay elements 64a that are used for delay-adjusting the light emission reference signal Pe2, the first selector 56a of the first one of the first delay elements 64a as viewed from the input side selects the output from the third selector 56c, whereas the first selectors 56a of the second one of the first delay elements 64a and those thereafter as viewed from the input side select the output from its immediately previous first delay element 64a.

The sixth selector 56f, responsive to the signal level of the operation switching signal Sch, selects either one of the second delay stage number control signal Sprec2 and the delay adjusting signal S3. For example, if the signal level is High, the second delay stage number control signal Sprec2 is selected, whereas if the signal level is Low, the delay adjusting signal S3 is selected.

On the other hand, in the second delay line DL2, respective seventh selectors 56g are connected respectively between the series of plural second delay elements 64b used for delay-adjusting the light emission reference signal Pe2, and the series of plural first delay elements 64a that correspond with the plural second delay elements 64b. Further, in a previous stage of each of the aforementioned series of plural second delay elements 64b, eighth selectors 56h are connected respectively thereto instead of the second selectors 56b.

Each of the seventh selectors 56g, responsive to the signal level of the operation switching signal Sch, selects either one of the output of a corresponding first delay element 64a and the output from the fourth selector 56d. For example, if the signal level is High (during the delay adjusting bias generating period), the output of the fourth selector 56d is selected, whereas if the signal level is Low (when a delay adjustment operation is carried out), the output from the respectively corresponding first delay element 64a is selected.

Each of the second selectors 56b and each of the eighth selectors 56h select paths responsive to binary values ("1" or "0") corresponding respectively to the signal (the second delay stage number control signal Sprec2 or the delay adjusting signal S3) selected by the sixth selector 56f. In the event that the second delay stage number control signal Sprec2 is selected by the sixth selector 56f, since this is during a period in which the delay adjusting bias generating operation is performed, among the plural second selectors 56b, only one of the second selectors 56b corresponding to the second delay stage number control signal Sprec2 selects the output (in this case, the reference clock signal clk) from the fourth selector 56d. In the event that the delay adjusting signal S3 is selected by the sixth selector 56f, since this is during a period in which the delay adjustment operation is carried out, all of the seventh selectors 56g select the outputs from the first delay elements 64a that correspond respectively thereto, and among the plural eighth selectors 56h, only one eighth selector 56h corresponding to the delay adjusting signal S3 selects the output from a corresponding seventh selector 56g.

More specifically, among the plural eighth selectors 56h, only one eighth selector 56h corresponding to the delay adjusting signal S3 is set in the path on the side of the first delay elements 64a, whereas the other eighth selectors 56h are set in the path on the side of the immediately previous second delay elements 64b. As a result, among the series of plural first delay elements 64a used for delay-adjusting the light emission reference signal Pe2, when the number of first delay elements 64a included in the path set by the eighth selector 56h is represented by A, and the number of second delay element 64b included in the path set by the eighth selector 56h is represented by B, then a light emission timing adjustment signal Pe3 is output, in which the light emission reference signal Pe2 is delayed by a delay time $\{(A \times \tau 1)+(B \times \tau 2)\}$. Accordingly, in the first delay time control circuit 44 as well, as a result of switching the path by means of the eighth selectors 56h, a time resolution of $|\tau 2-\tau 1|$ can be obtained.

In this case as well, among the plural first delay elements 64a that constitute the first delay line DL1, a selected series of multiple first delay elements 64a is used as the delay line of the first delay locked loop unit 74a for the purpose of generating the first delay adjusting bias Vb1, and furthermore, a series of multiple first delay elements 64a, which is shared partially in common with the delay line of the first delay locked loop unit 74a, is used as a delay line for delay adjustment. For this reason, for example, in the case that a series of n first delay elements 64a is used for delay adjustment, whereas a series of m first delay elements 64a is used as the delay line of the first delay locked loop unit 74a, by sharing all or a portion of the delay line, if the number of actual physical delay elements is taken to be k, the inequality k<m+n can be satisfied, and a series of m+n−k first delay elements 64a can be used in common for both the first delay time control circuit 44 and the first delay locked loop unit 74a. The same feature also is true concerning the second delay line DL2.

On the other hand, the second delay time control circuit 46 has the same configuration as that of the first delay time control circuit 44. As shown in FIG. 14, among the plural eighth selectors 56h, only one eighth selector 56h corresponding to the offset adjusting signal S2 is set in the path on the side of the first delay elements 64a, whereas the other eighth selectors 56h are set in the path on the side of the immediately previous second delay elements 64b. As a result, among the series of plural first delay elements 64a used for delay-adjusting the light emission reference signal Pe2, when the number of first delay elements 64a included in the path set by the eighth selector 56h is represented by C, and the number of second delay elements 64b included in the path set by the eighth selector 56h is represented by D, then an offset signal Pe5 is output, in which the light emission reference signal Pe2 is delayed by a delay time $\{(C \times \tau 1)+(D \times \tau 2)\}$. Accordingly, in the second delay time control circuit 46 as well, as a result of switching the path by means of the eighth selectors 56h, a time resolution of $|\tau 2-\tau 1|$ can be obtained.

In the fourth timing correction unit 36d, similar to the aforementioned second timing correction unit 36b, a time resolution on the order of a few tens of psec can be realized, and corrections can be made with a distance measuring precision on the order of a few millimeters. In particular, in the fourth timing correction unit 36d, since the wiring route to the first delay time control circuit 44, the second delay time control circuit 46, and the timing correction phase comparator 48 for the first delay adjusting bias Vb1 and the second delay adjusting bias Vb2 is reduced, generation of noise can be further reduced. Further, by incorporating the first delay locked loop unit 74a and the second delay locked loop unit 74b respectively in the first delay time control circuit 44, the second delay time control circuit 46, and the timing correction phase comparator 48, an advantage exists in that the first delay line DL1 and the second delay line DL2 can be used in common, and therefore, compared to the first timing correction unit 36a, the overall circuit scale can be made smaller.

Figure 15A:
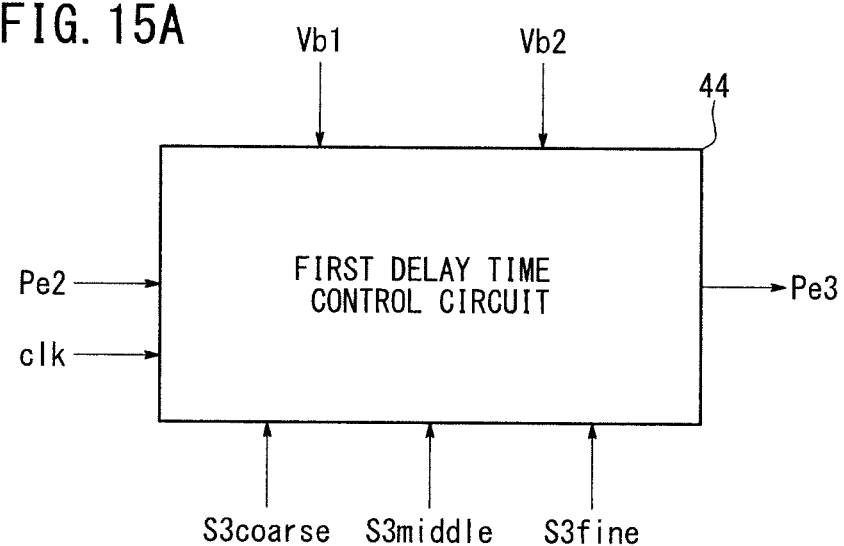
FIG. 15A is a block diagram showing the structural configuration of a first delay time control circuit according to a modified example.
Figure 15B:
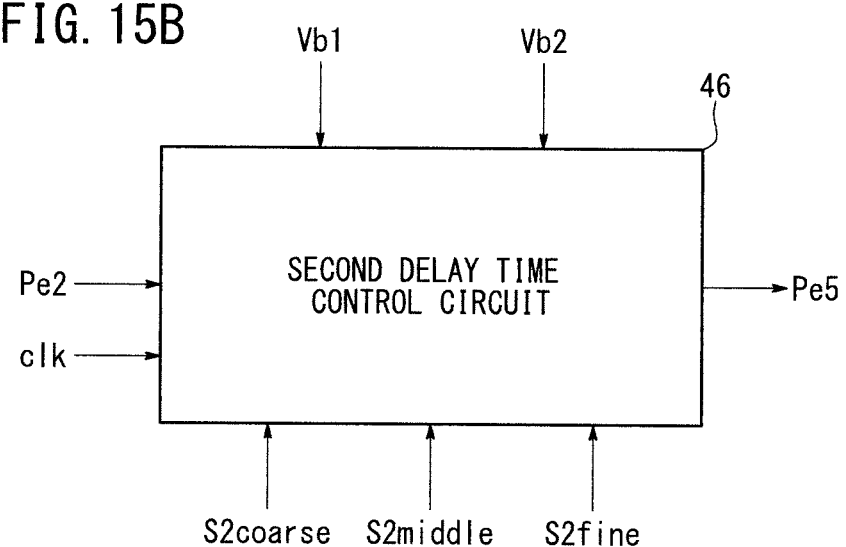
FIG. 15B is a block diagram showing the structural configuration of a second delay time control circuit according to a modified example.
Figure 16:
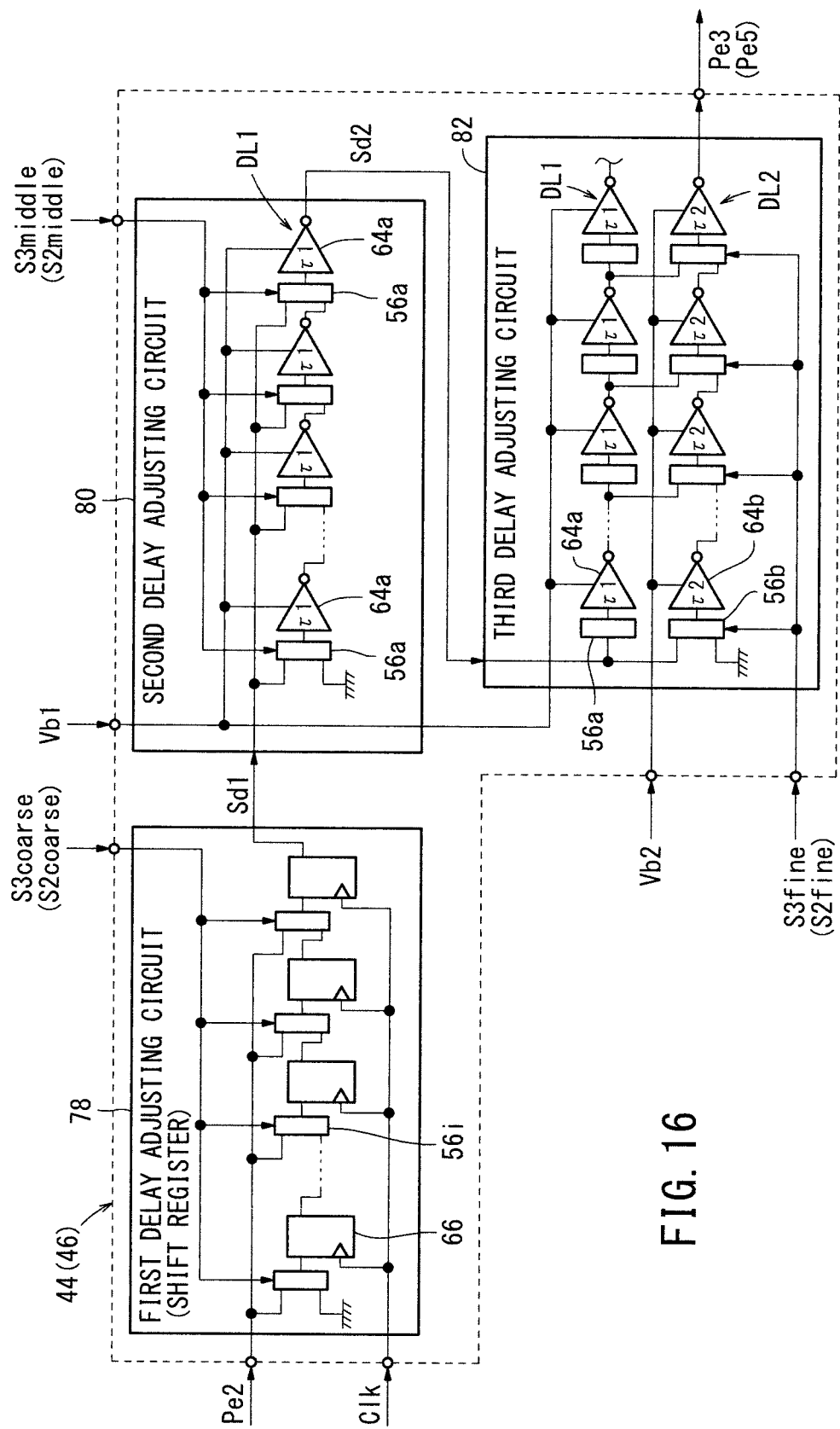
FIG. 16 is a block diagram showing internal configurations of a first delay time control circuit and a second delay time control circuit according to a modified example.

Next, with reference to FIGS. 15A through 16, explanations shall be made concerning modified examples of the first delay time control circuit 44 and the second delay time control circuit 46 in the first timing correction unit 36a through the fourth timing correction unit 36d.

As shown in FIG. 15A, in the first delay time control circuit 44 according to a modified example, for example, a first delay adjusting signal S3coarse, a second delay adjusting signal S3middle, and a third delay adjusting signal S3fine from the timing correction control logic circuit 50 are input thereto along with the reference clock signal clk, the light emission reference signal Pe2, the first delay adjusting bias Vb1 and the second delay adjusting bias Vb2, and a light emission timing adjustment signal Pe3 is output therefrom.

Concerning the internal configuration thereof, as shown in FIG. 16, the first delay time control circuit 44 includes a first delay adjusting circuit 78 constituted by shift registers in which the number of delay stages is variable, a second delay adjusting circuit 80 in which the number of delay stages is variable, and a third delay adjusting circuit 82 equipped with a first delay line DL1 and a second delay line DL2, and in which the path between the first delay line DL1 and the second delay line DL2 is variable.

The first delay adjusting circuit 78 includes a plurality of ninth selectors 56i that set the number of delay stages based on the first delay adjusting signal S3coarse, and a plurality of series-connected flip-flop circuits 66 (e.g., D-type flip-flops). The ninth selectors 56i are connected respectively in a previous stage of each of the flip-flop circuits 66. A reference clock signal clk is supplied to the CK terminal of each of the flip-flop circuits 66. Among the plural ninth selectors 56i, the first one of the ninth selectors 56i as viewed from the input side selects either one of a ground voltage Vss and the reference clock signal clk responsive to a binary value corresponding to the first delay adjusting signal S3coarse. The second one of the ninth selectors 56i and those thereafter as viewed from the input side select either one of the light emission reference signal Pe2 and the output from its immediately previous flip-flop circuit 66 responsive to the binary value corresponding to the first delay adjusting signal S3coarse. Accordingly, by means of the first delay adjusting signal S3coarse, only the Eth (E=1, 2, 3 . . . ) one of the ninth selectors 56i as viewed from the output side acts to select the light emission reference signal Pe2, whereby the first delay adjusting circuit 78 sets the number of delay stages at E stages. Because the period of the reference clock signal (pulses) clk is short and on the order of a few nsec, the first delay signal Sd1 is output in which the light emission reference signal Pe2 is delayed by only E stages×a few nsec. Further, since the number of delay stages can be changed in increments of one stage, the time resolution is on the order of a few nsec.

The second delay adjusting circuit 80 includes a plurality of first selectors 56a that set the number of delay stages of the second delay adjusting circuit 80 based on a second delay adjusting signal S3middle, and a plurality of series-connected first delay elements 64a. The first selectors 56a are connected respectively in a previous stage of each of the first delay elements 64a. The first delay adjusting bias Vb1 is supplied to each of the first delay elements 64a. Among the plural first selectors 56a, the first one of the first selectors 56a as viewed from the input side selects either one of the ground voltage Vss and the first delay signal Sd1 responsive to a binary value corresponding to the second delay adjusting signal S3middle. The second one of the first selectors 56a and those thereafter as viewed from the input side select either one of the first delay signal Sd1 and the output from its immediately previous first delay element 64a responsive to a binary value corresponding to the second delay adjusting signal S3middle. Accordingly, by means of the second delay adjusting signal S3middle, only the Fth (F=1, 2, 3 . . . ) one of the first selectors 56a as viewed from the output side acts to select the first delay signal Sd1, whereby the second delay adjusting circuit 80 sets the number of delay stages at F stages. Because the delay time due to one first delay element 64a is on the order of a few hundred psec, the second delay signal Sd2 is output in which the first delay signal Sd1 is delayed by only F stages×a few hundred psec. Further, since the number of delay stages can be changed in increments of one step, the time resolution is on the order of a few hundred psec.

The third delay adjusting circuit 82 includes a plurality of second selectors 56b that sets the path between the first delay line DL1 and the second delay line DL2 based on the third delay adjusting signal S3fine.

The first delay line DL1 is constituted by connecting in series a plurality of first delay elements 64a, and connecting first selectors 56a in a previous stage of each of the first delay elements 64a. The first delay adjusting bias Vb1 is supplied to each of the first delay elements 64a. Each of the first selectors 56a is a characteristic dummy, which is connected for the purpose of aligning with the load of the second delay line DL2. Further, a dummy delay element is disposed in the first delay line DL1 so that the load of the final stage thereof is the same as the load before the final stage.

The second delay line DL2 is constituted by connecting in series a plurality of second delay elements 64b, and connecting second selectors 56b is a previous stage of each of the second delay elements 64b. The second delay adjusting bias Vb2 is supplied to each of the second delay elements 64b.

Among the plural second selectors 56b, the first one of the second selectors 56b as viewed from the input side selects either one of the second delay signal Sd2 and the ground voltage Vss responsive to a binary value corresponding to the third delay adjusting signal S3fine. The second one of the second selectors 56b and those thereafter as viewed from the input side select either one of the output from its immediately previous first delay element 64a and the output from its immediately previous second delay element 64b responsive to a binary value corresponding to the third delay adjusting signal S3fine. Accordingly, assuming that the number of first delay elements 64a (second delay elements 64b) is G, and that, for example, the output of the Hth one of the first delay elements 64a corresponding only to the Hth one of the second selectors 56b as viewed from the input side is selected by the third delay adjusting signal S3fine, and if the delay time produced by one of the first delay elements 64a is $\tau 1$, whereas the delay time produced by one of the second delay elements 64b is $\tau 2$, then a third delay signal, i.e., a light emission timing adjustment signal Pe3, is output, by which the third delay adjusting signal S3fine is delayed by $H \times \tau 1 + (G-H) \times \tau 2$. Further, since the path can be switched stage by stage, the time resolution is $|\tau 1 - \tau 2|$. The magnitude of $|\tau 1 - \tau 2|$ may be assumed to be on the order of a few tens of psec to a few psec.

In this manner, in the first delay time control circuit 44 according to the modified example, by providing a configuration having respective small scale delay lines, a time resolution can be made variable over a wide range from on the order of a few tens of psec or less to a few nsec.

On the other hand, the second delay time control circuit 46 according to the modified example has substantially the same configuration as that of the aforementioned first delay time control circuit 44, and as shown in FIG. 15B, for example, a first offset signal S2coarse, a second offset signal S2middle, and a third offset signal S2fine from the timing correction control logic circuit 50 are input thereto along with the reference clock signal clk, the light emission reference signal Pe2, the first delay adjusting bias Vb1 and the second delay adjusting bias Vb2, and an offset signal Pe5 is output therefrom.

The internal configuration of the second delay time control circuit 46 is the same as that of the aforementioned first delay time control circuit 44, and thus duplicate explanations thereof are omitted. In the second delay time control circuit 46 as well, by providing a configuration having respective small scale delay lines, a time resolution can be made variable over a wide range from on the order of a few tens of psec or less to a few nsec.

Next, a timing correction unit (hereinafter referred to as a fifth timing correction unit 36e) according to a fifth detailed example will be described with reference to FIGS. 17 to 32.

Figure 17:
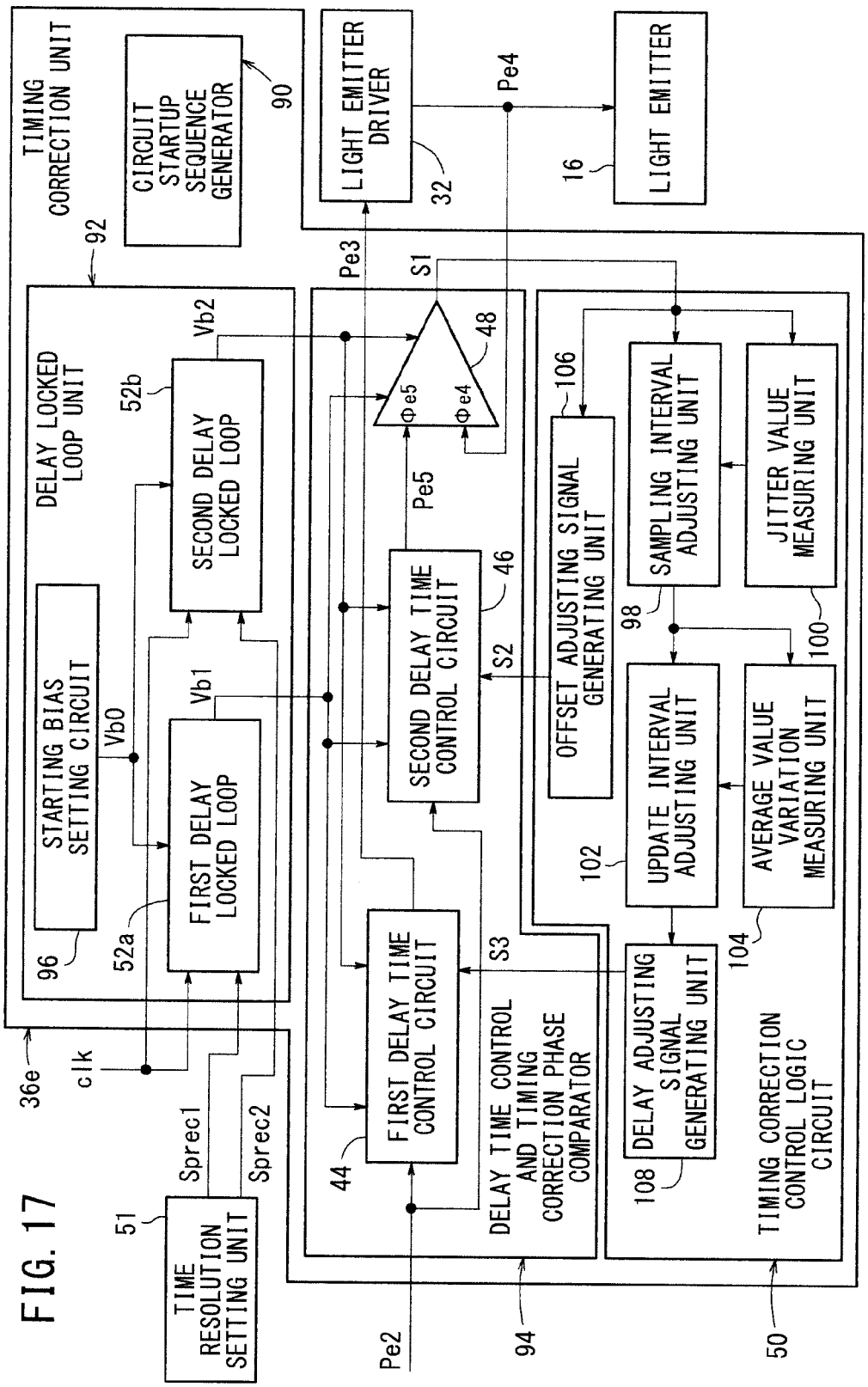
FIG. 17 is a block diagram showing the structural configuration of a fifth timing correction unit.

As shown in FIG. 17, the fifth timing correction unit 36e includes a circuit startup sequence generator 90, a delay locked loop unit 92, a delay time control and timing correction phase comparator 94, and a timing correction control logic circuit 50.

The circuit startup sequence generator 90 has a function to start up each of the respective types of circuits. Details of such circuits will be described later.

The delay locked loop unit 92 includes a starting bias setting circuit 96, a first delay locked loop 52a having a first delay line, and a second delay locked loop 52b having a second delay line. Among these circuits, the first delay locked loop 52a and the second delay locked loop 52b have already been described above, and thus duplicate explanations thereof are omitted.

The delay time control and timing correction phase comparator 94 includes a first delay time control circuit 44 having a first delay line and a second delay line, a second delay time control circuit 46 having a first delay line and a second delay line, and a timing correction phase comparator 48 having a first delay line and a second delay line. The first delay time control circuit 44, the second delay time control circuit 46, and the timing correction phase comparator 48 have already been described above, and thus duplicate explanations thereof are omitted.

The timing correction control logic circuit 50 includes a sampling interval adjusting unit 98, a jitter value measuring unit 100, an update interval adjusting unit 102, an average value variation measuring unit 104, an offset adjusting signal generating unit 106, and a delay adjusting signal generating unit 108.

The starting bias setting circuit 96 is a circuit for preventing locking (pseudo locking) from occurring at an erroneous delay phase difference, caused by the delay adjusting bias not being determined in the first delay locked loop 52a and the second delay locked loop 52b at power up or at the time of startup of the circuits. The starting bias setting circuit 96 is started up by the circuit startup sequence generator 90, and supplies an initial delay adjusting bias Vb0 (voltage), which is within a bias range that converges the output to a proper locked condition, to the first delay locked loop 52a and the second delay locked loop 52b. By inputting the initial delay adjusting bias Vb0 beforehand, at a time of circuit power up or immediately prior to circuit startup, a proper phase locked condition can always be assured.

The first delay time control circuit 44, the second delay time control circuit 46, and the timing correction phase comparator 48 are started up by the circuit startup sequence generator 90 after the first delay adjusting bias Vb1 and the second delay adjusting bias Vb2 have become stabilized.

Two processing operations (first operation sequence and second operation sequence) carried out by the circuit startup sequence generator 90 of the timing correction control logic circuit 50 will be described with reference to FIGS. 18 through 25.

Initially, the first operation sequence will be described with reference to FIGS. 18 through 24.

Figure 18:
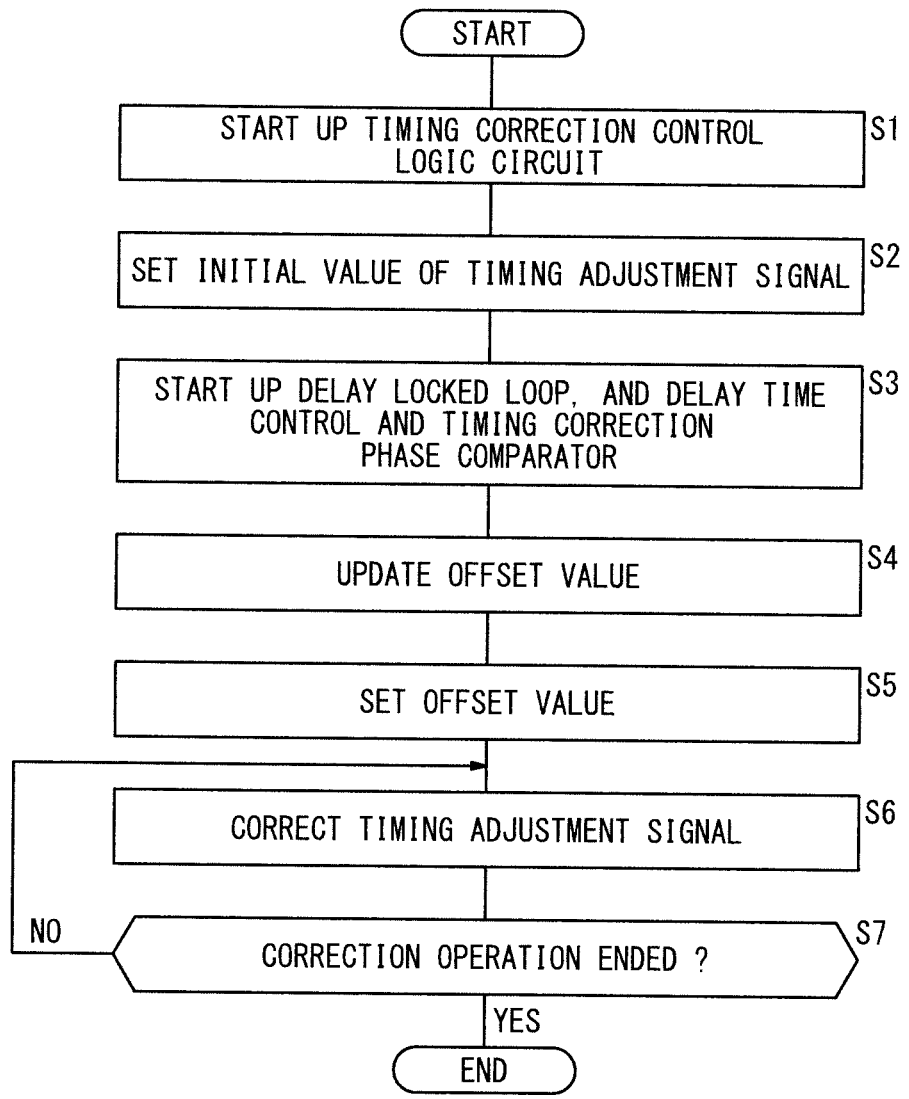
FIG. 18 is a flowchart showing processing operations of a first operation sequence performed by a circuit startup sequence generator and a timing correction control logic circuit.
Figure 19:
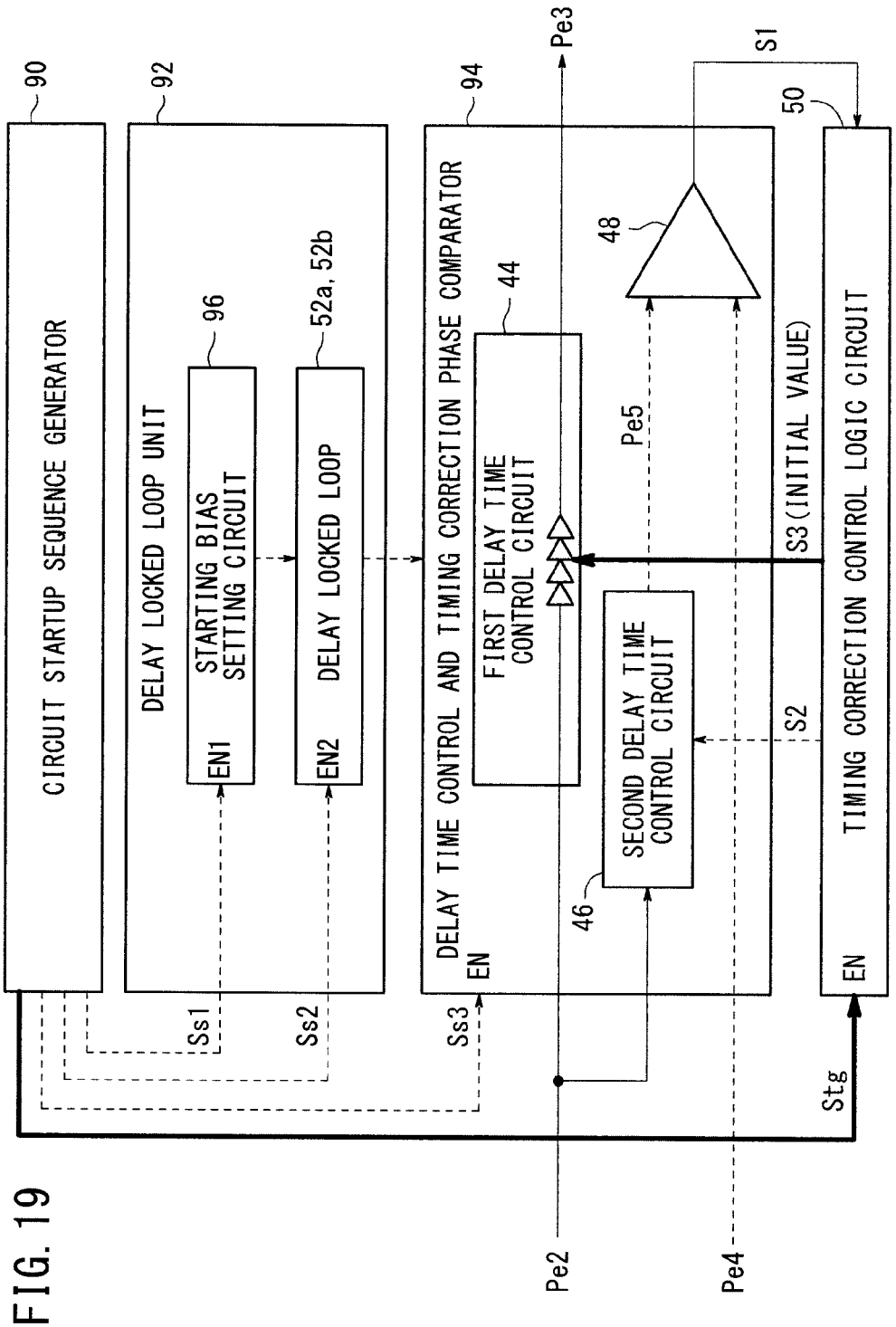
FIG. 19 is an operation concept diagram showing a condition in which a timing correction control logic circuit is started up.

First, in step S1 of FIG. 18, and as shown in FIG. 19, the circuit startup sequence generator 90 outputs a startup trigger signal Stg (see FIG. 21) to an enable terminal of the timing correction control logic circuit 50, whereby the timing correction control logic circuit 50 is started up.

In step S2, the timing correction control logic circuit 50 sets the value of the delay adjusting signal S3 to an initial value, and outputs the same to the first delay time control circuit 44. For example, a time, which is produced by adding to the shortest delay time a time that is one half the difference between the longest delay time and the shortest delay time capable of being set by the first delay time control circuit 44, may be used as the initial value.

Figure 20:
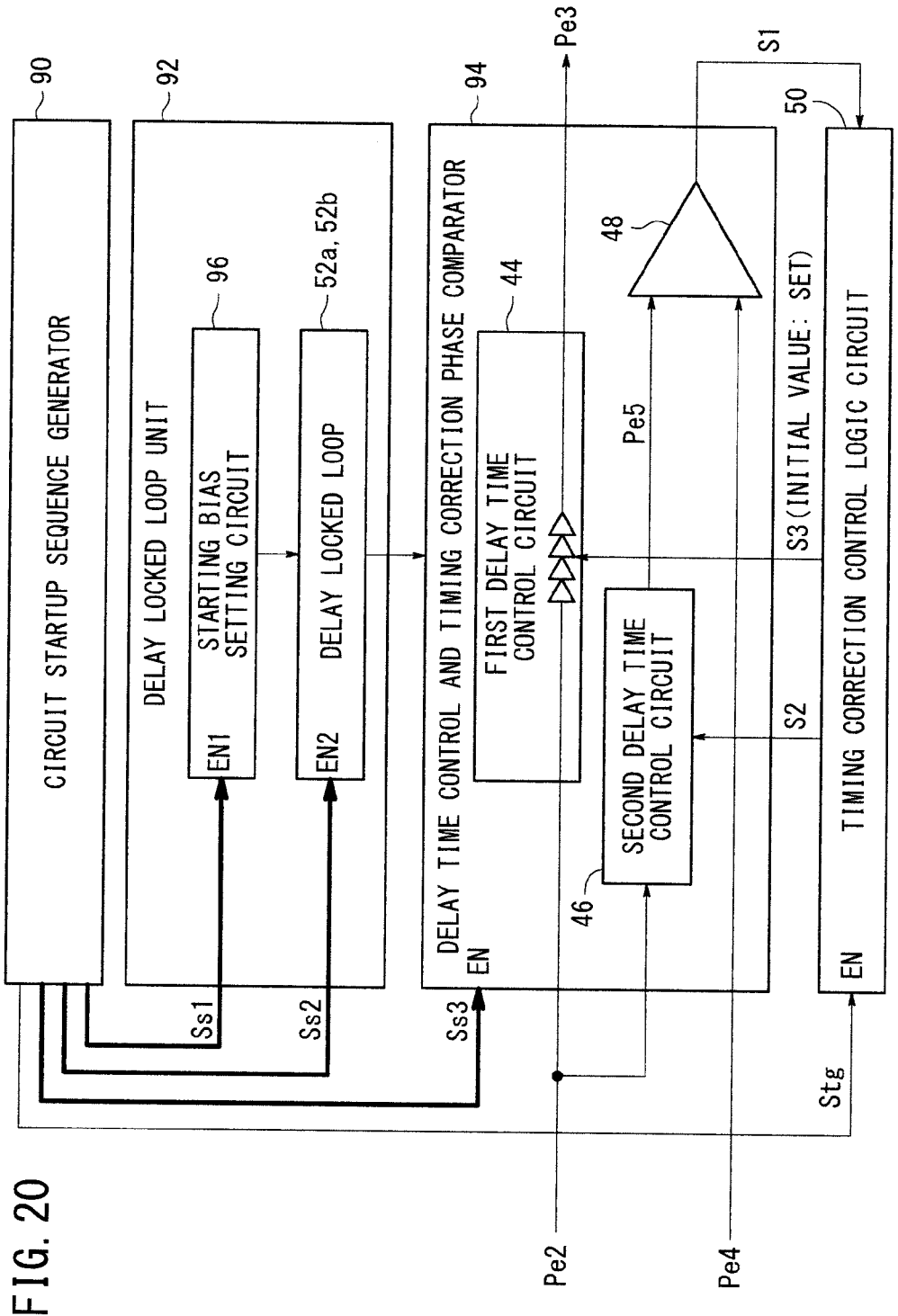
FIG. 20 is an operation concept diagram showing a condition in which a delay locked loop unit and a delay time control and timing correction phase comparator are started up.
Figure 21:
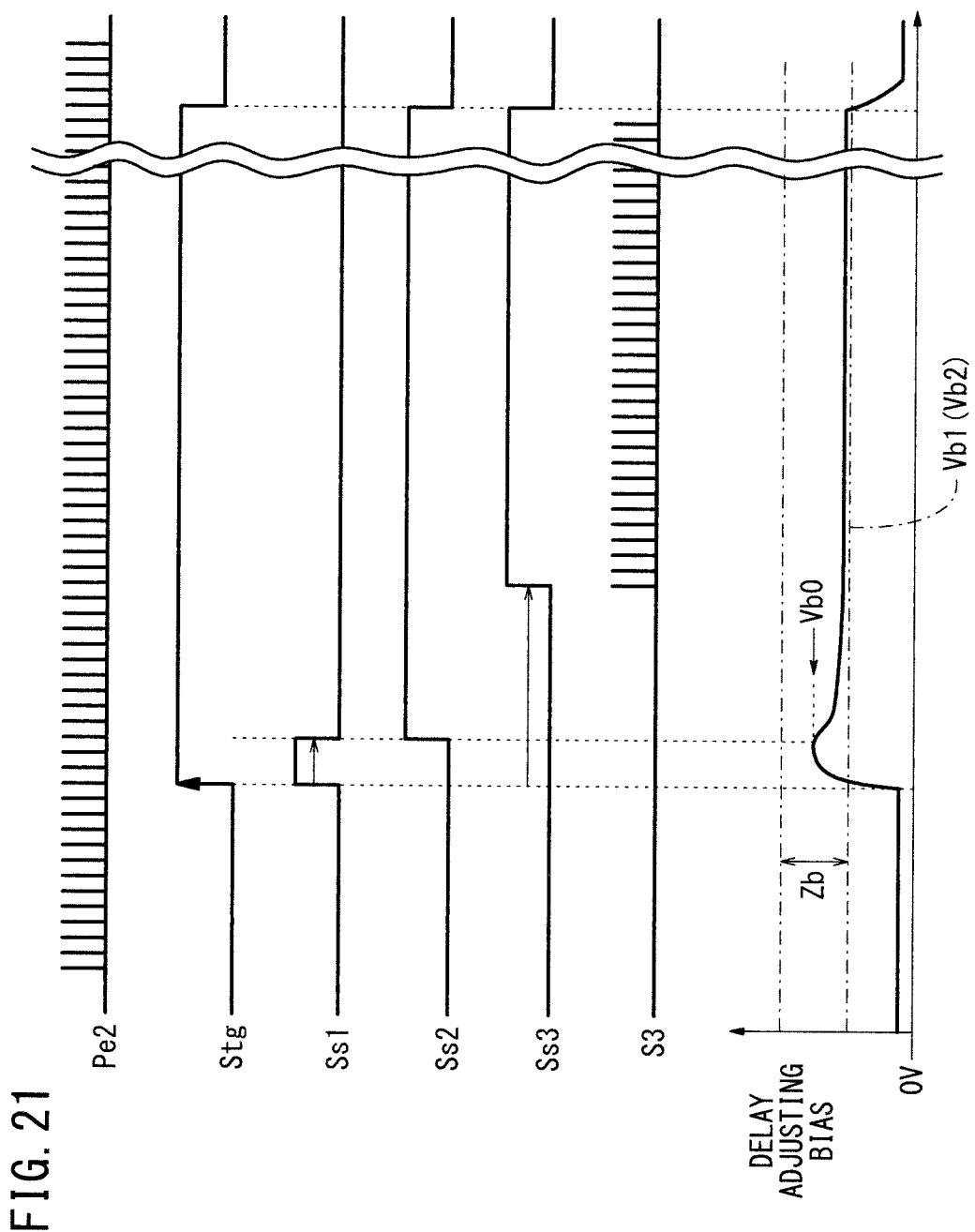
FIG. 21 is a time chart showing startup processes for each of various circuits.

In step S3 of FIG. 18, the circuit startup sequence generator 90 starts up the delay locked loop unit 92 and the delay time control and timing correction phase comparator 94. More specifically, as shown in FIGS. 20 and 21, at first, the circuit startup sequence generator 90 outputs a first startup signal Ss1 to a first enable terminal of the delay locked loop unit 92. The delay locked loop unit 92 receives the input first startup signal Ss1 as a trigger to drive the starting bias setting circuit 96. The starting bias setting circuit 96 sets the initial (delay adjusting) bias Vb0, which resides within a bias range Zb that converges the output to a proper locked condition, and supplies the initial bias to the first delay locked loop 52a and the second delay locked loop 52b. Further, the circuit startup sequence generator 90, after having set the initial bias Vb0, outputs a second startup signal Ss2 to the second enable terminal of the delay locked loop unit 92. The delay locked loop unit 92 receives the input second startup signal Ss2 as a trigger to drive the first delay locked loop 52a and the second delay locked loop 52b. The first delay locked loop 52a and the second delay locked loop 52b generate and output the first delay adjusting bias Vb1 and the second delay adjusting bias Vb2 from the initial bias Vb0. Further, the circuit startup sequence generator 90, at a stage following stabilization of the first delay adjusting bias Vb1 and the second delay adjusting bias Vb2, outputs a third startup signal Ss3 to an enable terminal of the delay time control and timing correction phase comparator 94. The delay time control and timing correction phase comparator 94 receives the input third startup signal Ss3 as a trigger to start up driving of the first delay time control circuit 44, the second delay time control circuit 46, and the timing correction phase comparator 48.

Figure 22:
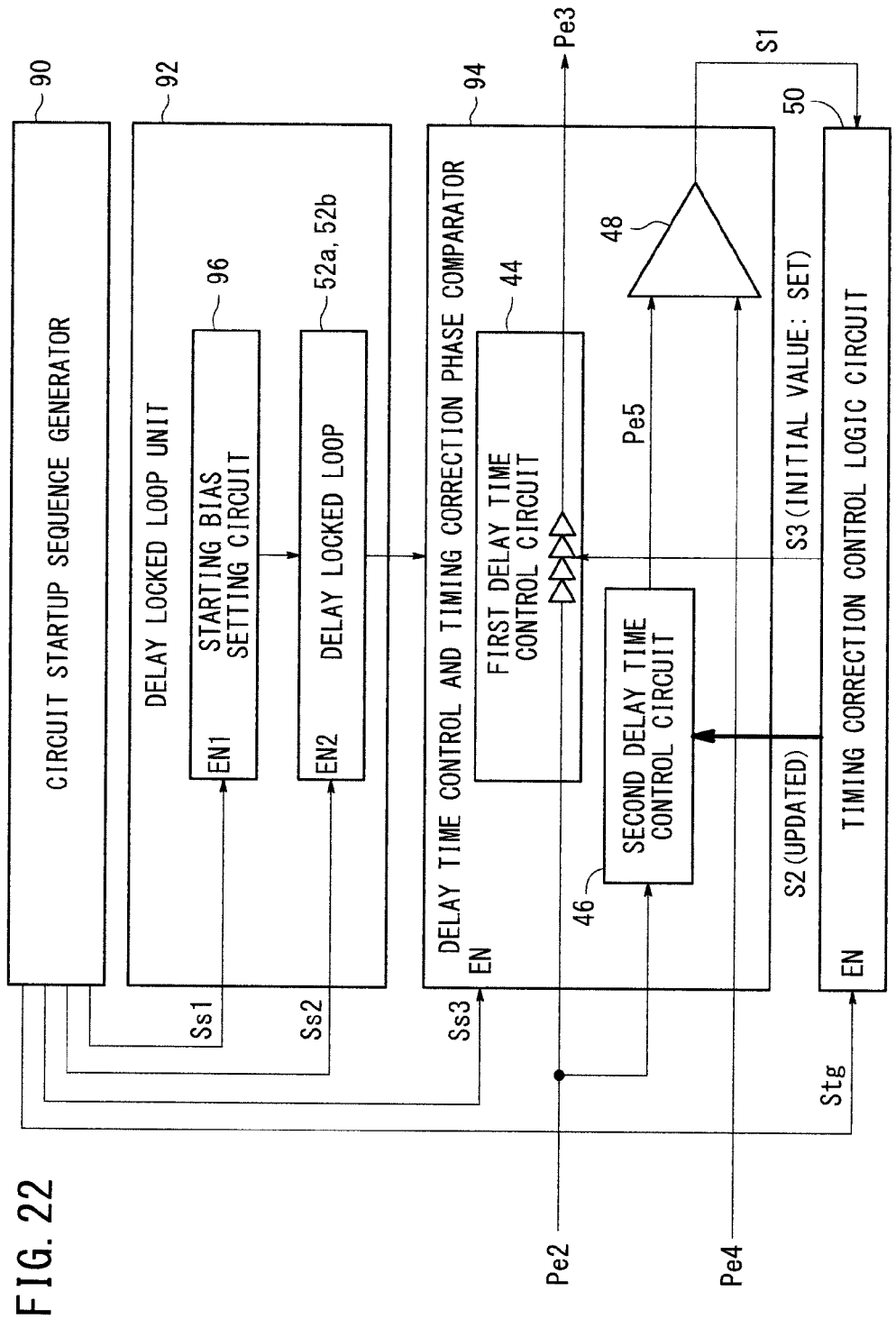
FIG. 22 is an operation concept diagram showing a condition in which an offset value is updated.

In step S4 of FIG. 18, the timing correction control logic circuit 50 updates the offset value. As shown in FIG. 22, the timing correction control logic circuit 50 (in particular, the offset adjusting signal generating unit 106 thereof) generates an offset value based on the phase comparison result S1 from the timing correction phase comparator 48, and then outputs the same as an offset adjusting signal S2 to the second delay time control circuit 46. At an initial stage, for example, when the second delay time control circuit 46 is set at the smallest delay time, the offset signal Pe5 is more advanced in phase than the light emission timing signal Pe4. The timing correction control logic circuit 50 generates an offset value for canceling the phase delay, and outputs the same to the second delay time control circuit 46 to thereby update the offset value of the second delay time control circuit 46.

Figure 23:
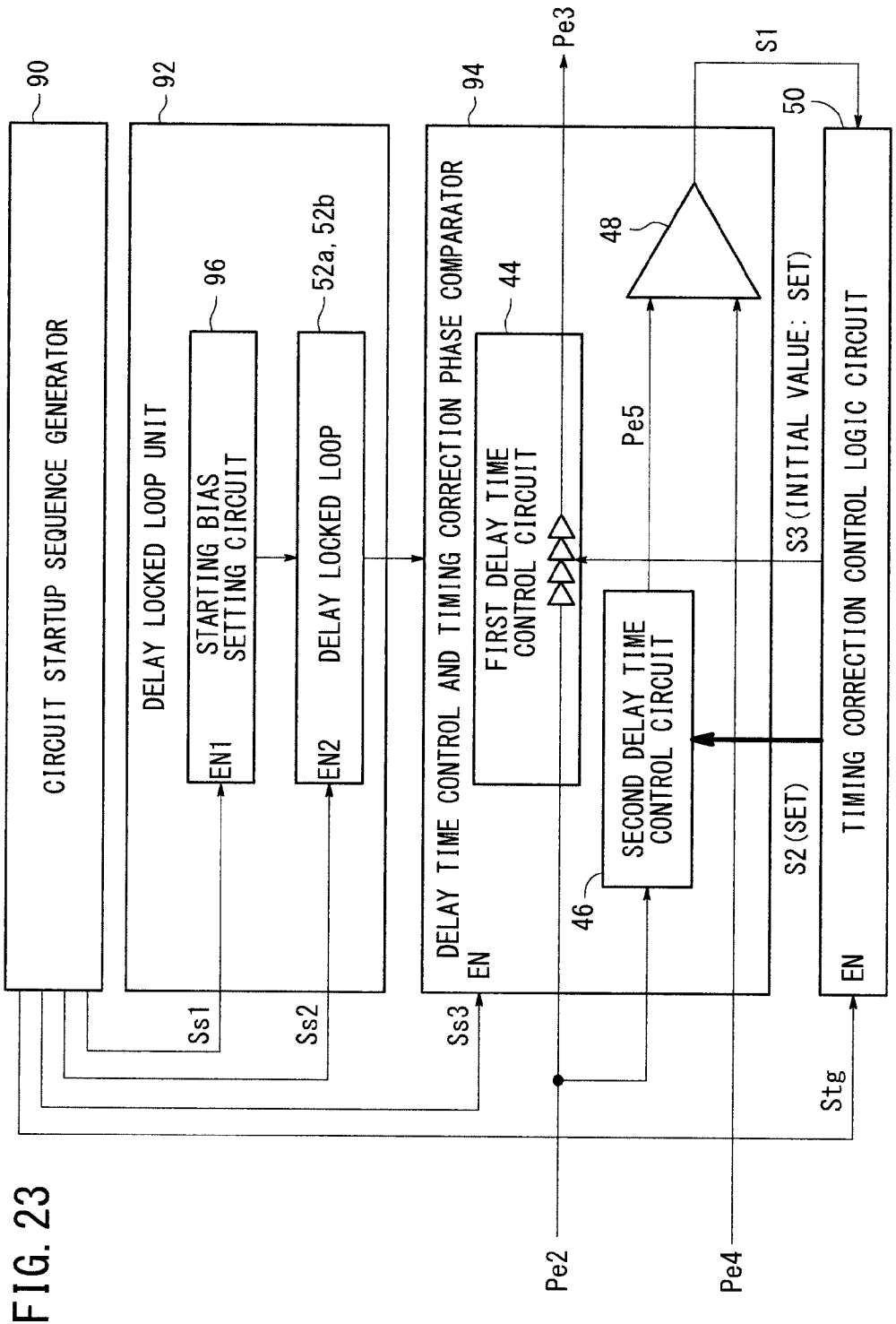
FIG. 23 is an operation concept diagram showing a condition in which the offset value is set.

In step S5 of FIG. 18, as shown in FIG. 23, the timing correction control logic circuit 50 sets (locks) the offset value at a stage in which the phase comparison result S1 becomes a value equivalent to a median (in the phase lag direction and the phase lead direction) of the detection range. More specifically, updating of the offset value is stopped.

Figure 24:
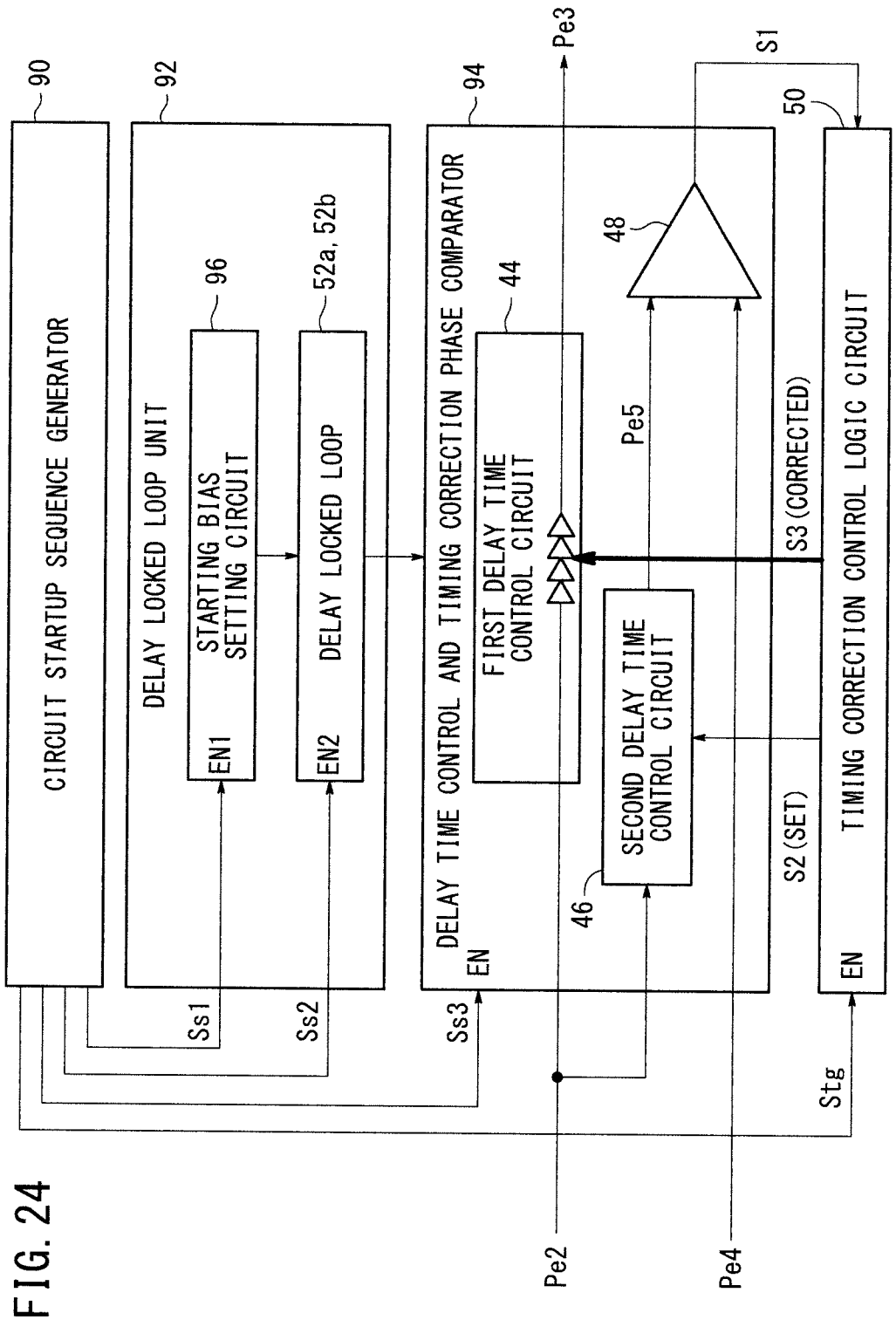
FIG. 24 is an operation concept diagram showing a condition in which a timing adjustment signal is corrected.

In step S6 of FIG. 18, as shown in FIG. 24, the timing correction control logic circuit 50 correctively controls the first delay time control circuit 44, so that the phase comparison result S1 is always the same even with respect to changes in the environment such as temperature variations or the like. More specifically, a timing adjustment amount (in the phase lag direction and the phase lead direction) of the first delay time control circuit 44 is determined from the difference between the phase comparison result S1 and the aforementioned median, the delay adjusting signal S3 is generated corresponding to the timing adjustment amount, and is output to the first delay time control circuit 44. Based on the supplied delay adjusting signal S3, the first delay time control circuit adjusts the timing of the light emission reference signal Pe2, and outputs the same as the light emission timing adjustment signal Pe3.

In addition, in step S7 of FIG. 18, it is determined whether or not a request to end the distance measurement timing correction (power OFF request, correction function OFF request) has been made. If an end request has not been made, then the process of step S6 is repeated, whereas if an end request has been made, processing operations by the timing correction control logic circuit 50 are brought to an end. In the case that the power source is turned ON again, or if starting of distance measurement is carried out, the processes from step S1 and thereafter are performed.

Since the first delay time control circuit 44, the second delay time control circuit 46, and the timing correction phase comparator 48 use the delay adjusting bias corresponding to environmental variations occurring at the first delay locked loop 52a and the second delay locked loop 52b, it is unlikely to be influenced by conditions in the surrounding environment such as temperature and the like. Further, by performing phase comparison between the light emission timing signal Pe4 from the light emitter driver 32 and the offset signal Pe5, any shifting in the timing of the light emission timing signal Pe4 can be absorbed by the timing adjustment value in accordance with a feedback control, and the light emission timing can be compensated.

Figure 25:
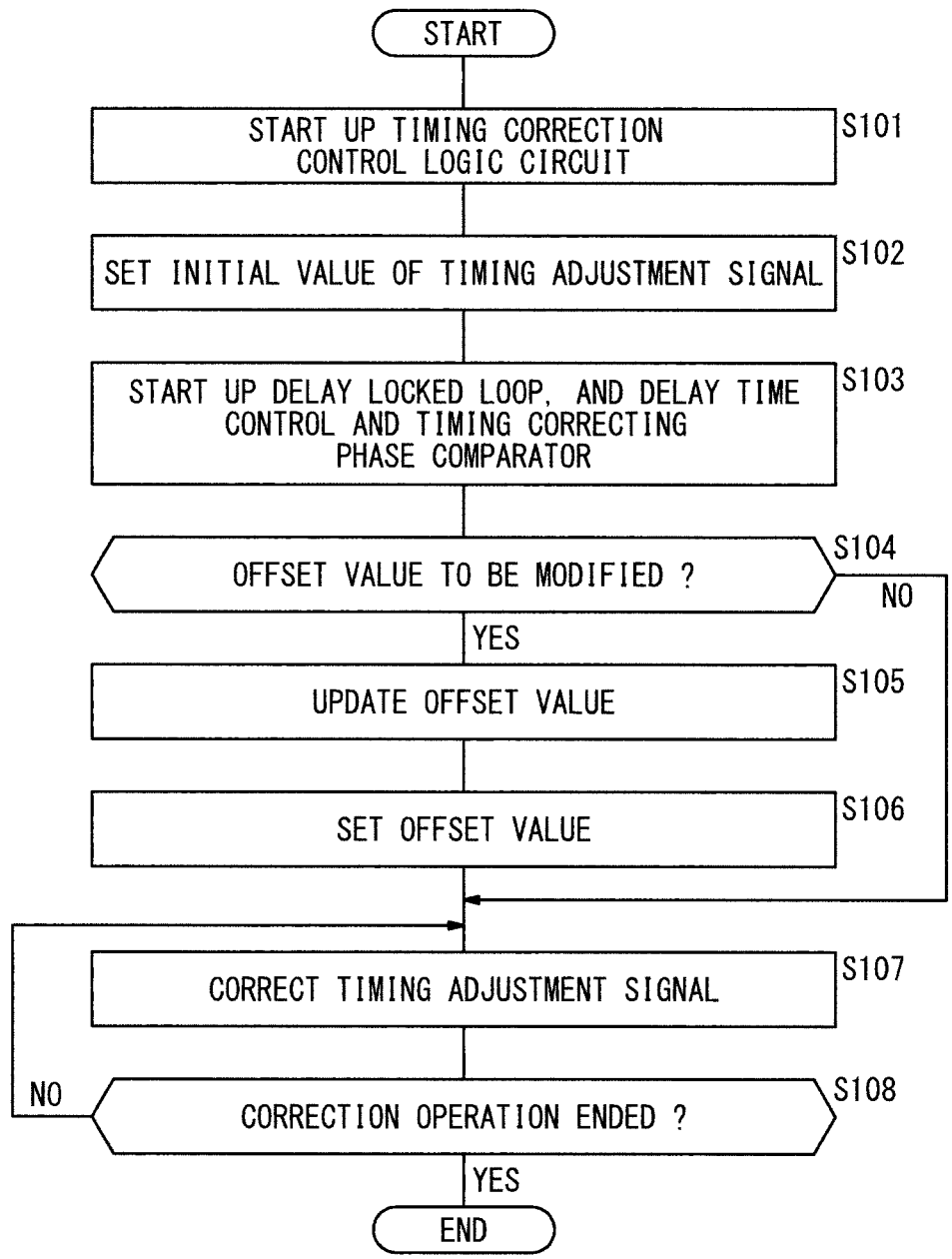
FIG. 25 is a flowchart showing processing operations of a second operation sequence performed by the circuit startup sequence generator and the timing correction control logic circuit.

Next, a second operation sequence shall be described with reference to the flow chart of FIG. 25.

First, the operations carried out in step S101 through step S103 are the same as those of the aforementioned step S1 through step S3. More specifically, in step S101, the timing correction control logic circuit 50 is started, in step S102, the timing correction control logic circuit 50 sets the delay adjusting signal S3 to an initial value, and in step S103, the delay locked loop unit 92 and the delay time control and timing correction phase comparator 94 are started.

Thereafter, in step S104, the timing correction control logic circuit 50 determines whether the present adjustment operation should update the offset value. As cases in which it may be necessary to update the offset value, there may be cited a time of product shipment, or when calibration is carried out, etc.

If it is necessary for the offset value to be updated, the processing sequence proceeds to step S105, in which, in the same manner as the aforementioned step S4, the timing correction control logic circuit 50 generates an offset value based on the phase comparison result S1 from the timing correction phase comparator 48, and then outputs the same to the second delay time control circuit 46, whereby the offset value of the second delay time control circuit 46 is updated.

In step S106, the timing correction control logic circuit 50 sets (locks) the offset value at a stage in which the phase comparison result S1 becomes a value equivalent to a median (in the phase lag direction and the phase lead direction) of the detection range. More specifically, updating of the offset value is stopped. The offset value is held in memory in the second delay time control circuit 46.

In step S104, in the case that the offset value is not to be updated, or at a stage in which the process of step S106 is completed, the processing sequence proceeds to the next step S107, during which the timing correction control logic circuit 50, in the same manner as the aforementioned step S6, correctively controls the first delay time control circuit 44 so that the phase comparison result S1 is kept constant at all times.

In addition, in step S108, it is determined whether or not a request to end the distance measurement timing correction (power OFF request, correction function OFF request) has been made. If an end request has not been made, then the process of step S107 is repeated, whereas if an end request has been made, processing operations by the timing correction control logic circuit 50 are brought to an end. In the case that the power source is turned ON again, or if starting of distance measurement is carried out, the processes from step S101 and thereafter are performed. For example, if it is not a time of product shipment, or if calibration of the system is not to be carried out, the processing sequence transitions to step S107 without performing the processes of steps S105 and steps S106.

In the second operation sequence, similar to the aforementioned first operation sequence, any shifting in the timing of the light emission timing signal Pe4 can be absorbed by the timing adjustment value and the light emission timing can be compensated. Moreover, at a time of product shipment (or when calibration is carried out), since the offset value is stored and held in memory, even during actual operation after shipment thereof, the light emission timing can be compensated in the same manner as at the time of product shipment.

Next, the sampling interval adjusting unit 98 and the jitter value measuring unit 100 of the timing correction control logic circuit 50 will be described with reference to FIGS. 26 through 32.

The sampling interval adjusting unit 98 adjusts a sampling interval (sampling interval Tsp) of the phase comparison result S1 based on a necessary sampling count, which is determined from a jitter value measured by the jitter value measuring unit 100.

First, operations of the sampling interval adjusting unit 98 will be explained. The offset adjusting signal generating unit 106 outputs the offset adjusting signal S2 to the second delay time control circuit 46. The delay time control and timing correction phase comparator outputs a phase comparison result S1 at the sampling interval. The sampling interval adjusting unit 98 regards the phase comparison result S1, which is read at each of respective sampling intervals Tsp, as a sampling value, and outputs the same to the update interval adjusting unit 102. The update interval adjusting unit 102 determines the average value of a plurality of sampling values taken during a timing adjustment update interval Ttc, and based on the average value, the delay adjusting signal generating unit 108 generates the delay adjusting signal S3 and outputs the same to the first delay time control circuit 44.

Because the timing correction phase comparator 48 outputs respective phase comparison results S1 from and after a point in time, which is delayed by circuit delay times (Tdelay) of the delay control circuits or the timing correction phase comparator 48, etc., from respective rise times (or fall times) of the light emission reference signal Pe2, the sampling interval adjusting unit 98 reads the sampling value from the phase comparison result S1 while taking into consideration such circuit delay times.

Figure 26:
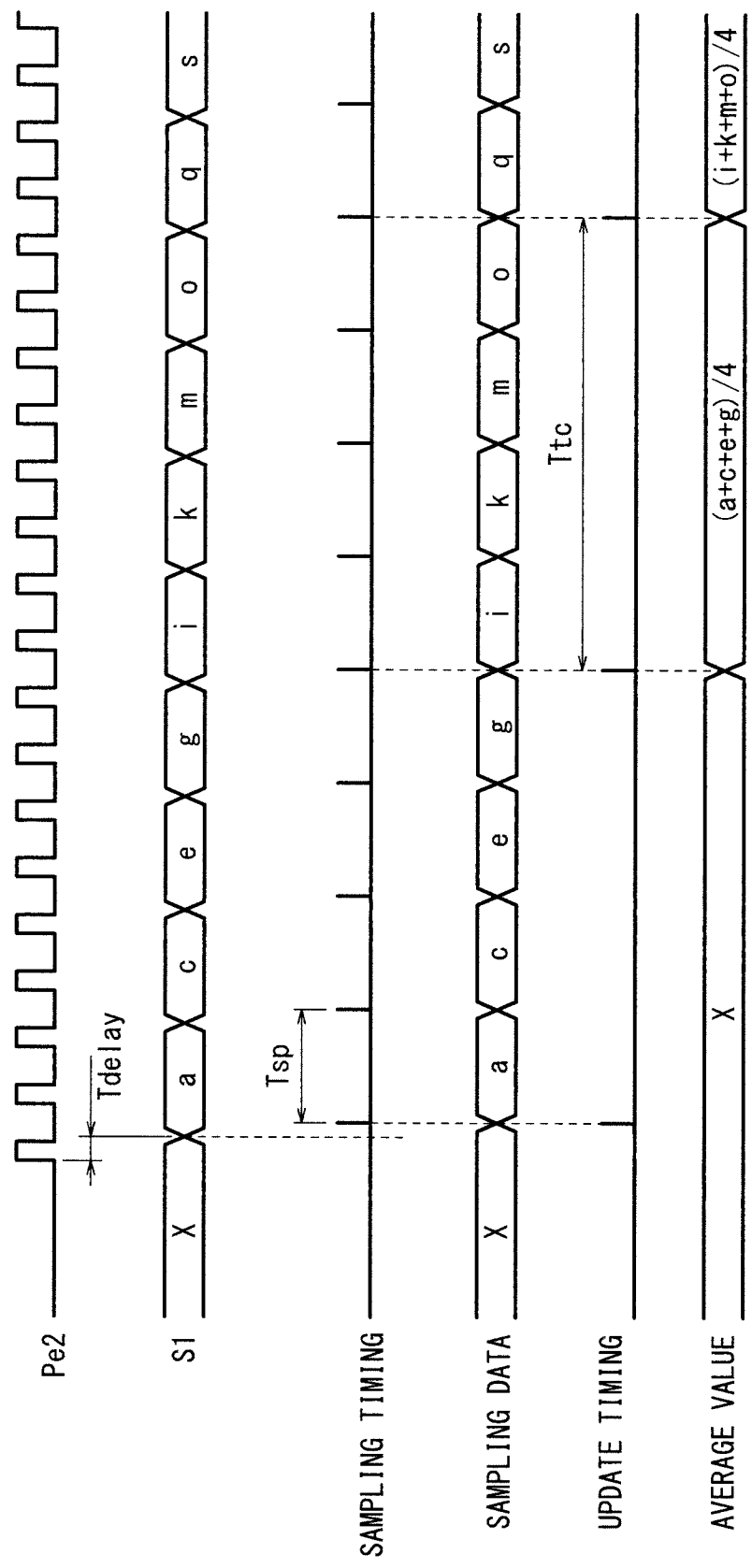
FIG. 26 is a flowchart showing a case in which a sampling count of respective timing adjustment update intervals is set at four.

The sampling interval adjusting unit 98 determines a required sampling count based on the jitter value, and carries out sampling of the phase comparison result S1 at the update interval Ttc, which is derived from the sampling interval Tsp and the required sampling count. As described above, the update interval adjusting unit 102 determines the average value of the sampling values during a period of the timing adjustment update interval Ttc, and based on the average value, the delay adjusting signal generating unit 108 generates the delay adjusting signal S3 and supplies the same to the first delay time control circuit 44. In the example of FIG. 26, a case is shown in which the sampling count during one update interval Ttc is four.

Figure 27:
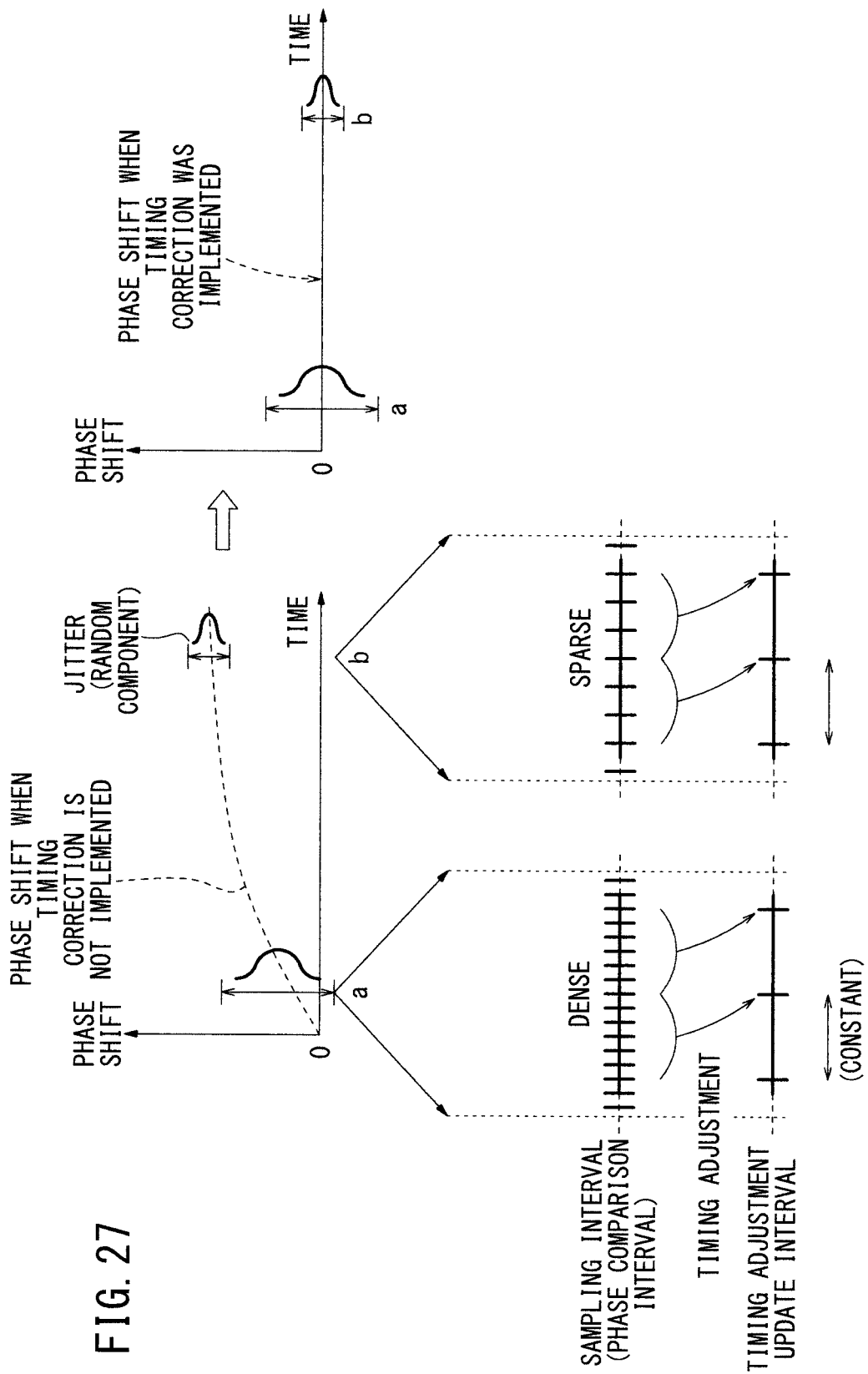
FIG. 27 is an explanatory drawing showing a difference in variation of an average value due to the influence of the surrounding environment, for a case in which the timing adjustment process is not performed and after the timing adjustment process has been performed, together with adjustment of a sampling interval in accordance with a jitter value.

Ordinarily, as shown in FIG. 27, at a stage of starting of distance measurement, since the system is in a transient state settling toward a steady state, there is a tendency for variations in the average value to be large. Thereafter, with the passage of time, changes in the average value gradually become smaller. Further, the jitter value increases or decreases depending on ambient conditions such as the temperature or the like of the surrounding environment. The present embodiment has the object to improve stability and suppress power consumption of the circuitry by conducting circuit operations at a minimum required sampling count and updating frequency corresponding to such variations.

Figure 28:
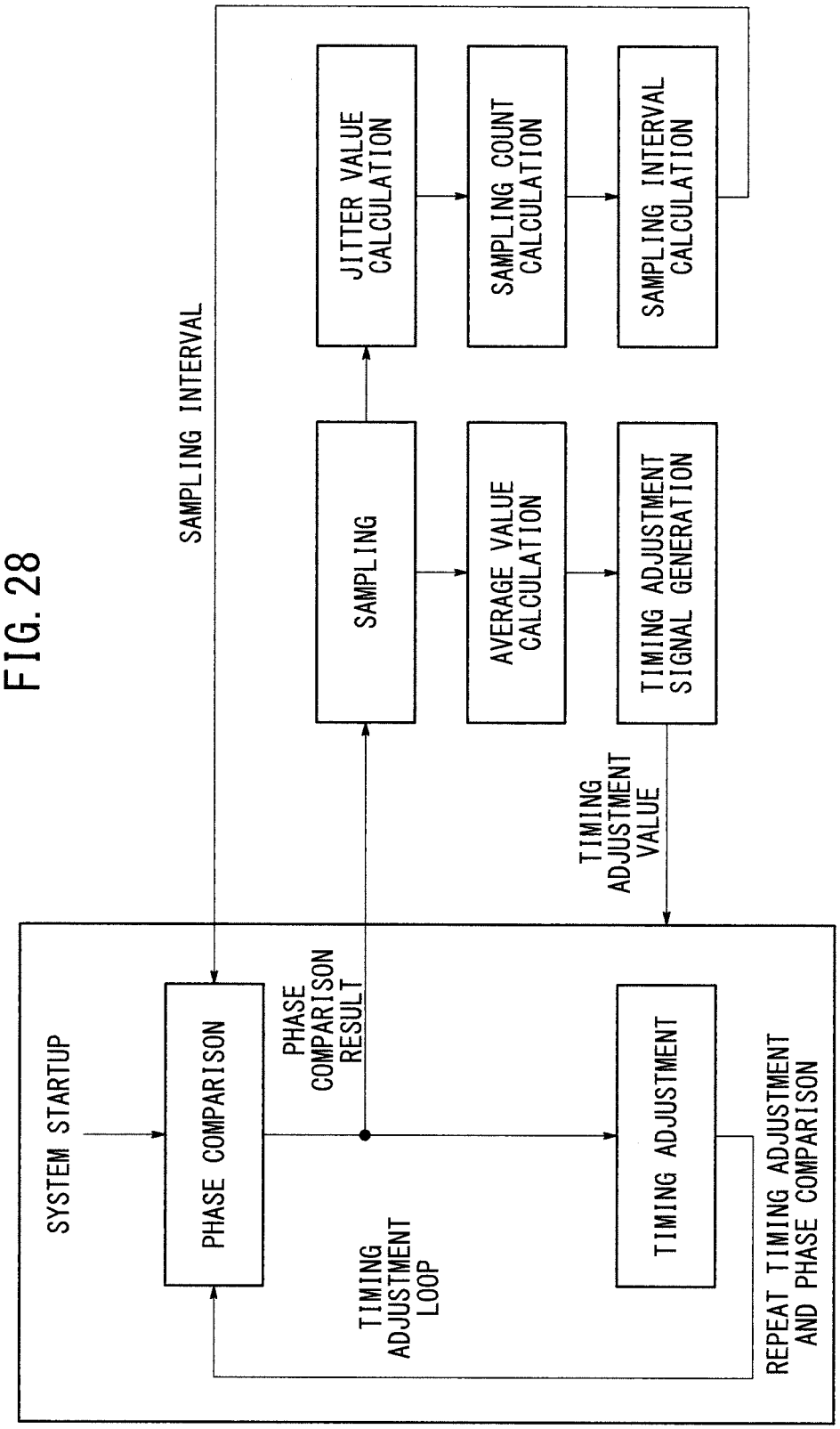
FIG. 28 is a block diagram showing process operations of a sampling interval adjustment unit and a jitter value measuring unit of a timing correction control logic circuit.

In addition, the sampling interval adjusting unit modifies the aforementioned sampling interval Tsp and carries out sampling corresponding to the jitter value measured by the jitter value measuring unit 100. Further, in a similar manner, the delay time control and timing correction phase comparator 94 implements circuit operations thereof at the sampling interval Tsp. As shown in FIG. 28, the jitter value measuring unit 100 measures the jitter value per each of a fixed number of sampling counts. In general, the jitter value is represented by a standard deviation σ or a peak-to-peak jitter value. For example, in the case of using the standard deviation σ, the jitter value can be determined by the following formula (1), where N is the fixed sampling count for obtaining the jitter value, $T_{ave}$ is the average of N instances of the phase comparison result, and $T_i$ is the ith (i=1, 2, 3, ... N) sampled value of the phase comparison result.

$$\text{Jitter Value} = \sqrt{\frac{1}{N}\sum_{i=1}^{N}(T_{ave} - T_i)^2} \quad (1)$$

Because the measurement value fluctuates by the aforementioned jitter value (standard deviation), the measurement value is shifted from the true ideal phase comparison result. As a result, by determining the average of the sampled values, the influence of fluctuation (jitter value) in the measurement value is suppressed. More specifically, if the jitter value is taken to be $\sigma_{jitter}$, the average value approaches the true phase comparison result at a ratio of $\sqrt{(\sigma_{jitter}^2/N_{ave})}$, where $N_{ave}$ represents the sampling count used to derive the average value.

Figure 29:
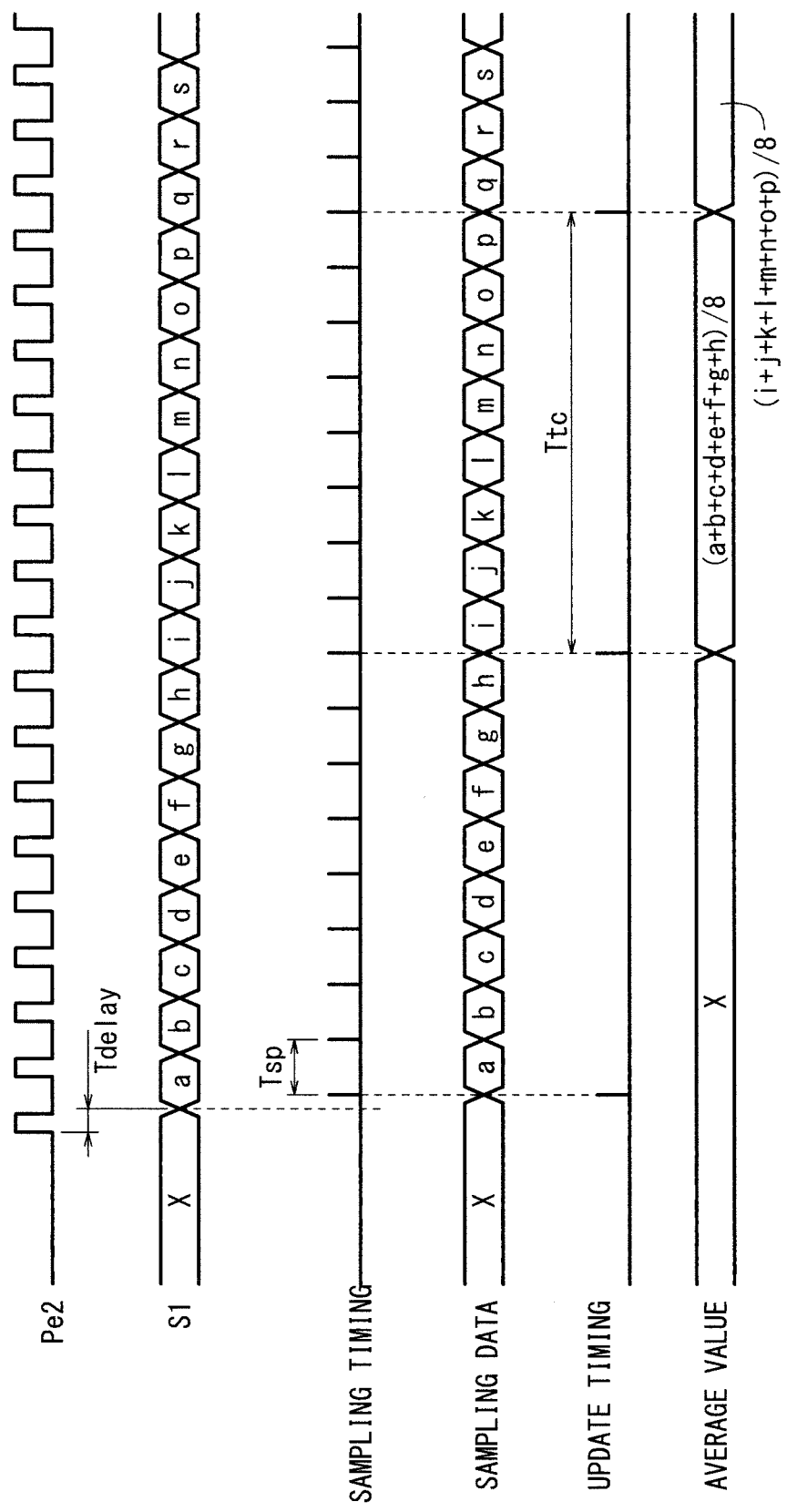
FIG. 29 is a time chart showing a case in which a sampling count of respective timing adjustment update intervals is set at eight.

The required sampling count Nk for the average value is determined per each update interval Ttc so that the ratio becomes equal to or less than a preset allowable shift amount. The sampling interval is determined by calculating the quotient Ttc/Nk. Accordingly, when the environment is such that the jitter value is large, the required sampling count Nk for the average value also becomes large, and responsive thereto, the sampling interval becomes shorter. As a result, as shown in FIG. 27, for example, in condition "a" in which the jitter value is large, the sampling interval becomes more dense. FIG. 29 shows an example in which the sampling interval is more dense than in the example of FIG. 26, and more specifically, illustrates a case in which the sampling count during each of the update intervals Ttc is eight.

Figure 30:
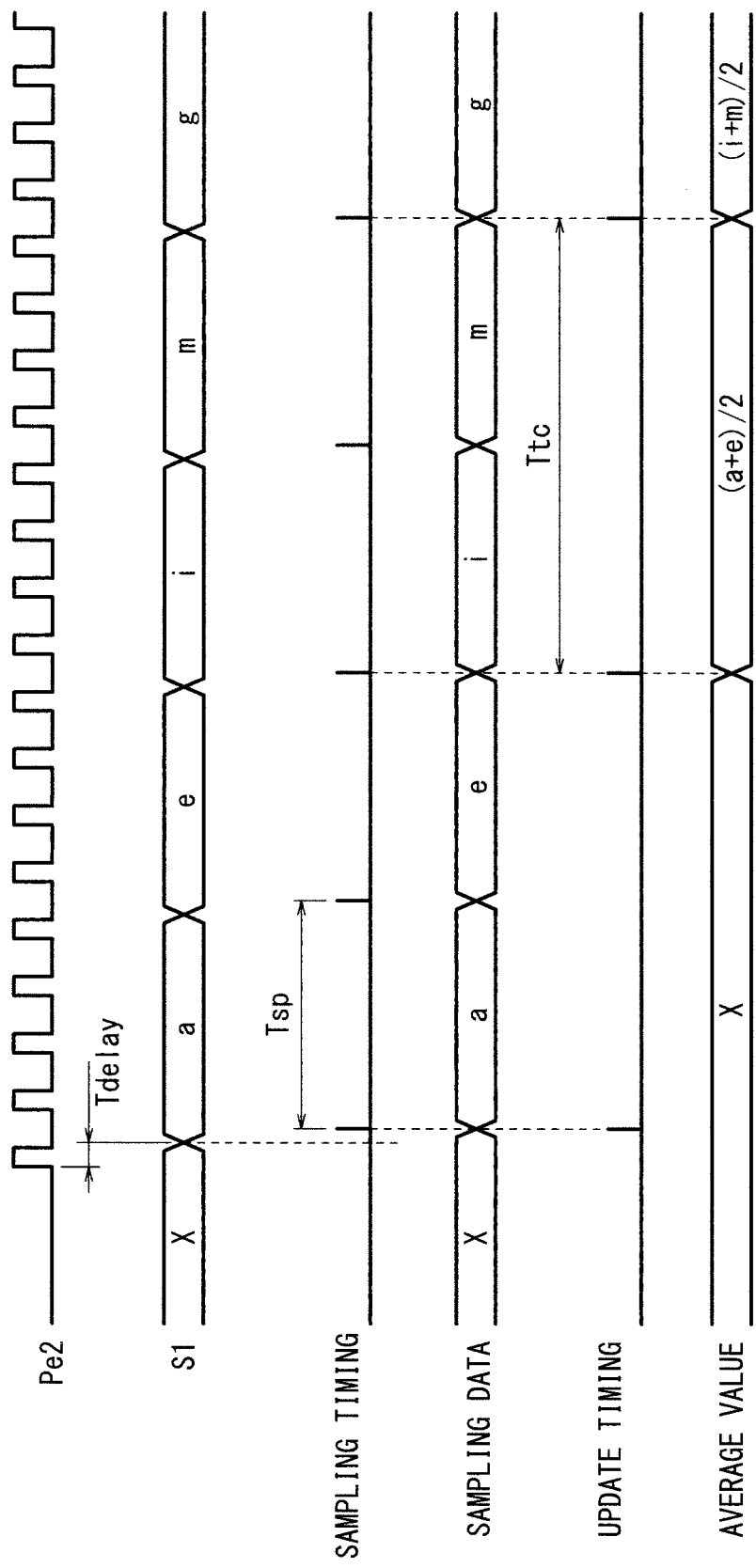
FIG. 30 is a time chart showing a case in which a sampling count of respective timing adjustment update intervals is set at two.

Conversely, when the environment is such that the jitter value is small, the required sampling count Nk for the average value also becomes small, and responsive thereto, the sampling interval becomes longer. As a result, as shown in FIG. 27, for example, in condition "b" in which the jitter value is small, the sampling interval becomes sparse. FIG. 30 shows an example in which the sampling interval is more sparse than in the example of FIG. 26, and more specifically, illustrates a case in which the sampling count during each of the update intervals Ttc is two.

Accordingly, when the environment is such that the jitter value is large, the sampling count for the fixed update interval Ttc is made larger, and the precision of the average value for generating the delay adjusting signal S3 rises. As a result, it becomes possible to maintain feedback control stability in an environment where the jitter value is large. Conversely, in an environment where the jitter value is small, feedback control stability is maintained even though the precision of the average value does not rise, and the sampling count for the fixed update interval Ttc becomes small, thereby contributing to low power consumption.

Figure 31:
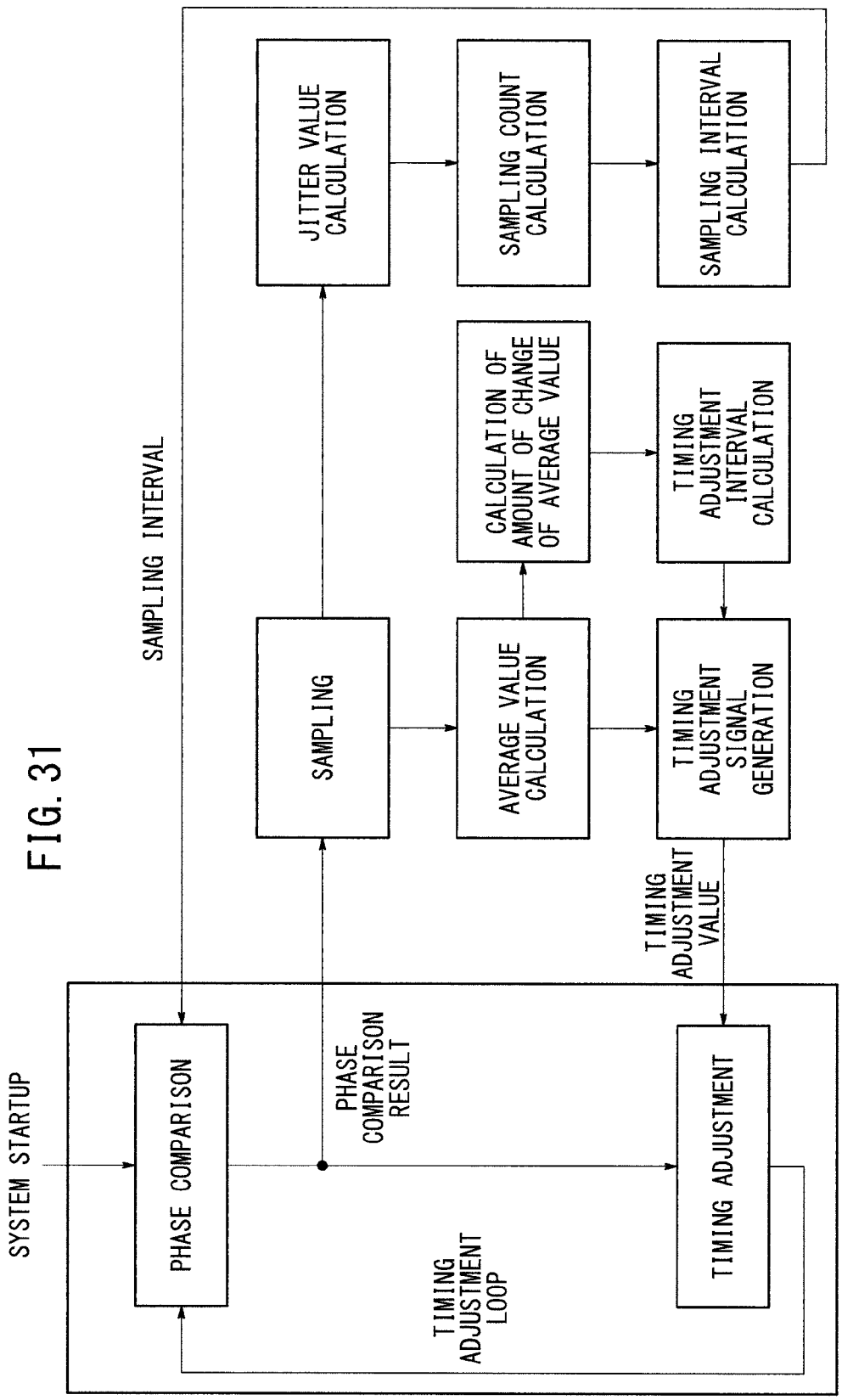
FIG. 31 is a block diagram showing process operations of a sampling interval adjustment unit, a jitter value measuring unit, an update interval adjusting unit, and an average value variation amount measuring unit of the timing correction control logic circuit.

Next, with reference to FIG. 31, descriptions shall be made concerning the update interval adjusting unit 102 and the average value variation measuring unit 104 of the timing correction control logic circuit 50.

The update interval adjusting unit 102 carries out a process to adjust the aforementioned update interval Ttc responsive to an average amount of variation measured by the average value variation measuring unit 104. Thus, as shown in FIG. 31, at least two average values during a fixed period are read, the difference between the average values of a newest period and a period older than the newest period is determined, and the update interval Ttc is adjusted corresponding to the difference (amount of change).

More specifically, if the present update interval is represented by Ttc(t), and the difference is represented by ΔH, the new update interval Ttc(t+1) is determined, for example, by the following formula.

$$Ttc(t+1) = \begin{cases} Ttc(t) - \Delta Ttc & : \text{if } \Delta H > A \\ Ttc(t) & : \text{if } A \geq \Delta H \geq B \\ Ttc(t) + \Delta Ttc & : \text{if } B > \Delta H \end{cases}$$

In the above formula, A is a threshold value in which the update interval is small, and B is a threshold value in which the update interval is long. ΔTtc is a value determined by addition or subtraction of the update interval. The size of ΔTtc is variable depending on the difference ΔH.

In other words, so long as the difference resides within a predetermined range (a range from A to B), the current update interval Ttc is maintained. Further, in the case that the difference ΔH is greater than A or that ΔH is greater than A and the difference ΔH increases, the update interval Ttc is made shorter. By making the update interval Ttc shorter, tracking with respect to characteristic variations can be handled more rapidly. However, since the update interval Ttc becomes shorter each time that a variation in the average value occurs, preferably, a predetermined shortest update interval Ttc is set and a control is performed so that the update interval Ttc does not become shorter than the shortest update interval Ttc. Further, in the case that the difference ΔH is less than B, the update interval Ttc may gradually be made longer. However, since the update interval Ttc becomes longer when the average value variation is small, preferably, a predetermined longest update interval Ttc is set and a control is performed so that the update interval Ttc does not become longer than the longest update interval Ttc, whereby the control can be responsive at a minimum response speed with respect to sudden variations.

Figure 32:
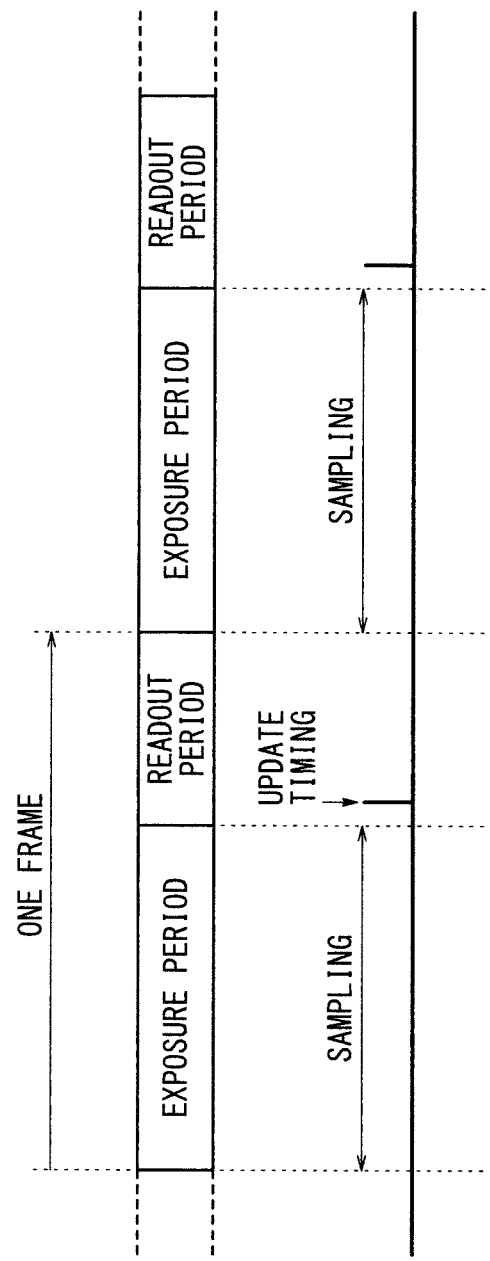
FIG. 32 is an explanatory diagram showing a preferred example of a period during which sampling is performed, and a period during which modification of a timing adjustment update interval and modification of the sampling interval are carried out.

Further, as shown in FIG. 32, preferably, sampling is performed in an exposure period by the light receiver 20 in order to determine an average value of the phase comparison result S1, and a change in the update interval Ttc and a change in the sampling interval Tsp (update timing) are carried out during a photoelectron readout period of the light receiver 20. When the intervals are changed during the exposure period (equivalent to an image confirmation period), unexpected variations tend to occur in the accumulated photoelectron amount, leading to a concern that distance measuring precision will decrease.

Next, a distance measuring system according to a second embodiment (hereinafter referred to as a second distance measuring system 10B) will be described with reference to FIGS. 33 and 34.

Figure 33:
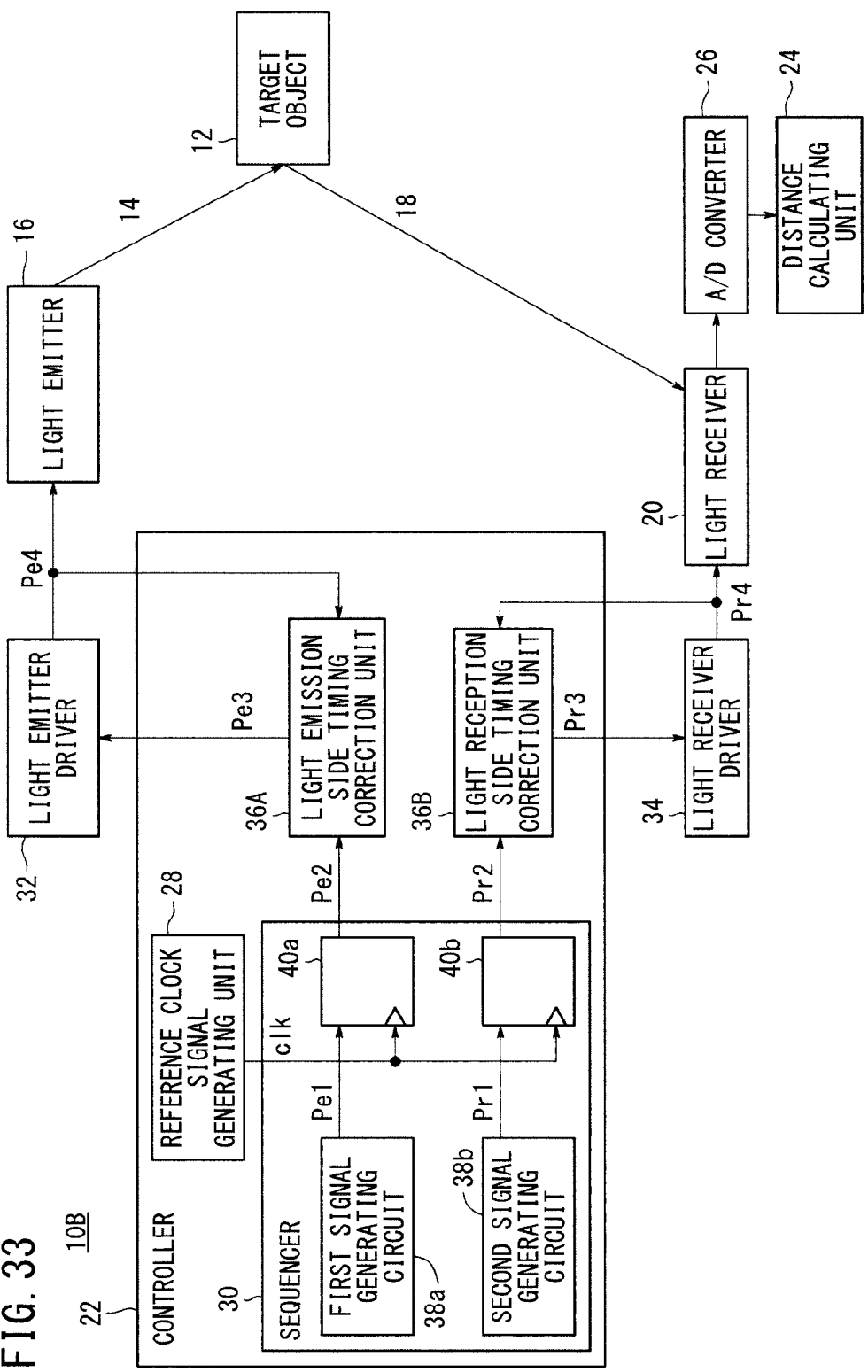
FIG. 33 is a block diagram showing the structural configuration of a distance measuring system (second distance measuring system) according to a second embodiment.

The second distance measuring system 10B has substantially the same configuration as the first distance measuring system 10A according to the first embodiment, but as shown in FIG. 33, differs in that it includes a light emission side timing correction unit 36A and a light reception side timing correction unit 36B. The light emission side timing correction unit 36A and the light reception side timing correction unit 36B, respectively, have similar configurations to the aforementioned first through fifth timing correction units 36a through 36e.

More specifically, the light emitter driver 32 controls driving of the light emitter 16 based on the light emission timing adjustment signal Pe3 from the light emission side timing correction unit 36A. For example, by means of the light emission timing adjustment signal Pe3, the light emission timing signal Pe4 is generated and output for emitting the light 14. The light emitter 16 emits the light 14, for example, as pulsed light, in accordance with the light emission timing signal Pe4 from the light emitter driver 32.

The light receiver driver 34 controls driving of the light receiver 20 based on a light reception timing adjustment signal Pr3 from a light reception side timing correction unit 36B. For example, in accordance with the light reception timing adjustment signal Pr3, a light reception timing signal Pr4 (i.e., a digital shutter timing signal) is generated, which regulates the period during which the reflected light 18 is received and serves to control driving of the light receiver 20. The light receiver 20 receives an amount of reflected light 18 during a period (digital shutter period), which is regulated in accordance with the light reception timing signal Pr4, and is reflected in the output value of the light receiver 20.

As noted above, the light emitter driver 32 and the light emitter 16 experience characteristic variations due to the influence of conditions in the surrounding environment such as temperature and humidity, and thus, it is difficult to maintain a stable light emission timing. Further, the light receiver driver 34 and the light receiver 20 also experience characteristic variations due to the influence of conditions in the surrounding environment such as temperature and humidity, and thus, it is difficult to maintain a stable light reception timing.

Consequently, the light emission side timing correction unit 36A is arranged between the sequencer 30 and the light emitter driver 32, and supplies to the light emitter driver 32 the light emission timing adjustment signal Pe3 which is delay-controlled on the basis of the light emission reference signal Pe2, so that the phase difference between the light emission reference signal Pe2 from the sequencer 30 and the light emission timing signal Pe4 from the light emitter driver 32 is always kept constant. Thus, a control is carried out such that the delay difference of the light emission timing signal Pe4 with respect to the light emission reference signal Pe2 is continuously kept constant without being influenced by the surrounding environment.

Similarly, the light reception side timing correction unit 36B is arranged between the sequencer 30 and the light receiver driver 34, and supplies to the light emitter driver 32 the light reception timing adjustment signal Pr3 which is delay-controlled on the basis of the light reception reference signal Pr2, so that the phase difference between the light reception reference signal Pr2 from the sequencer 30 and the light reception timing signal Pr4 from the light receiver driver 34 is always kept constant. Thus, a control is carried out such that the delay difference of the light reception timing signal Pr4 with respect to the light reception reference signal Pr2 is continuously kept constant without being influenced by the surrounding environment. As a result, the light emission timing signal Pe4 and the light reception timing signal Pr4 are compensated so as not to be influenced by the surrounding environment.

Figure 34:
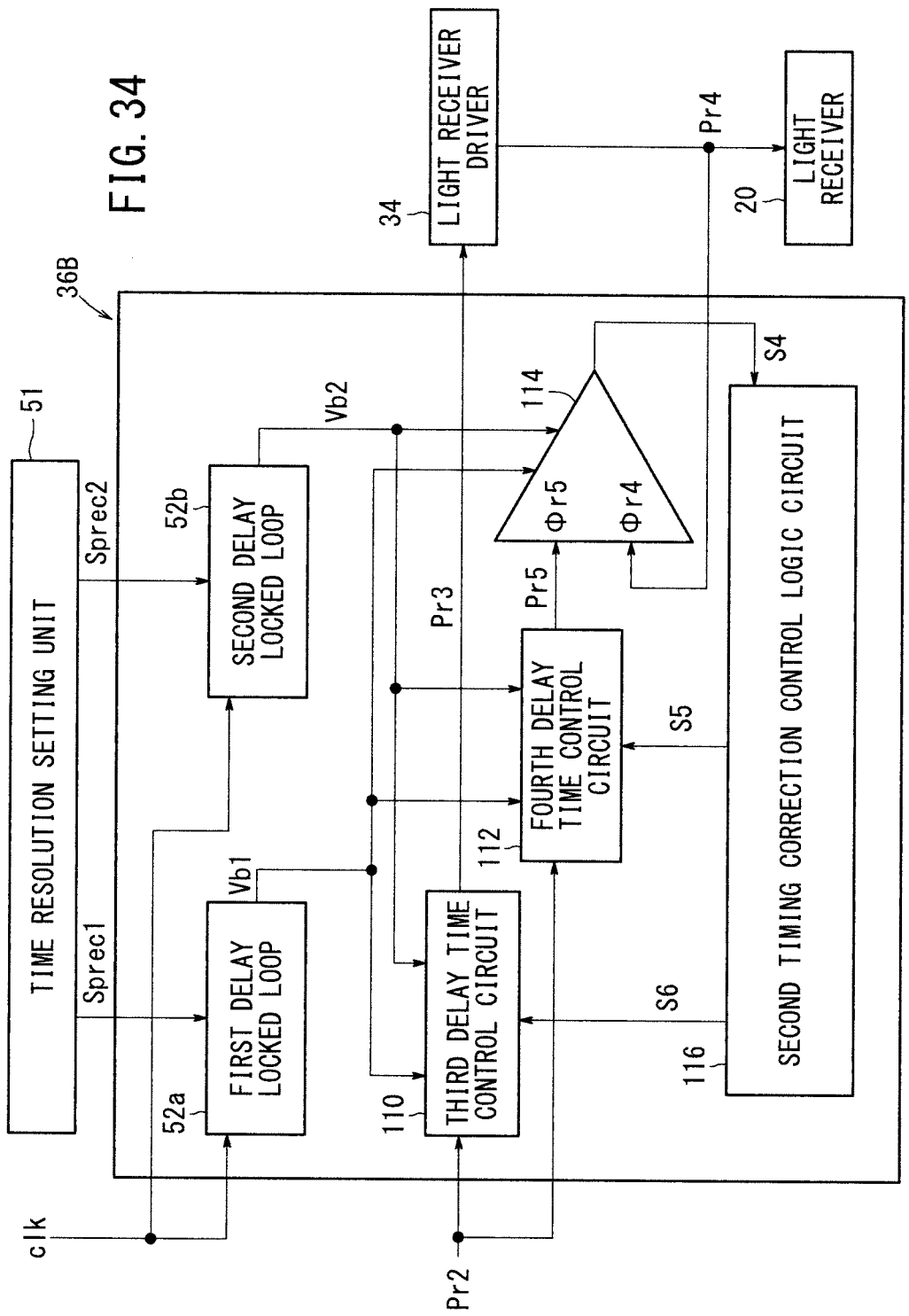
FIG. 34 is a block diagram showing the structural configuration of a light reception side timing correction unit.

A circuit is shown in FIG. 34 for a case in which the light reception side timing correction unit 36B is constituted in the first timing correction unit 36a.

The light reception side timing correction unit 36B sets (or resets), in a fourth delay time control circuit 112 (which corresponds to the second delay time control circuit 46) thereof, an offset time Toffset based on a second offset adjusting signal S5 (which corresponds to the offset adjusting signal S2), whereby the light reception reference signal Pr2 is delayed by the set offset time Toffset, and is output therefrom as a second offset signal Pr5. In addition, in the case that the light reception timing signal Pr4 increases due to the influence of the surrounding environment by a time change beyond the offset time Toffset, a phase difference ΔTchange of the time change is detected in a second timing correction phase comparator 114, and the phase comparison result is output as a second phase comparison result S4, which is input to a second timing correction control logic circuit 116. The second timing correction control logic circuit 116 outputs a second delay adjusting signal S6, which is calculated based on the second phase comparison result S4, and is input to a third delay time control circuit 110. The third delay time control circuit 110 adjusts a delay time of the light reception reference signal Pr2 based on the second delay adjusting signal S6, and outputs the same as a light reception timing adjustment signal Pr3.

More specifically, the third delay time control circuit 110 adjusts the timing of the light reception reference signal Pr2 so that the light reception reference signal Pr2 is shortened by the aforementioned phase difference ΔTchange, and then outputs the same to the light receiver driver 34 as the light reception timing adjustment signal Pr3. As a result, for example, the time at which the light reception timing signal Pr4 falls and the time at which the second offset signal Pr5 falls are made to occur at the same timing. Consequently, time change due to the surrounding environment is absorbed in accordance with a feedback control, whereby the light reception timing signal Pr4 can be supplied to the light receiver 20 at the correct timing. Therefore, the distance to the target object 12 can be measured accurately without being influenced by the surrounding environment.

In the foregoing manner, in the second distance measuring system 10B, at the time of carrying out correction of the timing difference in accordance with a feedback control, it becomes less likely for the system to be influenced by the surrounding environment, and by generating stable light emission and light reception timings, distance measurements can be effected without being influenced by the surrounding environment.

Next, a distance measuring system according to a third embodiment (hereinafter referred to as a third distance measuring system 10C) will be described below with reference to FIG. 35.

The third distance measuring system 10C has substantially the same configuration as the aforementioned first distance measuring system 10A (see FIG. 1), but differs therefrom in the following ways.

Figure 35:
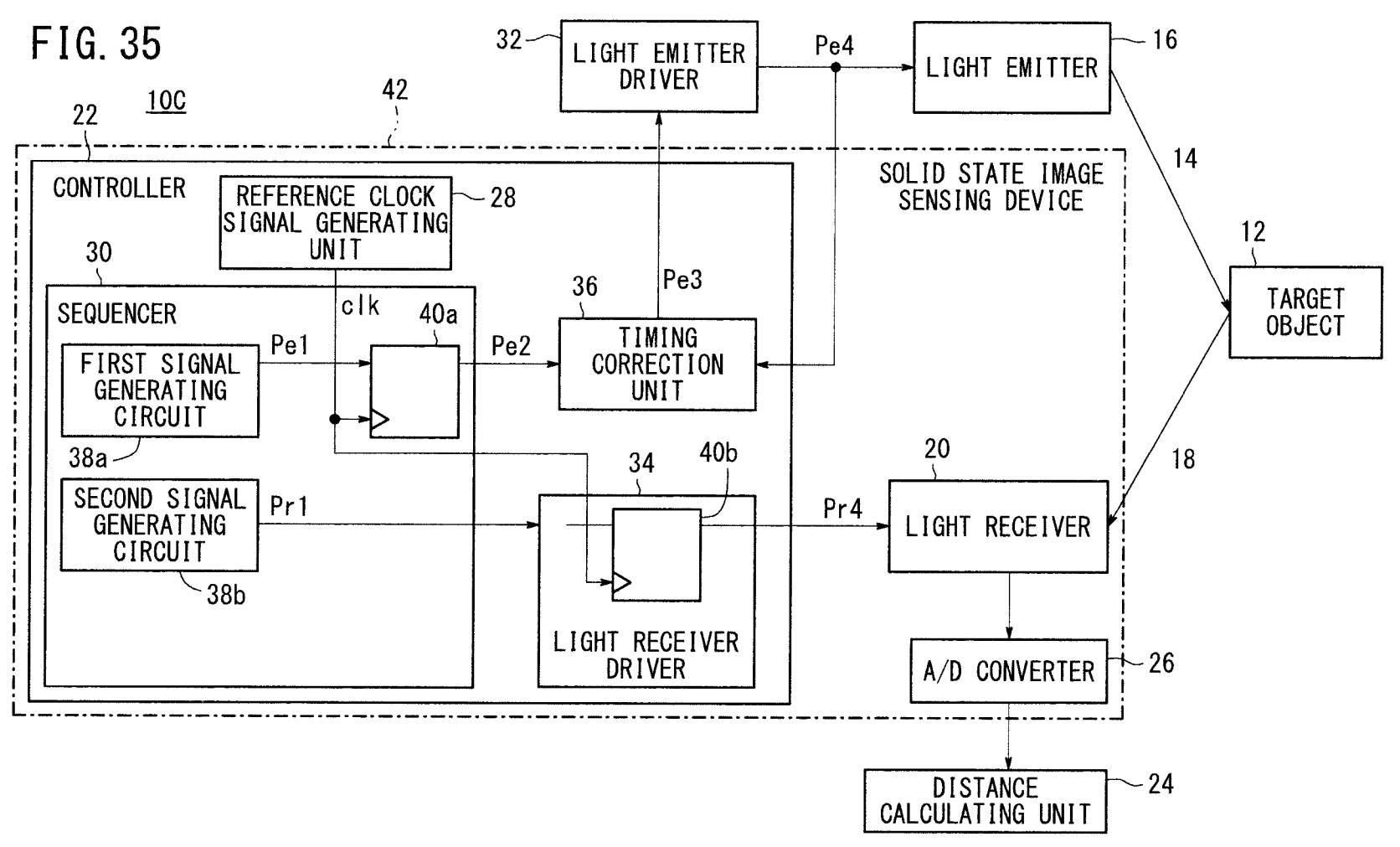

More specifically, as shown in FIG. 35, the light receiver driver 34 differs in that the second clock synchronizing circuit 40b is included, for example, in the light receiver driver 34. Owing thereto, a countermeasure can be implemented for outputting a clock synchronized light reception timing signal Pr4, thereby enabling the light reception timing signal Pr4, which is delay-synchronized with the light reception reference signal Pr2, to be supplied to the light receiver 20. Accordingly, the light reception side timing correction unit 36B need not be disposed between the sequencer 30 and the light receiver driver 34, and only the light emission side timing correction unit 36A may be disposed as a timing correction unit between the sequencer 30 and the light emitter driver 32.

In the third distance measuring system 10C as well, by means of the light emission side timing correction unit 36A, a light emission timing signal Pe4, which is stable in terms of timing and for which time change due to the surrounding environment is absorbed, is supplied to the light emitter 16. Therefore, distance measurements can be realized without being influenced by the surrounding environment.

In this case, similar to the first distance measuring system 10A, since there is no need to implement the light reception side timing correction unit 36B, the circuit configuration thereof is simplified, and the third distance measuring system 10C can be made smaller in scale.

Figure 36:
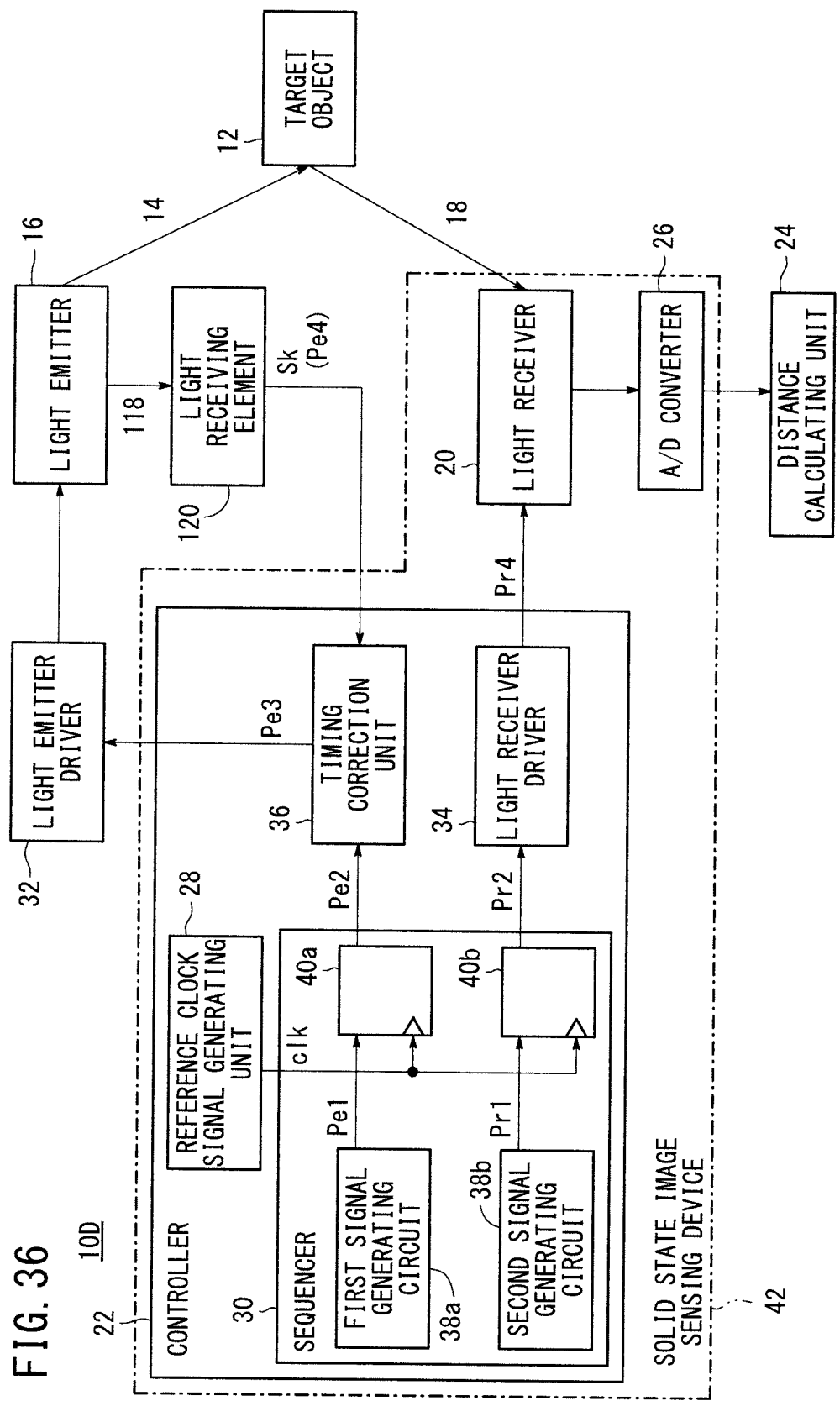
FIG. 36 is a block diagram showing the structural configuration of a distance measuring system (fourth distance measuring system) according to a fourth embodiment.

Next, a distance measuring system according to a fourth embodiment (hereinafter referred to as a fourth distance measuring system 10D) will be described below with reference to FIG. 36.

The fourth distance measuring system 10D has substantially the same configuration as that of the aforementioned first distance measuring system 10A, but differs in that a further light receiving element 120 is included, which receives direct light 118 from the light emitter 16. An (light emission timing) observation signal Sk from the light receiving element 120 is applied as a feedback signal to the timing correction unit 36.

In this case, since the light emission timing from the light emitter 16 can be detected directly, a timing correction can be implemented, which takes into account influences due to the surrounding environment of the light emitter 16.

As the light receiving element 120, preferably, a light receiving element is used in which superior temperature characteristics are exhibited. For example, a light receiving element in which a temperature compensating circuit is incorporated can be used.

The distance measuring system according to the present invention is not limited to the aforementioned embodiments. It goes without saying that various modified or additional structures could be adopted therein, without deviating from the essence of the invention as set forth in the appended claims.

What is claimed is:
1. A distance measuring system comprising:
a light emitter that emits light toward a target object;
a light receiver that receives reflected light of the emitted light from the target object and produces an output corresponding to an amount of light received;
a controller for controlling the light emitter and the light receiver; and
a distance calculating unit that calculates a distance to the target object by means of a time-of-flight method using the output of the light receiver, wherein the controller further comprises:
- a sequencer that regulates a light emission timing at which light is emitted from the light emitter and a light reception timing at which light is received by the light receiver;
- a reference clock signal generating unit that generates a reference clock signal and outputs the reference clock signal to the sequencer;
- a light emitter driver for driving the light emitter;
- a light receiver driver for driving the light receiver; and
- a timing correction unit interposed in a previous stage of the light emitter driver for correcting the light emission timing,
wherein the timing correction unit includes a first delay time control circuit, a second delay time control circuit, a timing correction phase comparator, and a timing correction control logic circuit;
the sequencer generates a reference signal synchronized with the reference clock signal, and inputs the reference signal to the first delay time control circuit and the second delay time control circuit;
the second delay time control circuit receives the reference signal, which is input thereto, and outputs an offset signal in which timing of the reference signal is delayed;
the timing correction phase comparator receives the offset signal and an output signal from the light emitter driver, which are input thereto, and outputs a phase comparison result;
the timing correction control logic circuit reads the phase comparison result, and outputs a delay adjusting signal based on the phase comparison result; and
the first delay time control circuit reads the delay adjusting signal, adjusts the timing of the reference signal, and outputs the same as a light emission timing adjustment signal to the light emitter driver.

2. The distance measuring system according to claim 1, wherein the timing correction unit further comprises a first delay locked loop and a second delay locked loop;
- the first delay time control circuit, the second delay time control circuit, and the timing correction phase comparator each include, respectively, a first delay line and a second delay line;
- a first delay adjusting bias generated by the first delay locked loop is applied to each of the first delay lines; and
- a second delay adjusting bias generated by the second delay locked loop is applied to each of the second delay lines.

3. The distance measuring system according to claim 1, wherein the timing correction unit further comprises a first delay locked loop and a second delay locked loop;
- the first delay locked loop includes a first delay line;
- the second delay locked loop includes a second delay line; and
- the timing correction phase comparator shares the first delay line and the second delay line.

4. The distance measuring system according to claim 1, wherein the first delay time control circuit, the second delay time control circuit, and the timing correction phase comparator each include, respectively, a first delay locked loop and a second delay locked loop;
- each of the first delay locked loops includes a first delay line;
- each of the second delay locked loops includes a second delay line; and
- the first delay time control circuit, the second delay time control circuit, and the timing correction phase comparator each share the respective first delay lines and the respective second delay lines.

5. The distance measuring system according to claim 1, wherein at least one of the first delay time control circuit and the second delay time control circuit comprises:
- a first delay adjusting circuit having a variable number of delay stages;
- a second delay adjusting circuit having a variable number of delay stages; and
- a third delay adjusting circuit equipped with a first delay line and a second delay line and having a variable path between the first delay line and the second delay line,
wherein the timing correction control logic circuit generates a first delay adjusting signal for adjusting the number of the delay stages of the first delay adjusting circuit, a second delay adjusting signal for adjusting the number of the delay stages of the second delay adjusting circuit, and a third delay adjusting signal for setting the path of the third delay adjusting circuit;
the first delay adjusting circuit generates a first delay signal from the reference signal based on the reference clock signal and the first delay adjusting signal;
the second delay adjusting circuit generates a second delay signal from the first delay signal based on the second delay adjusting signal; and
the third delay adjusting circuit generates a third delay signal from the second delay signal based on the third delay adjusting signal.

6. The distance measuring system according to claim 1, wherein the timing correction phase comparator converts a phase difference between the offset signal and the output signal from the light emitter driver into a digital signal, and outputs the digital signal as the phase comparison result.

7. The distance measuring system according to claim 6, wherein the timing correction phase comparator comprises:
- a first delay line constituted by connecting in series a plurality of first delay elements, and to which the output signal from the light emitter driver is input to a first stage of the first delay elements;
- a second delay line constituted by connecting in series a plurality of second delay elements such that the second delay elements correspond to the first delay elements one by one, and to which the offset signal is input to a first stage of the second delay elements; and
- a phase detector having at least a plurality of flip-flop circuits,
wherein each of the flip-flop circuits generates a phase detecting signal responsive to outputs from a corresponding first delay element and a corresponding second delay element; and
the phase detector outputs the phase detecting signals from the respective flip-flop circuits as a phase difference value.

8. The distance measuring system according to claim 7, wherein the phase detector further includes a decoder, and the decoder generates the phase difference value based on the phase detecting signals from each of the flip-flop circuits.

9. The distance measuring system according to claim 7, wherein the phase detector further includes a decoder, and from among the phase detecting signals from the flip-flop circuits, the decoder determines a number of bits having logical values of "1" or a number of bits having logical values of "0", and outputs the same as the phase difference value.

10. A distance measuring system comprising:
a light emitter that emits light toward a target object;
a light receiver that receives reflected light of the emitted light from the target object and produces an output corresponding to an amount of light received;
a controller for controlling the light emitter and the light receiver; and
a distance calculating unit that calculates a distance to the target object by means of a time-of-flight method using the output of the light receiver,
wherein the controller further comprises:
a sequencer that regulates a light emission timing at which light is emitted from the light emitter and a light reception timing at which light is received by the light receiver;
a reference clock signal generating unit that generates a reference clock signal and outputs the reference clock signal to the sequencer;
a light emitter driver for driving the light emitter;
a light receiver driver for driving the light receiver; and
a timing correction unit interposed in a previous stage of the light emitter driver for correcting the light emission timing,
wherein the timing correction unit includes a circuit startup sequence generator, a delay time control and timing correction phase comparator, and a timing correction control logic circuit;
the circuit startup sequence generator, at the time of system startup, outputs a startup trigger signal to the timing correction control logic circuit, to thereby start up driving of the timing correction control logic circuit;
the timing correction control logic circuit sets an initial value in the delay time control and timing correction phase comparator based on the startup trigger signal; and
the circuit startup sequence generator outputs a startup signal to the delay time control and timing correction phase comparator, to thereby start up driving of the delay time control and timing correction phase comparator.

11. The distance measuring system according to claim 10, wherein:
the delay time control and timing correction phase comparator includes a first delay time control circuit, a second delay time control circuit, and a timing correction phase comparator; and
the timing correction control logic circuit sets an initial value of the first delay time control circuit based on input thereto of the startup trigger signal, and starts up driving of the first delay time control circuit, the second delay time control circuit, and the timing correction phase comparator.

12. The distance measuring system according to claim 11, wherein the first delay time control circuit, the second delay time control circuit, and the timing correction phase comparator each include, respectively, a first delay line and a second delay line;
the timing correction unit further comprises a first delay locked loop that generates a first delay adjusting bias for adjusting a delay time of each of the first delay lines, and a second delay locked loop that generates a second delay adjusting bias for adjusting a delay time of each of the second delay lines; and
the timing correction control logic circuit starts up driving of the first delay locked loop and the second delay locked loop prior to starting up driving of the first delay time control circuit, the second delay time control circuit, and the timing correction phase comparator, and starts up driving of the first delay time control circuit, the second delay time control circuit, and the timing correction phase comparator after the first delay adjusting bias and the second delay adjusting bias have become stabilized.

13. The distance measuring system according to claim 11, wherein the sequencer generates a reference signal, which is synchronized with the reference clock signal, and inputs the reference signal to the first delay time control circuit and the second delay time control circuit;
the first delay time control circuit outputs a signal to the light emitter driver, in which the reference signal is delayed based on the initial value;
the second delay time control circuit outputs an offset signal, in which the delay time is offset from the reference signal;
the timing correction phase comparator carries out phase comparison between the offset signal and the output signal from the light emitter driver, and outputs a phase comparison result; and
the timing correction control logic circuit generates an offset adjusting signal based on the phase comparison result, and updates an offset value in the second delay time control circuit.

14. The distance measuring system according to claim 13, wherein the timing correction control logic circuit updates the offset value and sets the offset value as an updated offset value, when the phase comparison result has reached a median within a detection range of the timing correction phase comparator.

15. The distance measuring system according to claim 14, wherein the updated offset value is held in memory in the second delay time control circuit.

16. The distance measuring system according to claim 14, wherein the timing correction control logic circuit:
generates a delay adjusting signal based on the phase comparison result, which is read after the offset value is updated and set, and controls the first delay time control circuit using the delay adjusting signal to thereby delay the reference signal; and
correctively controls the first delay time control circuit so as to make the offset signal and the output signal from the light emitter driver have the same phase.

17. The distance measuring system according to claim 16, wherein the timing correction control logic circuit measures a jitter value per each sampling period from the phase comparison result over an arbitrary number of sampling periods, and adjusts at least a sampling interval based on the jitter value.

18. The distance measuring system according to claim 17, wherein:
the sampling interval is shortened in accordance with an increase in the jitter value; and
the sampling interval is lengthened in accordance with a decrease in the jitter value.

19. The distance measuring system according to claim 17, wherein, in the event that the jitter value lies within an allowable range, the sampling interval is regarded as appropriate, and adjustment of the sampling interval is not carried out.

20. The distance measuring system according to claim 16, wherein the timing correction control logic circuit adjusts an update interval of an adjustment in timing performed by the first delay time control circuit, based on an amount of variation of the phase comparison result within a fixed time period.

21. The distance measuring system according to claim 20, wherein the update interval of the adjustment in timing is shortened in accordance with an increase in the amount of variation.

22. The distance measuring system according to claim 20, wherein, in the event that the update interval lies within an allowable range, the update interval is regarded as appropriate, and adjustment of the update interval is not carried out.

23. A distance measuring system comprising:
a light emitter that emits light toward a target object;
a light receiver that receives reflected light of the emitted light from the target object and produces an output corresponding to an amount of light received;
a controller for controlling the light emitter and the light receiver; and
a distance calculating unit that calculates a distance to the target object by means of a time-of-flight method using the output of the light receiver,
wherein the controller further comprises:
a sequencer that regulates a light emission timing at which light is emitted from the light emitter and a light reception timing at which light is received by the light receiver;
a reference clock signal generating unit that generates a reference clock signal and outputs the reference clock signal to the sequencer;
a light emitter driver for driving the light emitter; and
a light receiver driver for driving the light receiver,
wherein the sequencer outputs a control signal, by which the light emission timing and the light reception timing are regulated, to the light emitter driver and the light receiver driver, via a timing correction unit that carries out adjustment of a delay time based on a transition timing of the reference clock signal, and at a time resolution that is higher than the time resolution of the reference clock signal.

24. The distance measuring system according to claim 23, wherein the timing correction unit includes a light emission side timing correction unit and a light reception side timing correction unit; and
the sequencer outputs a first control signal to the light emitter driver via the light emission side timing correction unit, and outputs a second control signal to the light receiver driver via the light reception side timing correction unit.

25. The distance measuring system according to claim 24, wherein:
the light emission side timing correction unit generates the first control signal based on a phase comparison result between a first offset signal, in which a light emission reference signal from the sequencer is delayed, and an output signal from the light emitter driver, and then outputs the same to the light emitter driver; and
the light reception side timing correction unit generates the second control signal based on a phase comparison result between a second offset signal, in which a light reception reference signal from the sequencer is delayed, and an output signal from the light receiver driver, and then outputs the same to the light receiver driver.

26. The distance measuring system according to claim 25, wherein:
the light emission side timing correction unit includes a first delay time control circuit, a second delay time control circuit, a first timing correction phase comparator, and a first timing correction control logic circuit;
the light emission reference signal from the sequencer is input to the first delay time control circuit and the second delay time control circuit;
the first delay time control circuit outputs a signal, in which the light emission reference signal is delayed, to the light emitter driver as the first control signal;
the second delay time control circuit outputs as a first offset signal a signal in which the light emission reference signal is delayed, so as to offset a delay time from generation of the light emission reference signal until the output of the light emitter driver;
the first timing correction phase comparator carries out phase comparison between the first offset signal and the output signal from the light emitter driver, and outputs the same as a first phase comparison result;
the first timing correction control logic circuit outputs a first delay adjusting signal based on the first phase comparison result;
the first delay time control circuit inputs the first delay adjusting signal, and adjusts timing of the light emission reference signal;
the light reception side timing correction unit includes a third delay time control circuit, a fourth delay time control circuit, a second timing correction phase comparator, and a second timing correction control logic circuit;
the light reception reference signal from the sequencer is input to the third delay time control circuit and the fourth delay time control circuit;
the third delay time control circuit outputs a signal, in which the light reception reference signal is delayed, to the light receiver driver as the second control signal;
the fourth delay time control circuit outputs as a second offset signal a signal in which the light reception reference signal is delayed, so as to offset a delay time from generation of the light reception reference signal until the output of the light receiver driver;
the second timing correction phase comparator carries out phase comparison between the second offset signal and the output signal from the light receiver driver, and outputs the same as a second phase comparison result;
the second timing correction control logic circuit outputs a second delay adjusting signal based on the second phase comparison result; and
the third delay time control circuit inputs the second delay adjusting signal, and adjusts timing of the light reception reference signal.

27. A distance measuring system comprising:
a light emitter that emits light toward a target object;
a light receiver that receives reflected light of the emitted light from the target object and produces an output corresponding to an amount of light received;
a controller for controlling the light emitter and the light receiver; and
a distance calculating unit that calculates a distance to the target object by means of a time-of-flight method using the output of the light receiver,
wherein the controller further comprises:
a sequencer that regulates a light emission timing at which light is emitted from the light emitter and a light reception timing at which light is received by the light receiver;
a reference clock signal generating unit that generates a reference clock signal and outputs the reference clock signal to the sequencer;
a light emitter driver for driving the light emitter; and
a light receiver driver for driving the light receiver,
wherein the sequencer outputs a control signal, by which the light emission timing is regulated, to the light emitter driver, via a timing correction unit that carries out adjustment of a delay time based on a transition timing of the reference clock signal, and at a time resolution that is higher than the time resolution of the reference clock signal.

28. The distance measuring system according to claim 27, wherein the timing correction unit generates the control signal based on a phase comparison result between an offset signal, in which the light emission reference signal from the sequencer is delayed, and an output signal from the light emitter driver, and then outputs the same to the light emitter driver.

29. The distance measuring system according to claim 28, wherein:
the timing correction unit includes a first delay time control circuit, a second delay time control circuit, a timing correction phase comparator, and a timing correction control logic circuit;
the light emission reference signal from the sequencer is input to the first delay time control circuit and the second delay time control circuit;
the first delay time control circuit outputs a signal, in which the light emission reference signal is delayed, to the light emitter driver as the control signal;
the second delay time control circuit outputs as an offset signal a signal in which the light emission reference signal is delayed, so as to offset a delay time from generation of the light emission reference signal until the output of the light emitter driver;
the timing correction phase comparator carries out phase comparison between the offset signal and the output signal from the light emitter driver, and outputs the same as a phase comparison result;
the timing correction control logic circuit outputs a delay adjusting signal based on the phase comparison result; and
the first delay time control circuit inputs the delay adjusting signal, and adjusts timing of the light emission reference signal.

30. The distance measuring system according to claim 27, further comprising a light receiving element that receives direct light from the light emitter and outputs a light emission timing observation signal,
wherein the timing correction unit generates the control signal based on a phase comparison result between an offset signal, in which the light emission reference signal from the sequencer is delayed, and the light emission timing observation signal from the light receiving element, and then outputs the same to the light emitter driver.

31. The distance measuring system according to claim 27, wherein the light receiver driver is installed in a single device together with at least the sequencer.

* * * * *